RECIRCULATING DELAY LINE SIGNAL STORAGE SYSTEM

Filed Feb. 7, 1966 40 Sheets-Sheet 1

INVENTOR.
ALLEN B. J. CUCCIO
BY Warren F. B. Lindsley
ATTORNEY

CHARACTER AND COMMAND CODES

| BIT NUMBER | | | $B_7$ | 0 | 0 | 0 | 0 | 1 | 1 | 1 | 1 |
|---|---|---|---|---|---|---|---|---|---|---|---|
| | | | $B_6$ | 0 | 0 | 1 | 1 | 0 | 0 | 1 | 1 |
| | | | $B_5$ | 0 | 1 | 0 | 1 | 0 | 1 | 0 | 1 |
| $B_4$ | $B_3$ | $B_2$ | $B_1$ | COMMANDS | | CHARACTERS | | | | NO MEANING | |
| 0 | 0 | 0 | 0 | NULL | | SP | 0 | | P | | |
| 0 | 0 | 0 | 1 | | RLF | ! | 1 | A | Q | | |
| 0 | 0 | 1 | 0 | STX | FS | " | 2 | B | R | | |
| 0 | 0 | 1 | 1 | ETX | | # | 3 | C | S | | |
| 0 | 1 | 0 | 0 | | PR | S | 4 | D | T | | |
| 0 | 1 | 0 | 1 | ENQ | | % | 5 | E | U | | |
| 0 | 1 | 1 | 0 | | | & | 6 | F | V | | |
| 0 | 1 | 1 | 1 | | | , | 7 | G | W | | |
| 1 | 0 | 0 | 0 | BS | | ( | 8 | H | X | | |
| 1 | 0 | 0 | 1 | | | ) | 9 | I | Y | | |
| 1 | 0 | 1 | 0 | LF | | * | : | J | Z | | |
| 1 | 0 | 1 | 1 | | | + | ; | K | │ | | |
| 1 | 1 | 0 | 0 | FF | | , | < | L | — | | |
| 1 | 1 | 0 | 1 | CR | | − | = | M | │ | | |
| 1 | 1 | 1 | 0 | | | . | > | N | blk | | |
| 1 | 1 | 1 | 1 | | | / | ? | O | ┌ | | |

FIG. 2.

COMMAND FUNCTIONS

| COMMAND | FUNCTIONAL GROUP |
|---|---|
| STX<br>ETX<br>TX<br>ENQ | TRANSMIT CONTROL |
| FS<br>BS<br>LF<br>RLF<br>PR<br>CR<br>TAB | MARKER MOVEMENT |
| FF | CLEAR AND RESET |

FIG.3.

TRUTH TABLE FOR FLIP-FLOP MODULE

| OUTPUT STATE (PRIOR TO TOGGLE INPUT) | | | INPUTS | | OUTPUT STATE (SUBSEQUENT TO TOGGLE) | | |
|---|---|---|---|---|---|---|---|
| LEVELS "I" | LEVELS "O" | STATE | S | C | LEVELS "I" | LEVELS "O" | STATE |
| L | H | SET | H | H | L | H | SET |
| | | | L | H | L | H | SET |
| | | | H | L | H | L | RESET |
| | | | L | L | H | L | RESET |
| H | L | RESET | H | H | H | L | RESET |
| | | | L | H | L | H | SET |
| | | | H | L | H | L | RESET |
| | | | L | L | L | H | SET |
| ANY STATE, IF UNCONDITIONAL-SET INPUT HIGH | | | | | L | H | SET |

BUFFER MODULE SCHEMATIC DIAGRAM

CLOCK TIMING RELATIONSHIPS

VIDEO CHARACTER REPERTOIRE

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 9

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 11

PART OF COMMAND DECODER 80

ENTRY ADDRESS REGISTER CONTROL 78

4 STAGE COUNTER TRUTH TABLE

| STATE | D | C | B | A | |
|---|---|---|---|---|---|
| 1 | 0 | 0 | 0 | 0 | |
| 2 | 0 | 0 | 0 | 1 | SP1 ADD/SUBTRACT ONE |
| 3 | 0 | 0 | 1 | 0 | |
| 4 | 0 | 0 | 1 | 1 | SP3 |
| 5 | 0 | 1 | 0 | 0 | SP4 |
| 6 | 0 | 1 | 0 | 1 | |
| 7 | 0 | 1 | 1 | 0 | SP6 |
| 8 | 0 | 1 | 1 | 1 | SP7 ADD/SUBTRACT 64 |
| 9 | 1 | 0 | 0 | 0 | |
| 10 | 1 | 0 | 0 | 1 | |
| 11 | 1 | 0 | 1 | 0 | |
| 12 | 1 | 0 | 1 | 1 | |

PORTION OF ADDER / SUBTRACTOR CONTROL 149

ENTRY ADDRESS REGISTER PRESET LOGIC
(PART OF ADDER / SUBTRACTOR CONTROL 149)

INTERNAL CR, LF GENERATOR
(PART OF ADDER / SUBTRACTOR 149)

ADDER SUBTRACTOR TRUTH TABLE

| INPUTS | | | | OUTPUTS | |
|---|---|---|---|---|---|
| ADD=1 SUB=0 | T | EA1 | C+B | S+D | $(C+B)^{N+1}$ |
| 1 | 0 | 0 | 0 | 0 | 0 |
| 1 | 0 | 0 | 1 | 1 | 0 |
| 1 | 0 | 1 | 0 | 1 | 0 |
| 1 | 0 | 1 | 1 | 0 | 1 |
| 1 | 1 | 0 | 0 | 1 | 0 |
| 1 | 1 | 0 | 1 | X | X |
| 1 | 1 | 1 | 0 | 0 | 1 |
| 1 | 1 | 1 | 1 | X | X |
| 0 | 0 | 0 | 0 | 0 | 0 |
| 0 | 0 | 0 | 1 | 1 | 1 |
| 0 | 0 | 1 | 0 | 1 | 0 |
| 0 | 0 | 1 | 1 | 0 | 0 |
| 0 | 1 | 0 | 0 | 1 | 1 |
| 0 | 1 | 0 | 1 | X | X |
| 0 | 1 | 1 | 0 | 0 | 0 |
| 0 | 1 | 1 | 1 | X | X |

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 21

MAIN DELAY LINE TIMING

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 26

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 27

ROW COUNTER 207 OUTPUT TABLE

| STATE | BINARY WEIGHTS 32 (←AR12) | 2 (←AR08) | 1 (←AR07) | 16 (←AR11) | 8 (←AR10) | 4 (←AR09) | BINARY VALUE | MEMORY ROW NUMBER | |
|---|---|---|---|---|---|---|---|---|---|
| 1 | 0 | 0 | 0 | 0 | 0 | 0 | 0 | 1 | |
| 2 | 0 | 0 | 1 | 1 | 1 | 1 | 29 | 30 | |
| 3 | 0 | 0 | 1 | 1 | 1 | 0 | 25 | 26 | |
| 4 | 0 | 0 | 1 | 1 | 0 | 1 | 21 | 22 | |
| 5 | 0 | 0 | 1 | 1 | 0 | 0 | 17 | 18 | |
| 6 | 0 | 0 | 1 | 0 | 1 | 1 | 13 | 14 | |
| 7 | 0 | 0 | 1 | 0 | 1 | 0 | 9 | 10 | |
| 8 | 0 | 0 | 1 | 0 | 0 | 1 | 5 | 6 | |
| 9 | 0 | 0 | 1 | 0 | 0 | 0 | 1 | 2 | |
| 10 | 0 | 1 | 0 | 1 | 1 | 1 | 30 | 31 | |
| 11 | 0 | 1 | 0 | 1 | 1 | 0 | 26 | 27 | |
| 12 | 0 | 1 | 0 | 1 | 0 | 1 | 22 | 23 | |
| 13 | 0 | 1 | 0 | 1 | 0 | 0 | 18 | 19 | |
| 14 | 0 | 1 | 0 | 0 | 1 | 1 | 14 | 15 | |
| 15 | 0 | 1 | 0 | 0 | 1 | 0 | 10 | 11 | |
| 16 | 0 | 1 | 0 | 0 | 0 | 1 | 6 | 7 | |
| 17 | 0 | 1 | 0 | 0 | 0 | 0 | 2 | 3 | |
| 18 | 0 | 1 | 1 | 1 | 1 | 1 | 31 | 32 | |
| 19 | 0 | 1 | 1 | 1 | 1 | 0 | 27 | 28 | |
| 20 | 0 | 1 | 1 | 1 | 0 | 1 | 23 | 24 | |
| 21 | 0 | 1 | 1 | 1 | 0 | 0 | 19 | 20 | |
| 22 | 0 | 1 | 1 | 0 | 1 | 1 | 15 | 16 | |
| 23 | 0 | 1 | 1 | 0 | 1 | 0 | 11 | 12 | |
| 24 | 0 | 1 | 1 | 0 | 0 | 1 | 7 | 8 | |
| 25 | 0 | 1 | 1 | 0 | 0 | 0 | 3 | 4 | |
| 26 | 1 | 0 | 0 | 0 | 0 | 0 | 32 | 33 | |
| 27 | 0 | 0 | 0 | 1 | 1 | 1 | 28 | 29 | VERT. SYNC. |
| 28 | 0 | 0 | 0 | 1 | 1 | 0 | 24 | 25 | |
| 29 | 0 | 0 | 0 | 1 | 0 | 1 | 20 | 21 | |
| 30 | 0 | 0 | 0 | 1 | 0 | 0 | 16 | 17 | |
| 31 | 0 | 0 | 0 | 0 | 1 | 1 | 12 | 13 | |
| 32 | 0 | 0 | 0 | 0 | 1 | 0 | 8 | 9 | |
| 33 | 0 | 0 | 0 | 0 | 0 | 1 | 4 | 5 | |
| 1 | 0 | 0 | 0 | 0 | 0 | 0 | 0 | 1 | |

FIG. 42.

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 33

RECIRCULATING DELAY LINE SIGNAL STORAGE SYSTEM

PORTION OF VERTICAL WORD GENERATOR 301

PORTION OF CHARACTER DECODER 302

PORTION OF WORD SELECTOR LOGIC 303

ENTRY MARKER INTENSITY AND UNDERLINE CONTROL

Feb. 3, 1970 A. B. J. CUCCIO 3,493,938

RECIRCULATING DELAY LINE SIGNAL STORAGE SYSTEM

Filed Feb. 7, 1966 40 Sheets-Sheet 39

VIDEO AMPLIFIER AND MIXER 65

United States Patent Office 3,493,938

Patented Feb. 3, 1970

3,493,938

RECIRCULATING DELAY LINE SIGNAL STORAGE SYSTEM

Allen B. J. Cuccio, Oklahoma City, Okla., assignor to General Electric Company, a corporation of New York Filed Feb. 7, 1966, Ser. No. 525,516
Int. Cl. G11b; G11c; H03h 7/30
U.S. Cl. 340—173 10 Claims

ABSTRACT OF THE DISCLOSURE

A recirculating digital data storage system is disclosed wherein the data stream is recirculated through at least a pair of fixed delay closed loop data paths. Signals are either transferred along these data paths simultaneously or along different paths in a space time relationship and then decommutated at the end of the data paths into a form equivalent of the data received by the storage system and then transferred to the input of the data storage system for recirculation through the storage system.

TABLE OF CONTENTS

| | Column |
|---|---|
| I. General Description | 1 |
| (1) Statement of the Invention | 1 |
| (2) Brief Description of the Drawings | 3 |
| (3) Glossary and Index of Signals | 4 |
| II. System Descriptions | 7 |
| (1) Data Communication Line Operation | 7 |
| (2) Line Direction Control | 8 |
| (3) Data Transmit Sequence | 8 |
| (4) Data Receive Sequence | 8 |
| (5) Transmission of 5, 6, 7 and 8 Level Codes | 8 |
| (6) Checking Parity | 8 |
| (7) Display Controller | 9 |
| (8) Display Module | 9 |
| (9) Keyboard Unit | 9 |
| III. Logic Components | 9 |
| (1) AND-Gates | 10 |
| (2) OR-Gates | 10 |
| (3) Flip-Flop Modules | 10 |
| (4) Inverter (Buffer Module) | 10 |
| (5) Master Clock and Timing Circuits | 10 |
| IV. Character Display | 12 |
| (1) Character Generator | 13 |
| (2) Character Composition | 13 |
| V. Detailed Functional Analysis | 15 |
| (1) Main Memory | 15 |
| (a) Communication Data Line Interface | 17 |
| (1) Transmission of Data to Communication Line | 18 |
| (2) Keyboard Transmit | 18 |
| (3) Memory Transmit | 18 |
| (b) Keyboard Input Gates | 18 |
| (c) Memory Register | 20 |
| (d) Command Decoder | 21 |
| (e) Entry Address Register Control | 22 |
| (1) 4 Stage Counter | 22 |
| (2) Shift Pulse Decoder | 23 |
| (3) Adder/Subtracter Control | 23 |
| (4) Adder/Subtracter | 26 |
| (f) Entry Address Register | 26 |
| (g) Comparator | 27 |
| (h) Memory Input Gates | 27 |
| (i) Memory Output Gates | 28 |
| (j) Data Organization | 28 |
| (2) Display Timing Logic | 30 |
| (a) Character Counter | 30 |
| (b) Horizontal Synchronizing Generator | 31 |
| (c) Line Counter | 31 |
| (d) Row Counter | 31 |
| (e) Vertical Synchronizing Generator | 31 |
| (f) Field Counter | 32 |
| (g) Blink Counter | 33 |
| (3) Timing and Buffering Logic | 33 |
| (a) Buffer Memory | 33 |
| (b) Buffer Memory Input/Output Circuits | 34 |
| (4) Character Generator | 34 |
| (a) Line Decoder | 35 |
| (b) Vertical Word Generator | 36 |
| (c) Character Decoder | 36 |
| (d) Word Selector | 36 |
| (e) Underlining | 36 |
| (5) Video Register | 37 |
| (6) Video Amplifier and Mixer | 37 |

GENERAL DESCRIPTION

Statement of the Invention

This invention relates to a system for converting coded data having a binary or digital form into an intelligible visual display, and more particularly to an improved information storage system in which data may be delivered at output terminals for display while either retaining the data within the storage system or replacing it with new data. The data may include alphabetics, numerics, punctuation marks and special symbols.

Digital information has been received, stored and transmitted from one location to another by means of electrical signals which have some characteristic such as frequency, duration or amplitude varied to indicate the information content. Where the digital information is in binary form, each individual digit or bit of digital information is allotted one of a number of recurring equal intervals, called bit intervals, during which the signal characteristics or changes therein signify the specific bit of digital information. The digital information may be derived by determining which of the signal characteristics are within each bit interval. Binary digital information is normally represented by varying a signal characteristic between first and second values or by varying the signal in a first or second sense.

Many codes are used for representing binary digital information. One binary code may indicate a digit value of one by the presence of a change of state during some portion of a bit interval and a digit value of zero by the absence of a change of state during a bit interval. Another binary code may represent a digit value of one by a first potential level during a bit interval and a digit value of zero by a second potential level during a bit interval.

At present, digital to television raster scan conversion systems require very large capacity storage mediums which store each picture element appearing on the television display. In a typical prior art digital to raster scan conversion system, a high capacity magnetic drum is utilized for storing over two million bits of information. The present invention minimizes such memory requirements by eliminating the need for storing every picture element of the display and requires only the capability of storing approximately twelve thousand bits of information.

In accordance with the invention claimed, an improved recirculating digital data storage system is provided in which the data stream is recirculated through a fixed-delay closed loop path. While it is feasible to use magnetic core or drum storage devices in the practice of this invention, the system is described with reference to wire sonic delay lines requiring relatively simple memory circuits. In the sonic delay lines, the storage mechanism is the presence or absence of mechanical vibrations traveling along the length of the wire. Since the amplitude and shape of the pulses are usually deteriorated when passed along the delay line, they are usually not directly recirculated but used to gate fresh pulses into the delay lines. Since the bit interval necessary in sonic delay lines to keep the digital data separated is greater than the bit interval of the data received by the storage system, a plurality of two or more data paths are provided. The received data in the form of a series of binary bits is transferred in signal form to at least a pair of data paths in a commutating manner. These signals are either transferred along the data paths simultaneously or along different paths in a spaced time relationship and then decommutated at the end of the data paths into a form equivalent of the data received by the storage system. These decommutated signals are then transferred to the input of the storage means for recirculation through the storage system.

It is therefore one object of this invention to provide an improved digital data storage system.

Another object of this invention is to provide an improved recirculating digital data storage means employing a plurality of data paths.

A further object of this invention is to provide an improved means for accepting and storing digitally coded data received from an external source.

A still further object of this invention is to provide an improved means for manipulating stored information with new information received from an external source.

Further objects and advantages of the present invention will become apparent to those skilled in the art as the description thereof proceeds.

BRIEF DESCRIPTION OF THE DRAWINGS

The present invention may be more readily described by reference to the accompanying drawings in which:

FIG. 2 is a chart of the data character and command codes used in the data editing and display system of FIG. 1;

FIG. 3 is a chart of various commands used in the data editing and display system of FIG. 1;

FIG. 42 is a timing chart for the row counter shown in FIG. 37;

GLOSSARY AND INDEX OF SIGNALS

Figure 1:
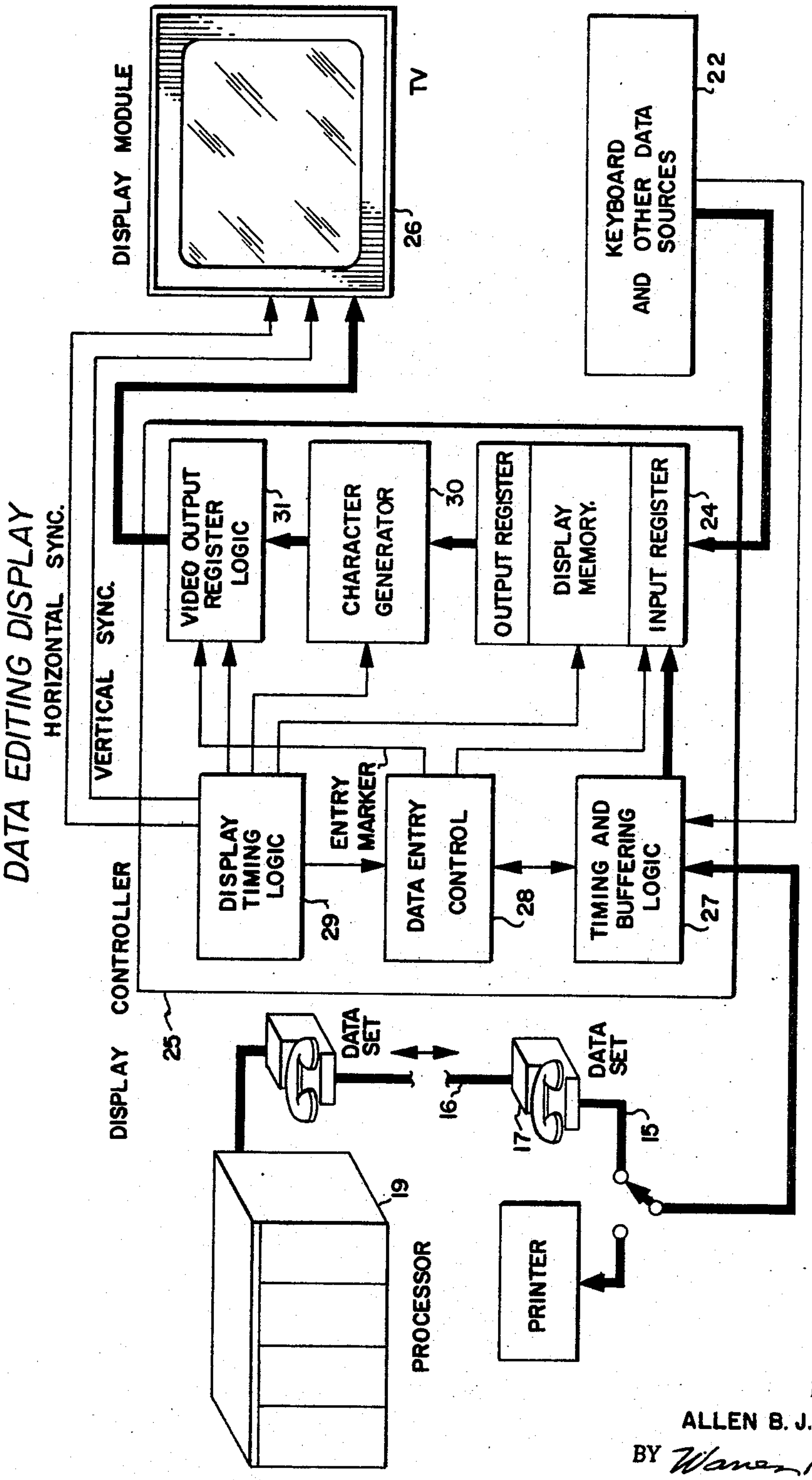
FIG. 1 is a block diagram of a simplified digital data to raster scan conversion data editing and display system and embodying the invention.

In order to more readily understand the disclosed invention, the symbols and signals provided by the various system circuit elements appearing in the drawings are tabulated below.

| Symbols | Description of Symbols |
|---|---|
| A, B, C and D | Output signals of 4 stage counter 146. |
| ADD | Control signal to adder/subtracter causing it to operate in the "add" mode. |
| AFT. READ | Control signal generated by memory register shift control 71 after a data character is read from memory output gate 74. This signal is used to recover the 7th data bit by complementing bit 6. |
| AR01–AR12 | Output signals of character counter 193 and row counter 207. |
| $\overline{AR01}$–$\overline{AR12}$ | One's complement of AR01–AR12 output signals. |
| BLINK | Control signal used to blink character data on display. |
| BLINK CONTROL | Control signal used to blink the entry marker. |
| BS | Back Space signal. Entry marker on display is to be moved to the left one character space. |
| CARRIER | Tone used in the process of data transmission. |
| C+D | Carry or borrow output of adder/subtracter. |
| CLEAR | Control signal generated by memory register shift control 71 to clear memory register 70 to zero. |
| CLEAR TO SEND | Ready to receive new data. |
| CLOCK SIGNAL | Provides timing to memory register shift control 71 when data is transmitted or received via the telephone communication line. |
| CMD STROBE | Signal generated by 4 stage counter 146 used to pulse output signals of command decoder. |
| COMMAND CODE | Signal which indicates a control function is to be performed, such as entry marker movement. |
| COMMAND SIGNALS | Set of signals generated by the command codes such as FS, DS, LF, etc. |
| CONTROL SIGNAL | Signal which modifies the memory address stored in the entry address register 81. |
| CR | Carriage Return signal. Entry marker is to be returned to the first character position of the line on the display. |
| DATA CHARACTER | Characters which are to be stored in memory and displayed. |
| DATA TERM. READY | Ready to operate with the telephone communication line. |
| DATA TRANSFER SIGNALS | Control signals which cause the transfer of data from main memory 61 to buffer memory 62. |
| DL1–DL4 | Character data from the delay lines 1, 2, 3 and 4. Same as MEM DATA signal. |
| $\overline{DL1}$–$\overline{DL4}$ | One's complement of signals DL1–DL4. |
| EA1–EA12 | Output signals of entry address register 81. |
| $\overline{EA1}$–$\overline{EA12}$ | One's complement of EA1–EA12 output signals. |
| ENQ | Transmission inquiry request signal. |
| ENTRY MARKER | Control signal which causes the display of the entry marker symbol. |
| ENTRY MARKER INTENSITY SIGNALS | Control signal which intensifies the entry marker symbol. |
| ETX | End of data signal. |
| FF | Form Feed signal. Causes the entire display to be erased and the entry marker to be moved to the first character position of the top line of the display. |
| FIELD 1 | Output signal of field counter 223. |
| FIELD 2 | Output signal of field counter 223. |
| FOR. LINE | Control signal generated by the automatic CR, LF, PR generator 407 which causes the adder/subtracter to add 64 to the memory address stored in the entry address register 81. |
| FOR. SP | Control signal generated by command decoder 80 which causes the adder/subtracter to add one to the memory address stored in the entry address register 81. This operation causes the entry marker to Forward Space one. |
| FS | Forward Space signal. Entry marker on display is to be moved to the right one character space. |
| HORIZONTAL SYNC | Horizontal deflection control signal for TV monitor. |
| INT. CR. LF | Control signal which initiates the Carriage Return and Line Feed operations when the receive condition exists, and the entry marker is in the 47th character position of a line and the data received is not a command. |
| KEYBOARD DATA BITS 1–7 | Data bits generated by the keyboard when a key is depressed. |
| KEYBOARD DATA TIMING SIGNAL | Control signal which indicates the presence of data bits 1–7. |
| LC01–LC03 | Output signals of line counter 206. |
| LF | Line Feed signal. Entry marker is to be moved toward the bottom of the display one line. |
| MEM. READ | Control signal generated by memory register shift control 71 to transfer DL1–DL4 data from memory output gates 74 to the memory register 70. |
| MEMORY ADDRESS | Memory locations in the main memory. |
| MR DATA | Memory register data. |
| MR1–MR6 | Memory register output signals. |
| $\overline{MR1}$–$\overline{MR6}$ | One's complement of MR1–MR6 signals. |
| NULL | Signal used on the television communication line to indicate action is to take place. |
| PR | Page Return signal. Entry marker is to be returned to first character position of the top line of the display. |
| PRESET | Control signal which occurs at initial power turn on of system used to initialize the state of various counters in the system. |
| PRESET CONDITIONS | Control signals which cause the entry address register to be preset to its initial value. |
| PR1 | Control signal generated by the automatic CR, LF, PR generator 407 used to generate the XPR signal. |
| PR1+CR1 | Control signal generated by the automatic CR, LF, PR generator 407 used to generate the XCR signal. |
| RASTER LINE SIGNALS | Control signals used by the character generator 30 as a TV line number reference. |
| REC | Control signal from command decoder 13 which indicates the system is operating in the Receive mode. |
| REC. DATA | Data received from telephone communication line. |
| REC. $\overline{DATA}$ | One's complement of REC DATA signal. |
| RECIR MR | Control signal which recirculates the memory register data when that data is to be shifted out with its image retained in memory. |
| REC. MODE | Signal from keyboard source indicating the communication data line interface is to operate in a receive condition. |
| REQ TO SEND | Request to send data. |
| RLF | Reverse Line Feed signal. Entry marker is to be moved toward the top of the display one line. |
| S+D | Sum or difference output of adder/subtracter. |
| SFT EA | Shift pulse control signal which causes the entry address register 81 to shift. |
| SFT MR | Shift pulse signal which controls the shifting of the memory register 70. |
| SFT7 | Shift pulse to shift data into the MR7 flip-flop of the memory register 70. |
| SHIFT PULSES | Control signals which transfer data from memory register 12. |
| SID | Control signal used to retime command decode output signals. |
| SP1–SP7 | Control signals generated by the shift pulse decoder 70. |
| STEP EA | Control signal from the command decoder 80 which activates the entry address register control 78. |
| STORE DATA | Control signal generated by the command decoder 88 when it determines that the character in memory register 70 is to be stored in main memory delay lines 72. |
| STX | Start of data signal. |
| SUB | Control signal to the adder/subtracter causing it to operate in the "subtract" mode. |
| T | Trigger pulse to adder/subtracter which activates an add or subtract function. |
| TAB | Signal causes entry marker to move to the character position following the next vertical line displayed. |
| TV SYNC. SIGNALS | Horizontal and vertical synchronizing signals defined above. |
| TV VIDEO SIGNALS | Television input signal which provides display intensification. |
| TX | Transmit command signal. |
| TX DATA | Data transmitted to telephone communication line. |
| TX/REC CONTROL | Signals which control the transfer of data on the telephone communication line. |
| VERTICAL SYNC | Vertical deflection control signal for TV monitor. |
| WRITE SIGNAL | Output of comparator 79 which determines when a data character can be shifted into delay lines 72. |
| XCR | Preset signal to character portion of entry address register 81. |
| XPR | Preset signal to row portion of entry address register 81. |
| 6MC, 3MC, 1MC | Six, three and one megacycle clock signals, respectively. |
| $\overline{6MC}$, $\overline{3MC}$, $\overline{1MC}$ | Inverted waveforms of the 6MC, 3MC, and 1MC clock signals, respectively. |

SYSTEM DESCRIPTION

The present invention relates to data communication systems and particularly to visual display terminal equipment for use at the ends of message networks or transmission links such as, for example, telephone lines interconnecting computers and data accumulation equipment. Since it is believed to be unnecessary to describe the well-known details of these systems to completely describe the invention, block diagrams will be used where possible. However, even though known details will be eliminated, a basic description of the entire system will be presented to enable one skilled in the art to understand the environment in which the present invention is placed.

Accordingly, reference is made to FIG. 1 which shows diagrammatically a data communication system employing data processing facilities. As used herein, data communication means the transmission of information to and from data processing equipment and includes assembly, sequencing, routing, and selection of such information as is generated at independent remote points of data origination, and the distribution of the processed information to remote output terminals or other data processing equipment. Various means of communication from one point to another exist today as part of our nation's common and private carrier wire lines, cables, cable carriers, radio and microwave facilities.

In order to minimize the complexity of explanation of this invention, certain simplifying assumptions are made. These simplifying assumptions are not to be construed as limitations of the invention. In particular, it will be observed that the data to be displayed in accordance with the invention may be obtained from any suitable source such as an electronic digital computer. Although the computer lends added flexibility to the system, in that data processing can be carried out while the display is being generated, the principles of the invention are equally applicable to the display of data from other sources. For example, the data to be displayed might optionally be obtained from a data storage device such as a magnetic tape. Alternatively, the data might be received from a data transmission device such as a telephone line. It should be understood, therefore, that the scope of the invention extends beyond the environment illustrated herein for purposes of explanation and has broad application in the field of electronic display systems.

For simplification purposes, it is assumed in FIG. 1 that digital information in binary form is transmitted from one or a plurality of sources to the display system shown by means of electrical signals which have some characteristics such as frequency, duration or amplitude varied to indicate the information content. For example, binary information in serial format may be obtained from source 15 which is connected to a data communication system such as a telephone line 16 through a data set 17. The telephone line, in turn, may be connected through another data set 18 to a processor 19 or other data accumulation device. The data communication system is adapted to send and receive digital information signals without human intervention. Binary information in parallel format may be obtained from a typewriter keyboard, paper tape, magnetic tape or other similar source 22.

Data communication line operation

The data communication system disclosed operates by automatically sending and receiving data. A controller unit not shown along with the data sets at the terminal end of the communication or telephone line 16 will automatically maintain line discipline and will prohibit the transmission of data from one terminal to another unless the line direction of the transmission line has been coordinated with the distant terminal. Thus, in a half-duplex transmission system, data can be transmitted in only one direction at a time.

The controller unit of each of the data sets at the opposite ends of the communication line may contain a parallel to serial converter. Data is usually received in parallel from the processor or from the data editing display system disclosed and is transmitted bit serially (asynchronous) through the data sets.

Line direction control

Line direction control is a function of the controller unit coordinating the data sets. The data set at the transmitting end of the line puts a tone on the line under control of its controller unit. This tone indicates to the receiving controller unit at the other end of the line that the line is in use. When the transmitting terminal detects an End of Text (ETX) signal indicating the end of the data block of information has been reached, the transmitting tone disappears. The cessation of the tone indicates to the receiving terminal that it is now possible to transmit data. The receiving controller unit of the data set initiates a change in line direction if it so desires and may become a transmitting terminal. Thus, the line direction may be reversed after the completion of the transmission of a block of data in either direction.

Data transmit sequence

After the line direction has been established to transmit data from one of the terminals, each character is sequentially transmitted through the communication controller logic of the terminals' data set. As used herein, a character is a sequence of binary digits (bits) used to represent the digits 0–9, the letters A–Z, punctuation marks, operation symbols, and any other symbols which a computer may read, store or write. The data set changes the code of the character into tones for transmittal along the transmission line to the data set at the terminal. Transmission of the data characters is asynchronous and the start-stop bits of a character frame hereafter explained transmitted along the transmission line are supplied by the communication control logic of the transmitting terminal data set.

Data receive sequence

The data receive sequence is basically the reverse of the data transmit sequence. Incoming data is changed by the receiving data set into a digital form acceptable to the data editing display system. The bits of the character are stored until a complete character has been received. Then the character may be shifted out in series or parallel to the data editing display system. The data receiving action continues until the transmitting terminal reaches the End of Text signal (ETX).

Transmission of 5, 6, 7 and 8 level codes

The data communication system as described herein transmits 7 intelligent bits in a sequence called a character frame. Each character frame transmitted consists of one start bit, 7 intelligent bits and one or more stop bits. Transmission of a 5, 6 or 8 level code is accomplished in a similar manner by inserting in the character frame the proper number of bits in the character bit sequence.

Checking parity

One of the 7 intelligent bits of a character frame may be a parity bit and a parity test is performed upon each incoming character to determine if a bit has been transmitted in the wrong state. The code as transmitted from the remote location will contain a Mark or a Space in the last of the 7 information bits whichever is required to make the total number of Marks in the first 6 information bits even. The parity test is made by counting the Marks in each incoming character during the first six bits and comparing the count with bit 7. If the count and bit 7 agree, the character is accepted as being correct. If they do not agree, a parity error signal is generated. This signal causes an error signal to be entered into the memory of the data editing and display system instead of the erroneous character received.

Since the scope of this invention is not directed to the transmittal or receipt of any given character or code, this feature will not be described in detail. Reference is made to copending application, Ser. No. 457,018 filed May 19, 1965 by Richard E. Milford and entitled, "Data Communication System Employing Esynchronous Start Stop Clock Generator," assigned to the assignee of this application, for more detail of the data set and communication line transmission receive and transmit functions.

Display controller

Each of the sources 15 and 22 may transfer data to a display memory 24 of a display controller 25 of the data editing and display system disclosed incrementally by character. As utilized herein, the terms information and data are synonymous. The data itself comprises digitally coded groups of bits representative of alphanumeric and other symbolic characters. As disclosed herein, the system employs a seven bit serial code for communication with the associated processor 19, adding additional bits as dictated by the operating mode to create a "character frame" and parity indication. All commands and characters which this code defines are listed in FIG. 2. The operations associated with each of the various commands can be grouped into three sets of "command functions" as shown in FIG. 3.

For simplicity, it is assumed that character data is loaded into a display memory 24 of the display controller shown in FIG. 1 sequentially although it is obvious that memory address logic may be provided so as to load data into the display memory in any desirable sequence, location or format.

The display controller 25 contains all of the buffering and storage functions of the system, together with all the translation functions except that of translating finger pressure upon a key into a coded electrical signal; the latter translation is performed by the keyboard of source 22.

While the display controller is designed and constructed as a single integrated unit, not readily separable by function, it can be considered as a number of functional subsystems which are closely interconnected at many points, and is so considered herein. The subsystems defined by this approach are shown in block form in FIG. 1 and will be discussed in detail later.

Display module

The display module of the data editing display system shown in FIG. 1 is a standard video television (TV) monitor 26 accepting a standard composite video signal. It displays this signal as a pattern of light and dark areas upon the face of a cathode ray tube (CRT); the patterns form alphanumeric symbols determined by the display controller. The display module subsystem includes standard video amplifier, horizontal and vertical sweep circuits, cathode ray tube circuits and power supplies all well known and not discussed in detail herein.

Keyboard unit

Figure 4:
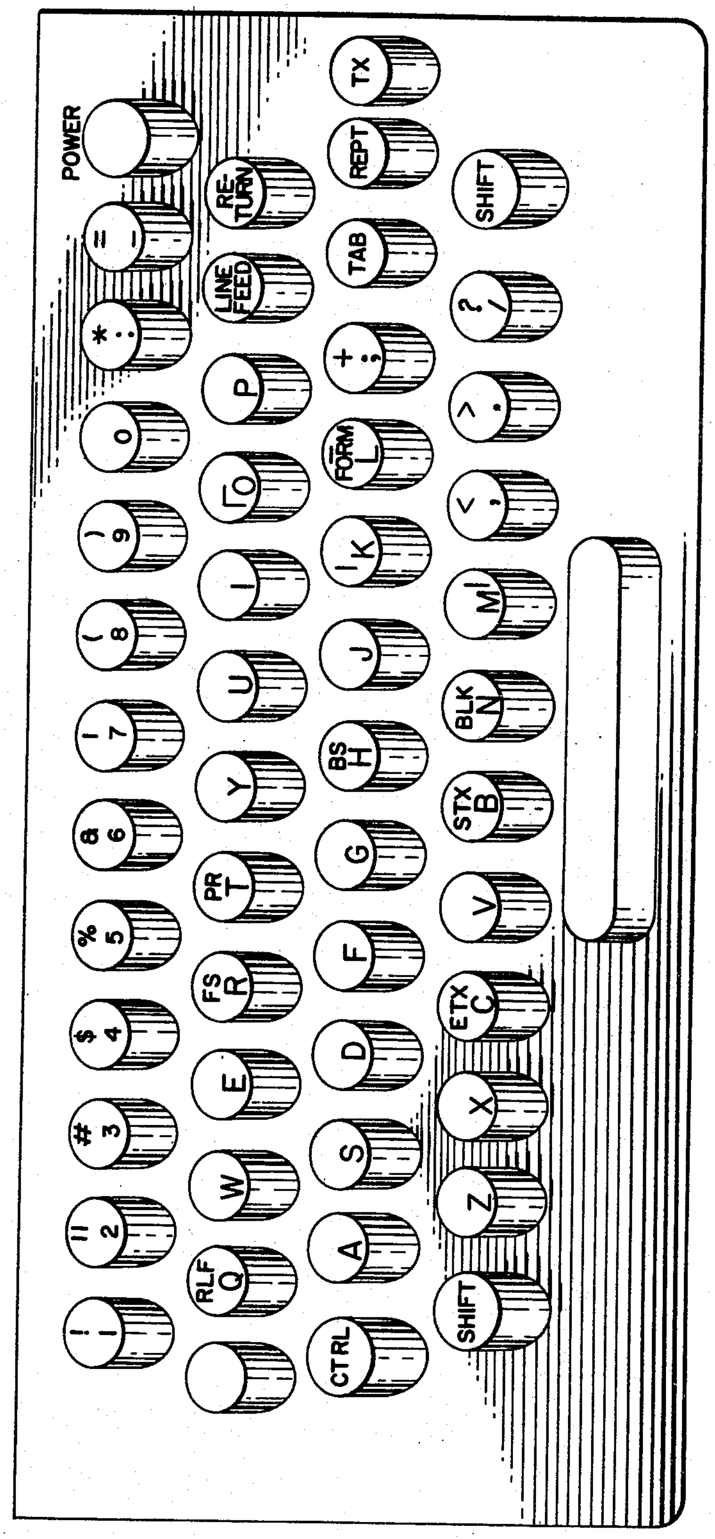
FIG. 4 illustrates the keys of the keyboard unit.

The data source 22 may include, inter alia, a keyboard unit which is a modified teleprinter keyboard together with certain additional circuitry which produces an 8 level code signal and timing pulse when any key is pressed. It also includes all system operating controls with the exception of the controls for the display module. Although other parallel format input data sources may be used with the data editing and display terminal disclosed, the keyboard entry source will be discussed in detail herein. FIGURE 4 illustrates the keys of a usable keyboard.

LOGIC COMPONENTS

The vast majority of the circuits utilized in the display controller are of the integrated circuit variety. Most of the circuitry is composed of integrated circuit modules. While hundreds of these modules are used in the system disclosed, only three distinct types of modules are used. They are the "gate" module, the "flip-flop" module and the "buffer" module which are described below in detail.

AND-gates

Figure 16:
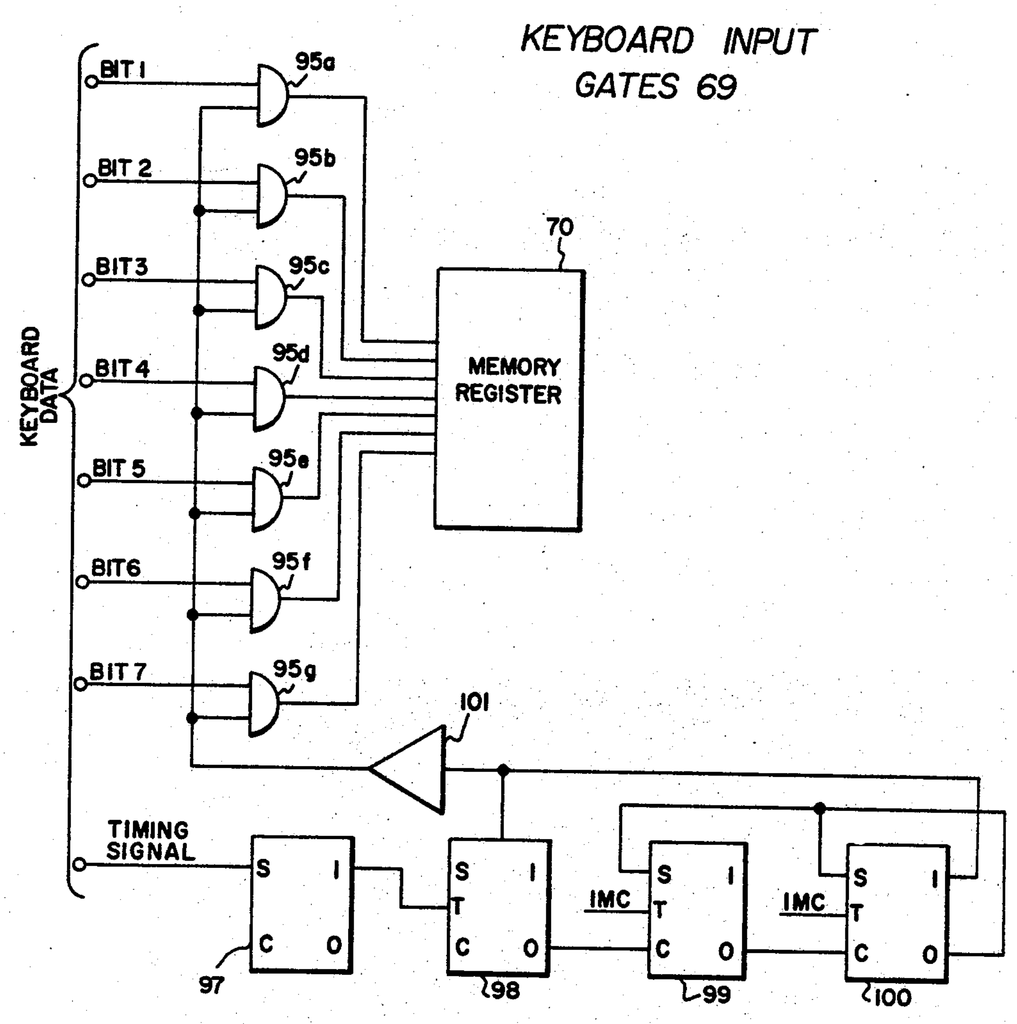
FIG. 16 illustrates diagrammatically the keyboard input gates and the associated timing logic.

The AND-gates disclosed in the drawings provide the logical operation of conjunction of binary 1 signals applied thereto. In the system disclosed, since the binary 1 is represented by a low level signal, the AND-gate provides a lowel level output signal representing a binary 1 when, and only when, all of the input signals applied thereto are low level and represent binary 1's. AND-gates *95a–95g* in FIG. 16 are representative of the AND-gates described.

OR-gates

Figure 17:
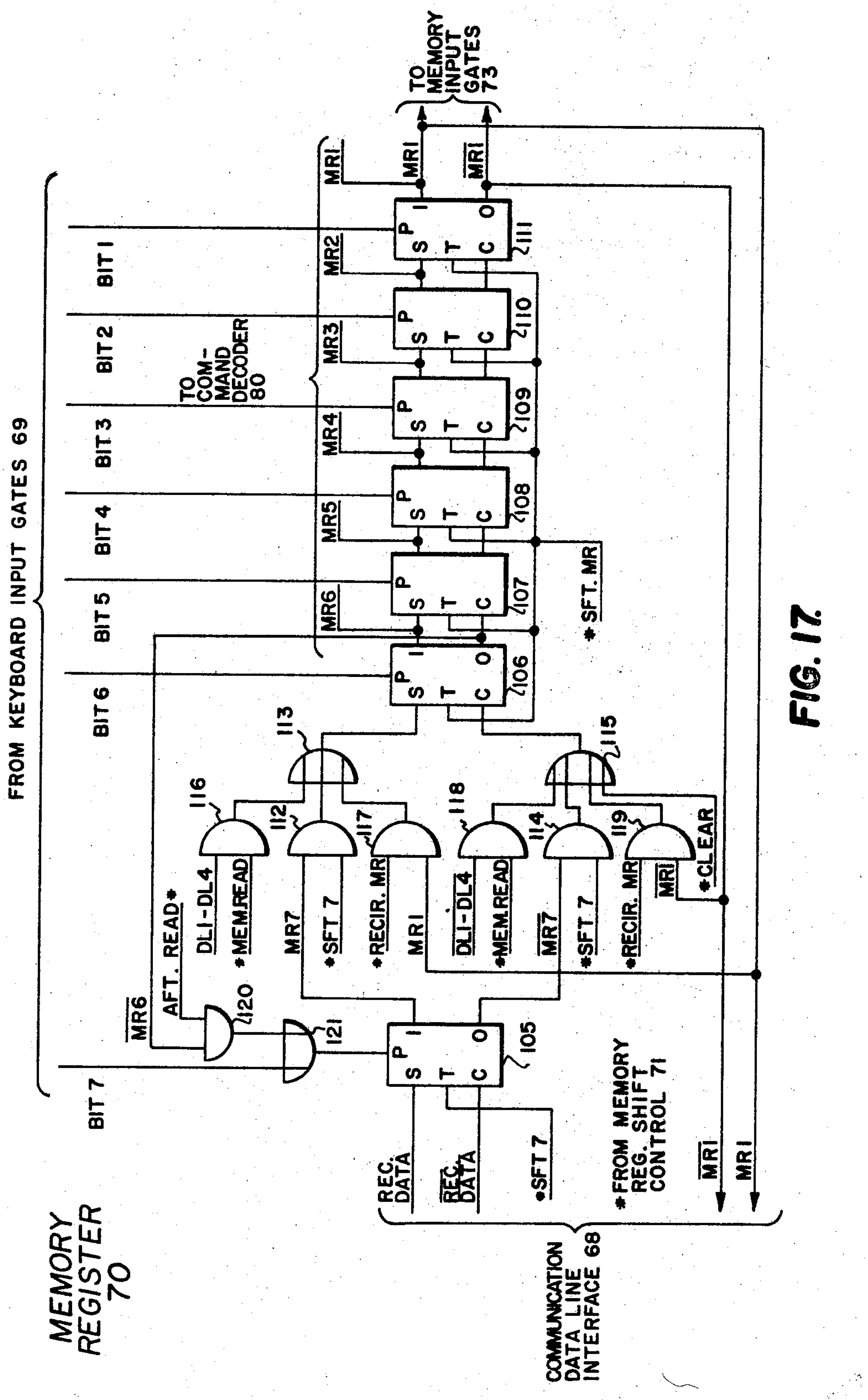
FIG. 17 illustrates in more detail the memory register shown in FIG. 14.

The OR-gates disclosed in the figures of the drawings provide the logical operation of inclusive-OR for binary 1 input signals applied thereto. In the system, since the binary 1 is represented by a low level signal, the OR-gate provides a low level output signal representing a binary 1 when any one or more of the input signals applied thereto is low level and represents binary 1's. OR-gates 113 and 115 in FIG. 17 are representative of the OR-gates described.

Flip-flop modules

Figure 5:
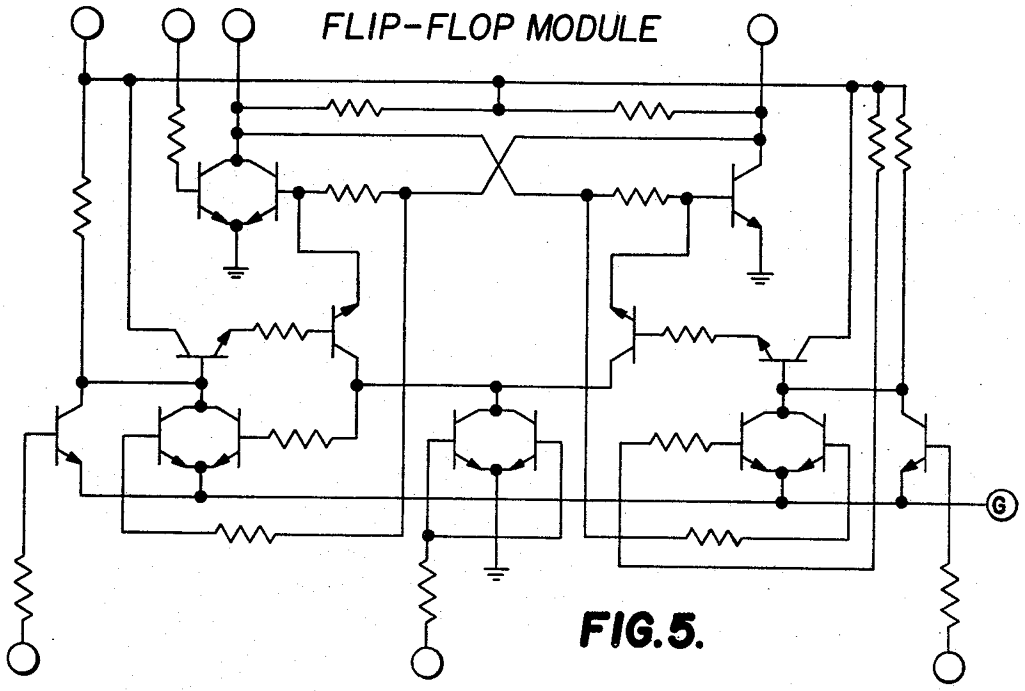
FIG. 5 is a simplified block diagram of a flip-flop module used in the data editing and display system of FIG. 1.
Figures 6, 7:
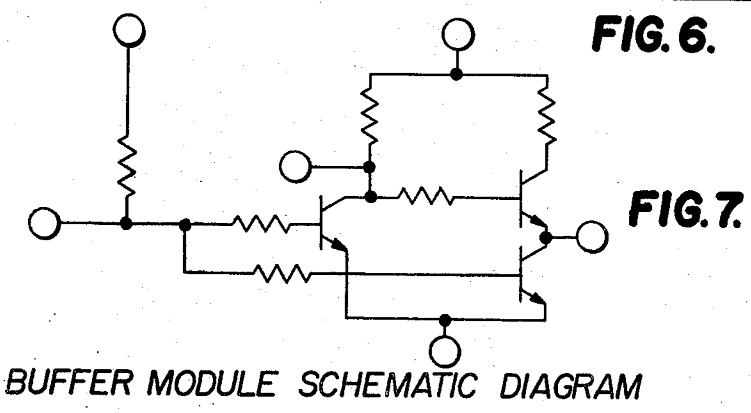
FIG. 6 is a truth table for the flip-flop module of FIG. 5.
FIG. 7 is a simplified block diagram of a buffer module used in the data editing and display system of FIG. 1.

The flip-flop modules (identified by numerals 98 and 99 in FIG. 16) used in the system disclosed and shown in detail in FIG. 5 use medium power transistors which are suitable for use in shift registers, counters and other control devices. FIGURE 6 is a truth table illustrating all possible input conditions to this structure. The flip-flop shown differs from set-reset flip-flops in that simultaneous application of low level signals to its set input terminal S and its complementing reset or clear input terminal C results in a complementing of the flip-flop rather than in an ambiguous indication. A high or positive voltage level being applied to the preset input terminal P of the flip-flop forces the flip-flop module to the set state. A trigger input signal to its T input terminal causes the flip-flop to change its state upon the high-to-low transition of the trigger signal.

Inverter (buffer module)

The inverter or buffer modules used in the system disclosed are inverting drivers. FIGURE 7 shows a schematic diagram of the circuitry contained within the module. The output of the buffer module is the complement of the input signal and is utilized to drive a large number of gates.

Master clock and timing circuits

The display controller employs a number of clock signals at different speeds to accomplish its function. For example, the display memory 24 of FIG. 1 incorporates appropriate read and write circuitry whereby digital data can be alternately recorded and regenerated. To synchronize the transfer of data to the display memory, appropriate timing and buffering logic 27 and data entry control logic 28 are provided. Each of these subsystems as well as the display timing logic in block 29 requires clocking signals at different speeds to accomplish their functions. Coded characters in the display memory are repetitively converted into TV video signals by a character generator 30 and along with synchronizing signals generated by the display timing logic 29 are transmitted from a video output register 31 to TV monitor 26. At the same time that data is being transmitted through the various subsystems at different clocking rates, input data may be accepted by the display controller from the data sets at source 15 at either 100, 600 or 1200 bits per second although only the 1200 bits per second transmission rate is described herein.

All of the clocking signals used in the data editing display system disclosed are obtained from or controlled by a single stabilized oscillator by appropriate frequency division and binary countdown of suitable binary counters.

Figure 8:
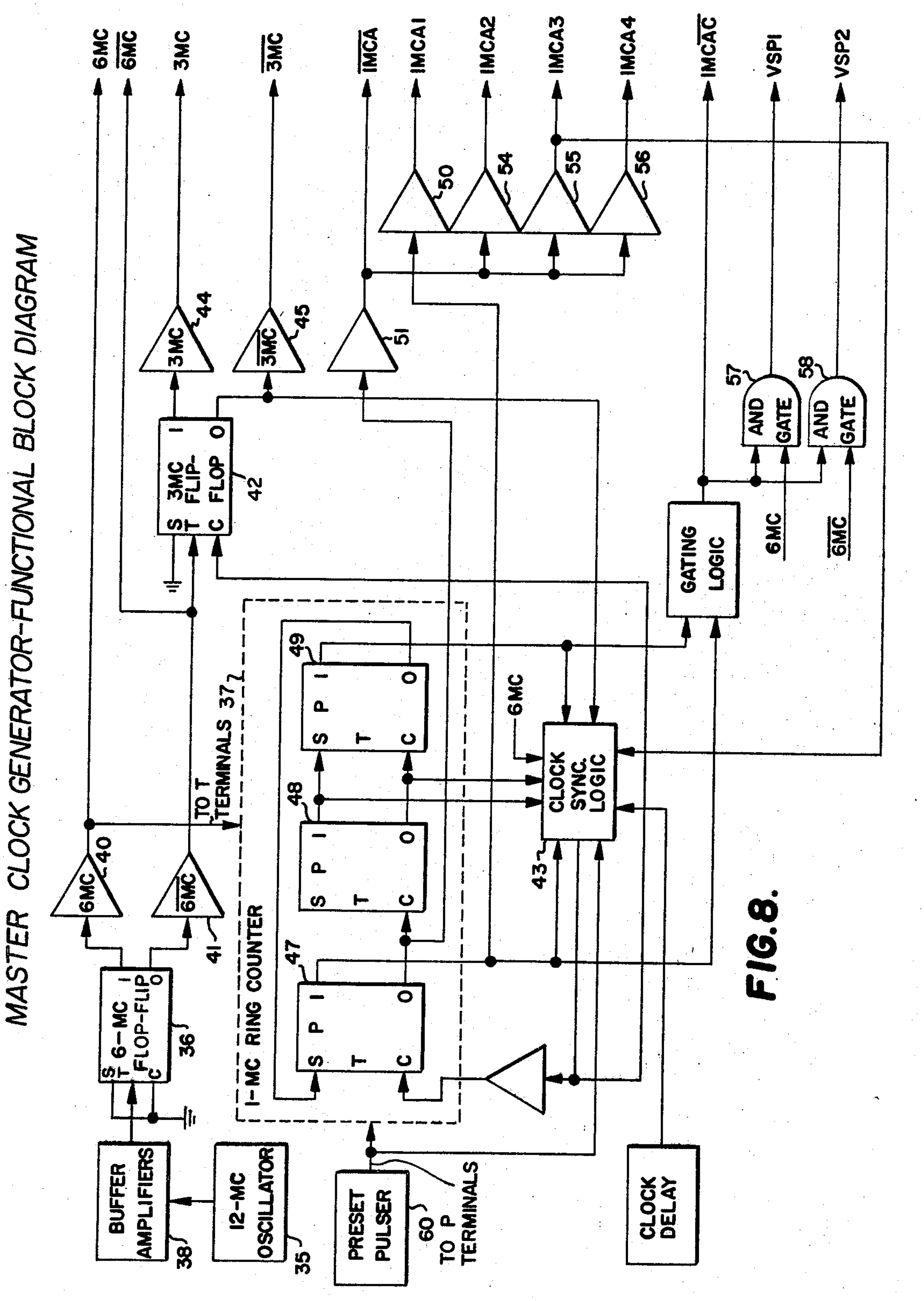
FIG. 8 is a functional block diagram of the master clock generator used in the data editing and display system of FIG. 1.

The master clock timing arrangement shown in FIG. 8 utilizes a 12 million cycle per second (12MC) crystal controlled oscillator 35, the output of which is divided by a flip-flop 36 to produce two complementary 6 megacycles (6MC) signals for use in the display memory 24 and character generator 30. The 6MC signal is counted down to 1 megacycle (1MC) signal by a ring counter 37. As noted from FIG. 8, the $\overline{6MC}$ signal is also divided again by a second flip-flop 42 to produce 3 megacycle (3MC) signals which are used for memory readout as hereinafter explained. The bar over the signal indicates the complement of the signal identified. The 1MC output signals of the ring counter 36 are generally used as the clock pulse frequency rate for the data editing and display system disclosed.

As noted in FIG. 8, the output of the oscillator 35 is applied to buffering amplifiers 38 and thence to flip-flop 36. These amplifiers serve to isolate the frequency division circuit from the oscillator itself, minimizing any effects of loading upon clock frequency stability.

The output of buffering amplifiers 38 is applied to the toggling input terminal T of flip-flop 36, the set and complementary terminals S and C of flip-flop 36 being connected to ground, as shown. Flip-flop 36 is triggered by each high-to-low voltage transition of oscillator 35, thereby dividing the frequency of each pulse of oscillator 35 applied to flip-flop 36 into two 6MC pulses at its 1- and 0-output terminals. The complementary output signals of flip-flop 36 are applied to a pair of buffer-shaper amplifier circuits 40 and 41. The outputs of the buffer-shaper amplifier circuits are used directly and are known herein by the signal designations 6MC and $\overline{6MC}$.

The $\overline{6MC}$ signal is applied to the toggling input terminal T of flip-flop 42. The set input terminal of flip-flop 42 is connected to ground while its complementing input terminal C is connected to an output terminal of a flip-flop (not shown) in the clock synchronizing logic of block 43. Since the output signals from this flip-flop in logic block 43, as well as the input signal to the set terminal of flip-flop 42, are low during normal operation of the system described, flip-flop 42 will be complemented each high-to-low transition of the $\overline{6MC}$ output signal of buffer-shaper amplifier 41 producing complementary 3MC output signals at its 1- and 0-output terminals. These signals are applied to buffer-shaper amplifiers 44 and 45 to produce the 3MC and $\overline{3MC}$ logic signals, respectively. The 0-output signal of flip-flop 42 is also applied to gates (not shown) in the clock synchronizing logic 43.

A plurality of 1MC clock synchronizing signals are generated by the logic shown in FIG. 8. All seven clock synchronizing signals are generated by the 3 stage binary ring counter 37 and appropriate gating logic shown diagrammatically in FIG. 8. Ring counter 37 is composed of three flip-flops 47, 48 and 49. All three flip-flops are unconditionally set at equipment energization or turn-on and are toggled or complemented by the 6MC signal from buffer-shaper amplifier 40. Flip-flops 47, 48 and 49 are interconnected in such a manner that, in normal operation, flip-flop 48 is toggled by the next 6MC pulse after flip-flop 47 changes states. Flip-flop 49 is toggled by the next 6MC pulse after flip-flop 48 changes states and flip-flop 47 is toggled by the next 6MC pulse after flip-flop 49 changes states. Thus, each flip-flop remains in one state for three cycles of the 6MC signal and then changes to the complementary state for the next three cycles and so forth. These timing relationships are shown in FIG. 9.

Figure 9:
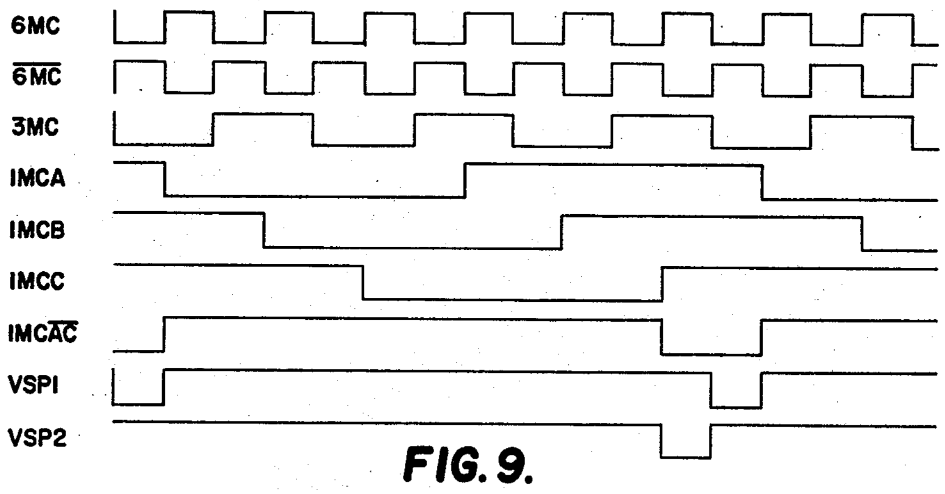
FIG. 9 is a timing diagram illustrating the relationship of the various signals generated by the structure illustrated in FIG. 8.

Six of the seven 1MC clock signals shown in FIGS. 8 and 9 are of a square waveform and are obtained from the 1- and 0-output terminals of flip-flops 47, 48 and 49 of the ring counter 37. The primary 1MC output signal used throughout the display controller 25 is designated as 1MCA1 and is obtained through buffer-shaper amplifier 50 from the 1-output terminal of flip-flop 47 of ring counter 46. The 0-output signal of this flip-flop is applied to buffer-shaper amplifier 51 to produce a $\overline{1MCA}$ signal. This signal, in addition to its use elsewhere, is applied to buffer-shaper amplifiers 54, 55 and 56 for general distribution as 1MCA2, 1MCA3 and 1MCA4 signals. All four of these signals are referred to in the remainder of the specification as 1MC clock pulses without additional identification. The reset output signals of flip-flop 49 of ring counter 37 is used without buffering as logic signal 1MCC shown in FIG. 9.

Clock pulse signal 1MC$\overline{AC}$ shown in FIGS. 8 and 9 is developed by gating the square wave signals from $\overline{1MCA}$ and $\overline{1MCC}$ and has a normal width of 167 microseconds.

In addition to the seven 1MC clock signals discussed above, video shift pulses VSP1 and VSP2 are generated by this logic of FIG. 8. These pulses are generated by gating the 1MC$\overline{AC}$ pulse clock signals with the 6MC and $\overline{6MC}$ signals in AND-gates 57 and 58, respectively. The video shift pulse VSP1 is generated when signals 1MC$\overline{AC}$ and 6MC are both at a low level while video shift pulse VSP2 is generated when signals 1MC$\overline{AC}$ and 6MC are at a low level.

In normal operation, the various clock signals of the display controller are maintained in synchronization with each other in the relationship shown in FIG. 9. However, noise voltages and other unpredictable transient voltages may cause loss of synchronization. Should such errors occur, the clock synchronizing logic circuits 43 detect the existence of a non-synchronized condition and restores synchronization.

Since virtually all operations of the display controller are controlled by various counting registers, it is imperative that a means be provided for starting all the registers in synchronization with each other. This means is the preset pulser circuit which drives the preset lines to a low level or True condition momentarily at equipment turn-on or at any time the clock synchronizing logic circuits in block 43 go True indicating a resetting operation of the logic of the data editing and display system.

CHARACTER DISPLAY

Figure 10:
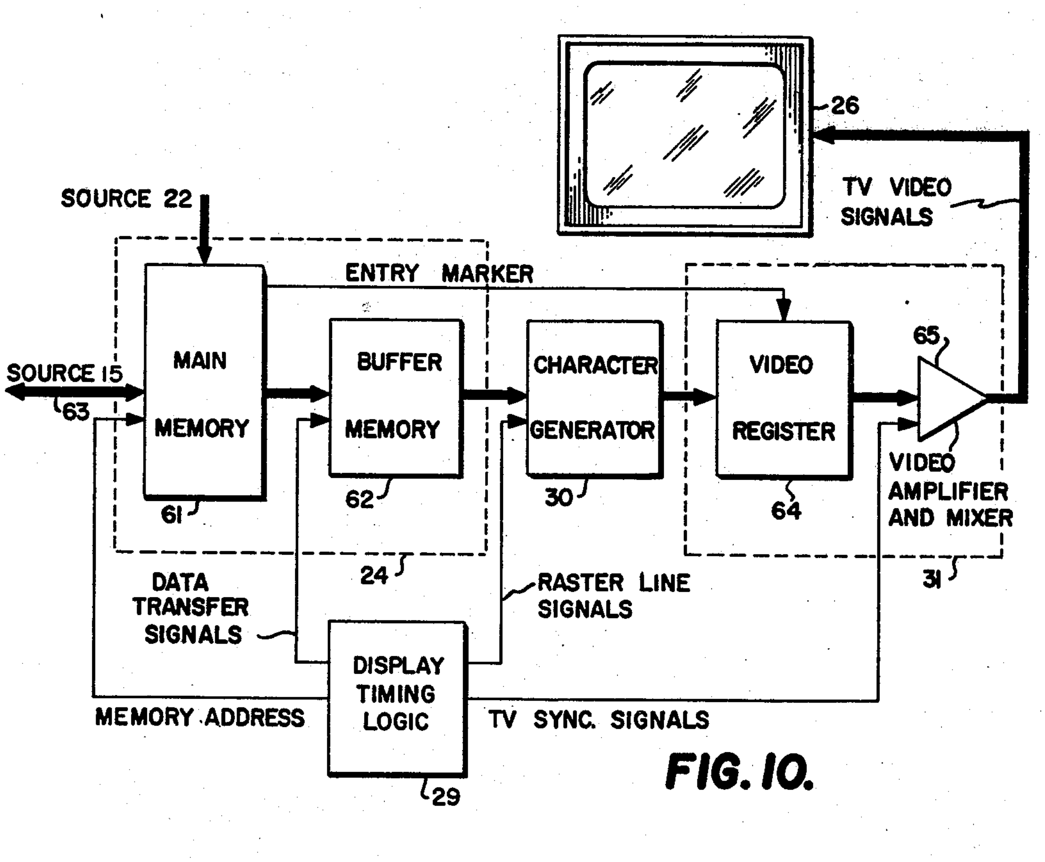
FIG. 10 is an amplification of the block diagram shown in FIG. 1 illustrating in more detail the display memory and video output register modules.

FIGURE 10 illustrates in more detail, in block diagram form, the display memory 24 and video output register logic 31 of FIG. 1. As shown, the display memory 24 comprises a main memory 61 and a buffer memory 62. Main memory 61 receives data from each of the sources 15 and 22 incrementally by characters and transmits data incrementally by character to the data communicating line 63. For simplicity, it is assumed that character data is normally loaded into memory sequentially, i.e., the first character is stored in memory location identified, for example, as one, the second character in memory location two, the third character in memory location three, etc. It is further assumed that the next sequential character location number can be modified through the use of a special set of commands. It is obvious that memory address logic may be devised to load data into any desired sequence, location or format in memory.

Main memory 61, to be described in more detail later, is capable of storing one full page of text. For explanation purposes, it is assumed that a full page of text comprises twenty-six lines wherein each line contains forty-six character positions. It is to be noted that the number of lines and the number of characters per line used is a function of the memory size and the circuit speeds employed. The display timing logic 29 provides in binary form a memory address to main memory 61 for all data entries to main memory 61, and a data transfer control signal from the display timing logic determines when data from main memory 61 is transferred to buffer memory 62. As shown in FIGURES 1 and 10, data flow through the system is shown by heavy dark lines while control and synchronizing signal flow is shown by thin dark lines. A row of data is recycled through buffer memory 62 eight times at a rate in synchronization with the transfer rate of the horizontal television raster lines. Thus, buffer memory 62 retains each row of data it accepts from main memory 61 for a duration equivalent to the time for generating eight television raster lines. During this eight television raster line period, the data is presented on eight successive cycles to character generator 30.

Character generator

Character generator 30 is designed to accept and convert each six bit coded character from buffer memory 62 along with an indication of the television raster line number from the display timing logic 29 and encodes these signals into a video information word. This video information word is representative of a portion of the characters to be displayed and is presented in parallel form to the video output register 64 of the video output register logic 31 which converts it to a serial format similar to a television video signal.

The output signal of the video output register 64 is in proper form to control the intensity circuits of the standard television monitor 26 in order to obtain an alphanumeric presentation. The output of the video register is applied to a video amplifier and mixer circuit 65 also forming a part of logic 27 which combines it with television synchronization signals from the display timing logic 29 to drive the television monitor 26.

The display presentation appearing on the television monitor 26 is a fixed format, alphanumeric display arranged in twenty-six textual lines, each containing forty-six character positions. Each individual character position occupies a fixed position in the television raster, that is, it is always made up of the same set raster lines. For a 14 inch television screen, the dimensions of the 26 line format are approximately 7 inches high and 9.3 inches wide when the format size is optimized using height and width controls of the display module. When the format size is adjusted to those dimensions, the characters are 0.16 inch high by 0.12 inch wide with a spacing between characters of 0.08 inch and between lines of 0.10 inch.

Character composition

Figures 11A, 11B, 11C:
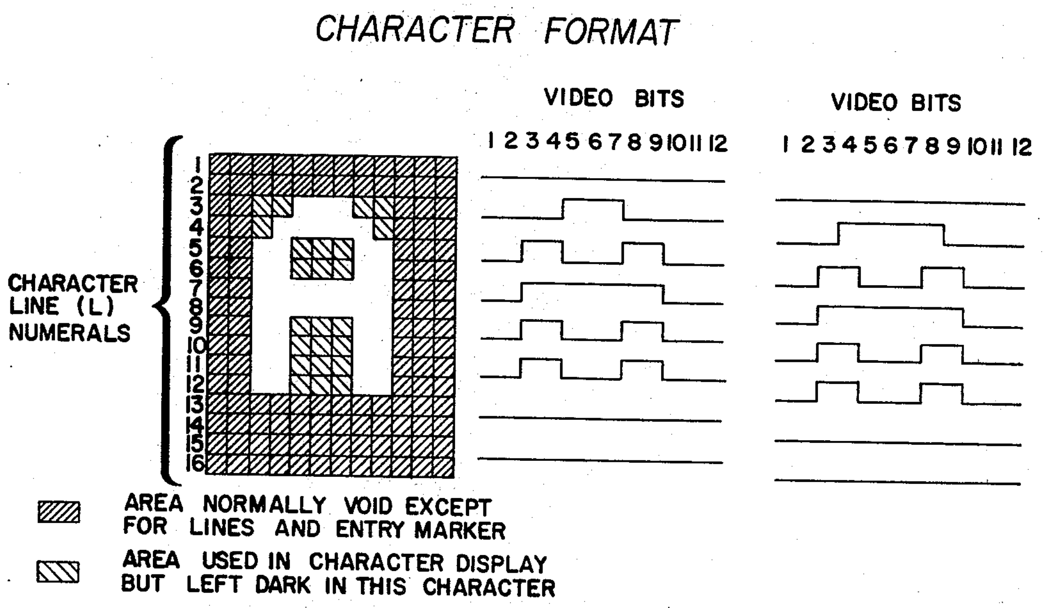
FIG. 11*a* is a picturial representation illustrating how the characters are formatted in the system shown in FIG. 1.
FIG. 11*b* illustrates diagrammatically the video signal representing a first portion of the character.
FIG. 11*c* illustrates diagrammatically the video signal representing a second portion of the character.

FIGURE 11*a* illustrates the technique by which each character position is generated in the television raster and particularly illustrates details of the generation of a letter A in the first character position of a display row on the TV monitor. Each character position has sixteen raster lines passing through it, and each raster line is divided into twelve individual picture segments. Each picture segment is capable of being intensified or not. In this way, any symbol which can be formed with a matrix of twelve-by-sixteen dots can be implemented. Due to the very small size of each picture segment (10–15 mils on a 14-inch television monitor), high quality symbols can be formed. Because the display unit is a standard television monitor, the CRT beam utilizes two passes to trace through all raster lines of each twelve-by-sixteen array of picture segments. Each such pass is referred to as a field. During the first field, all odd numbered lines of the raster are traced; during the second field, all even numbered lines are traced. Both fields taken together are referred to as one frame.

The waveforms shown in FIG. 11*b* are developed by the character generator 30 during eight memory "passes" of the first field with the uper waveform (corresponding to character line No. 1) being developed and each succeeding waveform on each subsequent pass during the first field. The correspondence between high level points on these waveforms and high intensity points on the CRT display is readily visible in the illustration. Similarly, the waveforms shown in FIG. 11*c* are developed during the second field memory passes 2112 microseconds later than those in FIG. 11*b*. The correspondence between high level in the waveforms and high intensity in the display is visible.

Figure 12:
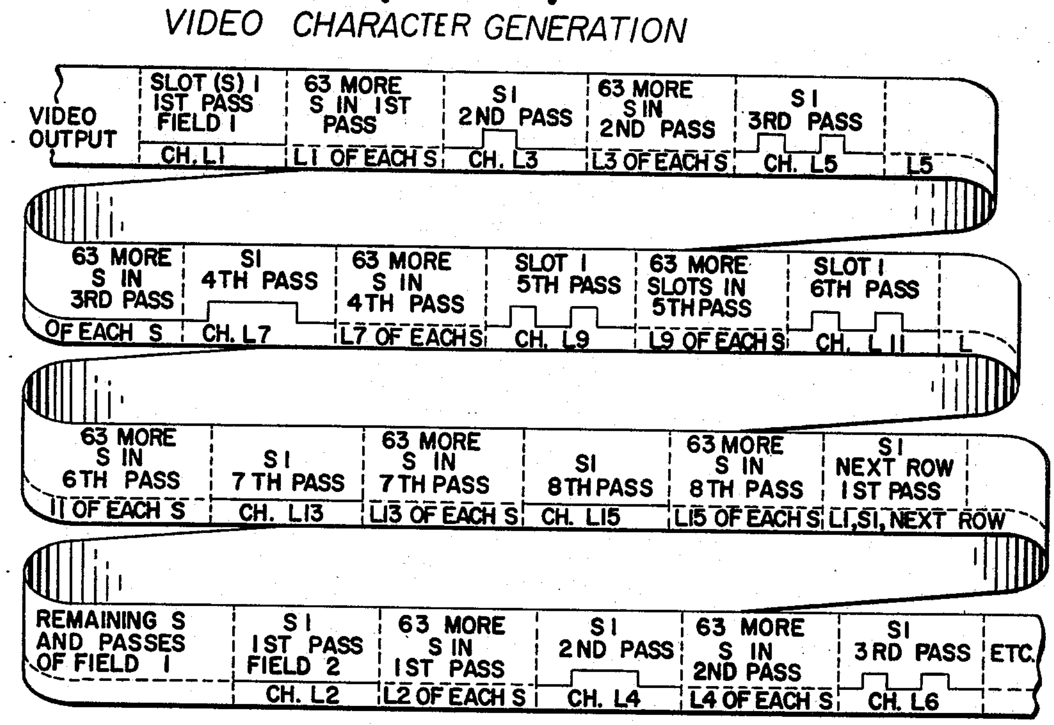
FIG. 12 illustrates diagrammatically a continuous time stream of video signals transmitted to the display monitor to form the character A.

FIGURE 12 illustrates how the waveforms of this single character A meshes into the continuous time stream of the video signal transmitted to the display monitor.

When the display presentation is in the form of a page of text, the twelve-by-sixteen picture matric contains those picture segments required to make the desired character shapes in the text plus the picture segments necessary for space between characters and space between rows of characters. The shaded picture segments in FIG. 11 indicate the area that is used by the alphabetics, numerics and punctuation marks.

It is noted that the shaded area of seven picture segments by ten raster lines is all that is required to make up the standard alphanumerics and punctuation marks. When it is desirable to present other special symbols such as horizontal and vertical lines, picture segments outside of the shaded areas are used. A horizontal and vertical line may be drawn through a sequence of adjacent character positions to illustrate lines across a portion or all of the display. The implementation of these symbols is accomplished by simply including them as part of the character repertoire of character generator 30. Horizontal and vertical lines drawn in this manner will appear as continuous unbroken lines across the display with no breaks at character position boundaries. The only discontinuities of a vertical line will be those due to the granularity of the television raster.

Figure 13:
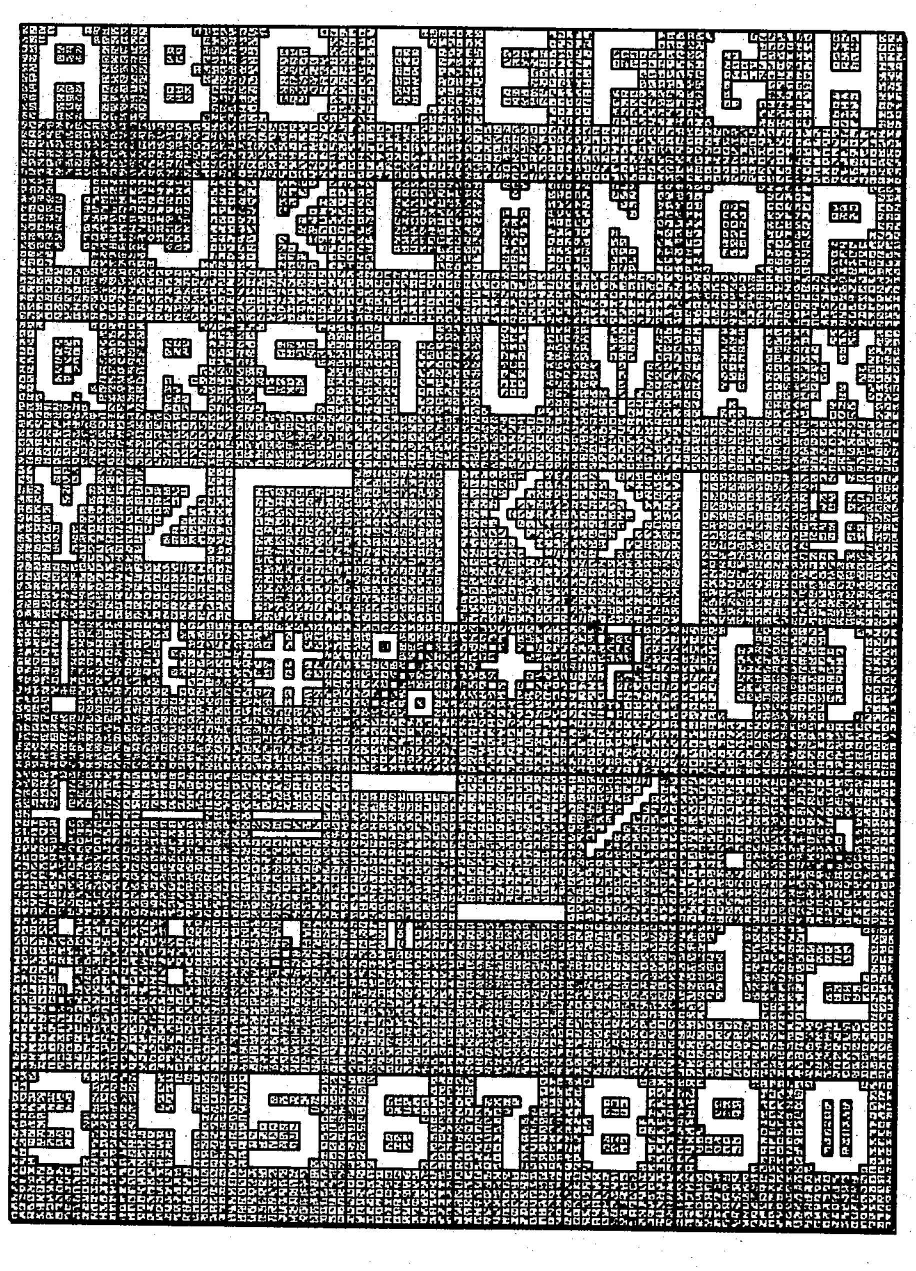
FIG. 13 illustrates a set of characters used in the data editing and display system disclosed.

FIGURE 13 illustrates an example of a set of characters using the technique described herein. It should be noted that the seven-by-ten area normally used for character definition is placed at the upper portion of the picture segment, i.e., the 10 rows of the picture start at row 1 and continue to row 10 of the picture segment. In FIG. 11*a*, the picture started with row 3. It should be recognized that the characters may be placed any place within the picture segment as more fully explained later.

As an illustration of the added capability offered by the use of horizontal and vertical line symbols, it should be noted that with only four special symbols, it is possible to display block diagrams, business tables, or bar charts. In addition, the vertical lines chosen in the illustration can be used to double as bracket symbols or absolute value signs.

It should be recognized that many other special symbols may be generated to allow the presentation of more complex displays, if desired.

A display status character and End of Text symbol may be utilized. The display status character indicates the state of operation of the terminal. In this disclosure, this character is located just above the 24th character position of the first line of text on the television monitor. The display status character symbology is as follows: A symbol T indicates the display terminal is operating in the transmit state. A flashing E in this character position indicates that an error condition was detected while receiving data, and no symbol appearing in this character location indicates that the display terminal is in a non-transmit state. The End of Text symbol C is located in the right-hand margin following the 46th text character position; however, it may be positioned at the end of any line on the display. When the display terminal is operating in the Memory Transmit state, the location of this symbol determines the last character on the display to be transmitted.

The display and editing system disclosed also provides a "blink" feature. This feature provides for blinking of one or a group of characters presented on the display and may be implemented by either of two techniques. The first technique is to reserve a unique character code which alerts character generator 30 of FIG. 1 so that the next character and all subsequent characters, until a space in the transmitted data is reached, are to be blinked. A second technique is to employ an extra "bit" along with each character code to indicate that this specific character is to be blinked on the display. The first technique will be explained more fully later.

The "blink" capability allows emergency or important conditions to be emphasized by flashing an important character or group of characters on the CRT of the display monitor 26. In the same way the "blink" capability is implemented, other means for emphasizing characters on the display are possible. For example, video intensity modulation techniques can be employed to allow more than one level of intensity for characters. To implement this, a set of character codes is reserved to represent a set of intensity levels. When any one of these particular codes are presented to the character generator 30, it sets a flip-flop in the character generator corresponding to that character code which when set causes all subsequent character information to take on a particular level of intensity. In this manner, a single character or a group of characters can appear at higher intensity while all other characters in the presentation appear at normal intensity.

Still another feature which may be implemented in the present invention is to produce underlining of data for emphasis where again the underlining would be triggered by a unique character code or "bit." In this case, the unique code or "bit" would be a control signal to character generator 30 to intensify raster lines twelve and thirteen during the display time of the character to be underlined. Implementation of underlining control will be more fully described hereinafter.

When data entry to the data editing and display system is made from a typewriter keyboard, an indication must be provided the TV monitor as to where the next character will be displayed. This indication takes the form of a special entry marker symbol which appears on the display as a horizontal line flashing at a seven and one-half cycle per second rate. The entry marker is flashed to make it easy for the operator to locate a particular position on a full page of displayed text. The implementation of this entry marker symbol is such that, as each character or symbol is typed through the keyboard to the display, the entry marker automatically indexes to the next character position. Implementation used for entry marker control will be more fully explained later.

A set of special commands to allow a keyboard operator or a computer program to manipulate the entry marker may be utilized in the present invention to make it a more useful device. These commands include means to Forward Space, Back Space, Carriage Return, Line Feed, Reverse Line Feed, etc., the entry marker. These same special commands may be utilized in the present invention by the communication data line as a control means to start loading new data into any arbitrarily desired memory location. Implementation of these commands will also be more fully described later.

DETAILED FUNCTIONAL ANALYSIS

Main Memory

Main memory storage is obtained through the use of wire sonic delay lines in which the data stream is presented by recirculation through a fixed-delay closed loop path. While it is feasible to use magnetic core or drum storage devices in practicing this invention, such use is avoided since drum storage devices are unstable and continuously speed up and slow down in a random manner producing a hunting characteristic unless controlled by special circuitry which compensates for this action. A magnetic core memory device may also be used; however, this type of device results in a much more expensive system.

Figure 14:
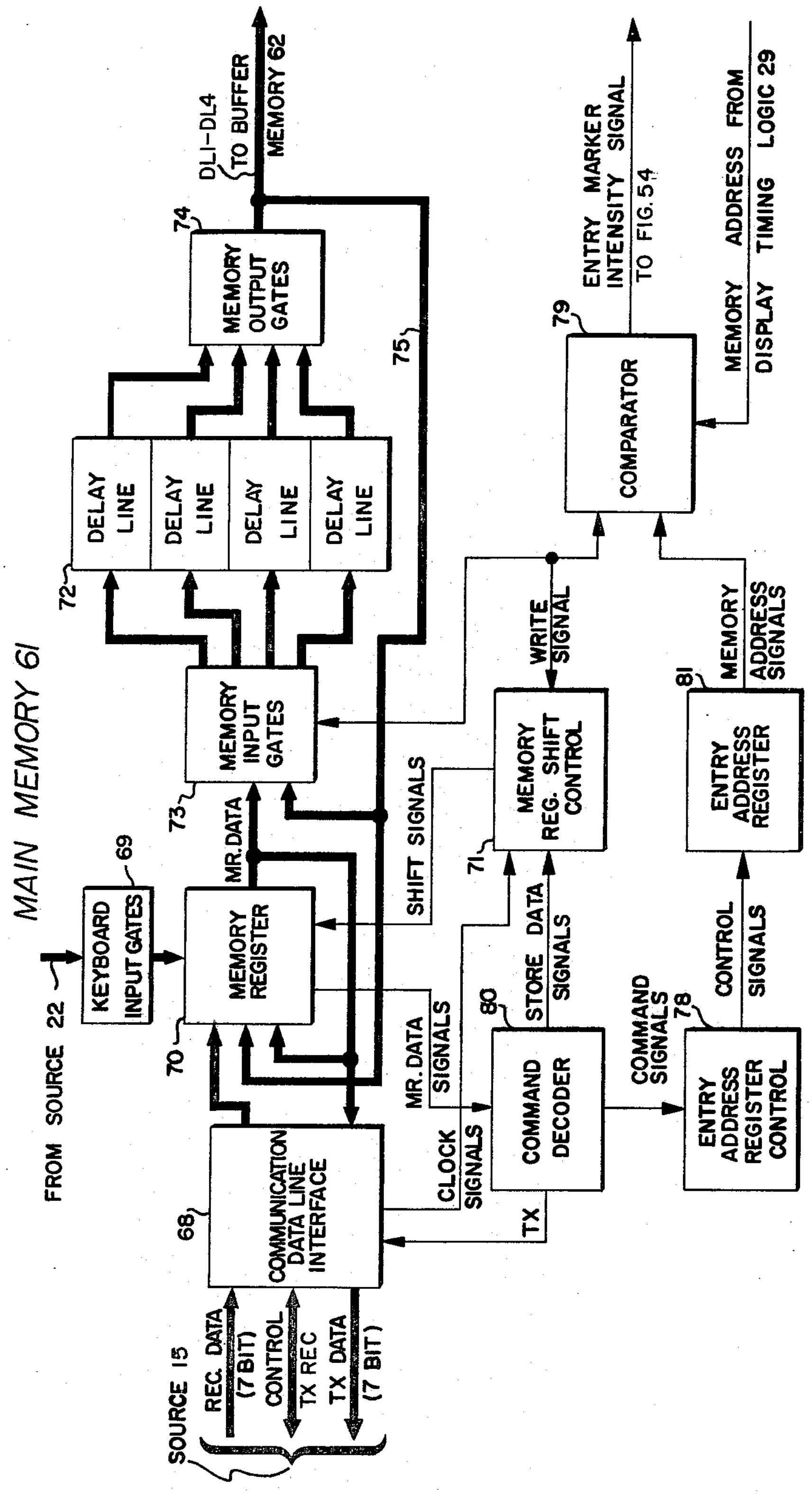
FIG. 14 illustrates in block diagram form details of the main memory shown in FIG. 10.

While wire sonic delay lines are relatively simple memory circuits, they do require precise timing to be able to recover data. This timing is provided by the memory control logic shown in FIG. 14. FIGURE 14 illustrates in block diagram form details of main memory 61 and its associated input data control logic. The input data control logic accepts binary data in character form from sources 15 or 22. As mentioned heretofore, each character stored in memory is made up of six binary bits, even though it is received by communication data line interface 68 from sources 15 and 22 in seven or eight binary bit form. Under these conditions, it is possible to store and display up to sixty-four print characters and provide up to sixty-four command codes for entry marker manipulation and data line control. The communication data line interface 68 can accept data and transmit data in seven bit character form to data communication line 16 associated with source 15. The details of conversion from a seven bit character to a six bit character and vice versa will be discussed in more detail later.

Keyboard input gates 69 accept data, parallelly in seven bit form from, for example, the keyboard of source 22. The keyboard input gates 69 transmit the data received to the data editing and display system, thereby eliminating the effect of contact bounce of the keyboard switch closures.

Memory register 70 is a 7 stage flip-flop shift register. It accepts data in parallel form from keyboard input gates 69 or serially bit by bit from the communication data line interface 68. Shift pulses generated by memory register shift control 71 shift incoming data transmitted from source 15 to the data communication line interface 68 through memory register 70. A counting clock mechanism in memory register shift control 71 is actuated by the receipt by communcation data line interface 68 of the start bit of the received data character. Once loaded, the memory register 70 is capable of transferring the data it has received to delay lines 72 by shifting the data bits serially through memory input gates 73 at given time intervals. Memory register 70 is also capable of receiving from memory output gates 74 a character code at a 6MC bit rate and transmitting each character at telephone data line speeds to the communication line 16 through the communication data line interface 68. Memory register 70 is further arranged to receive data when the data editing and display system is in the Keyboard Transmit mode, from the keyboard a character at a time, store in memory that character at a 6MC bit rate and then transmit it at telephone data line transmission rates to the communication line 16 of source 15 through the communication data line interface 68.

The delay line loop comprising memory input gates 73, delay lines 72 and memory output gates 74 continuously recycle information through data line 75 at a data bit rate of 6.08256 megacycles (hereafter referred to as 6MC).

It was necessary to select this particular clocking rate in order to cause the data editing and display system logic to operate in synchronism with the rate of change of the television frames. The delay line loop has a total delay time of 2.08333 milliseconds. Each delay line 72 is pulsed at 1.52064 megacycles (hereafter referred to as 1.5MC). The output 1.5 MC signals of each delay line is then logically combined in memory output gates 74 into one 6MC non-return to zero signal. This 6MC signal is then recirculated back to memory input gates 73, which divide this 6MC signal again into its four component 1.5MC signals which again drive each delay line. As long as clocking pulses are provided, data flows continuously around this delay loop in a cyclic manner. Thus, if a six bit character is shifted from memory register 70 into the delay line loop, it will remain in the loop recycling every 2.08333 milliseconds. It will continue to recycle until rewritten or erased. Since the effective data bit rate through the delay loop is 6MC, each character written into the loop will occupy approximately one microsecond of time. Thus, if a series of characters are written into the delay loop sequentially, each containing six data bits, 2112 characters can be retained in the delay line loop.

The main memory read/write control is implemented in a memory register shift control 71, an entry address register 78 and a comparator 79. This logic provides a number of different functions, namely, it determines where in memory the next character will be written and generates the shaft pulses which shift the data into memory register 70 and it generates an entry marker intensity signal which causes the entry marker to be displayed on the TV monitor indicating to the operator the position at which the next character entered will appear.

A command decoder 80 monitors all data passing through the memory register 70. When data to be stored in main memory 61 is received from either source 15 or 22, it is recognized by the command decoder 80 as a print character. The command decoder 80 then informs the memory register shift control 71 that data to be stored is present in the memory register 70. The memory register shift control 71 provides shift pulses causing the character to be stored in the proper location in memory. If the data accepted from either external source is not a data character to be stored, but is a command requiring the manipulation of the entry address register, then a control signal is sent by the command decoder 80 to the entry address register control 78 which causes the entry address stored in an entry address register 81 to be modified accordingly.

The entry adress register 81 is a flip-flop register which always contains the memory address corresponding to the entry marker position. Each time a new character is entered from source 15 or 22 to be stored in main memory 61, entry address register 81 is incremented by one. The memory address stored in the entry address register 81 is compared with a memory address generated in the display timing logic 29 by the comparator 79. This memory address from the display timing logic 29 is continuously changing in a binary sequence in synchronization with the movement of data through the delay line loop. That is, for each cycle of the memory loop, it counts from binary 0 to a maximum value of binary 2111. Each new memory address value corresponds to a single character location in the delay line loop. Thus, it can be seen that when no data is being entered into the main memory, the entry address register 81 retains a fixed binary value representing a memory address location which also corresponds to the entry marker position on the display.

This memory address in entry address register 81 is compared continuously with the memory address generated by the display timing logic 29 and during one particular character time interval of the memory cycle, a comparison will be made. A "Write" signal resulting from this comparison, which is made each memory cycle, is fed to the memory register shift control 71. This "Write" signal indicates to memory register shift control 71 that, if data is present, it is to be written into memory at this particular character interval. If data to be stored is present in memory register 70, memory register shift control 71 generates shift pulses which are transmitted to memory register 70 during this character interval, thus writing into memory the new data.

Communication data line interface

Figure 15:
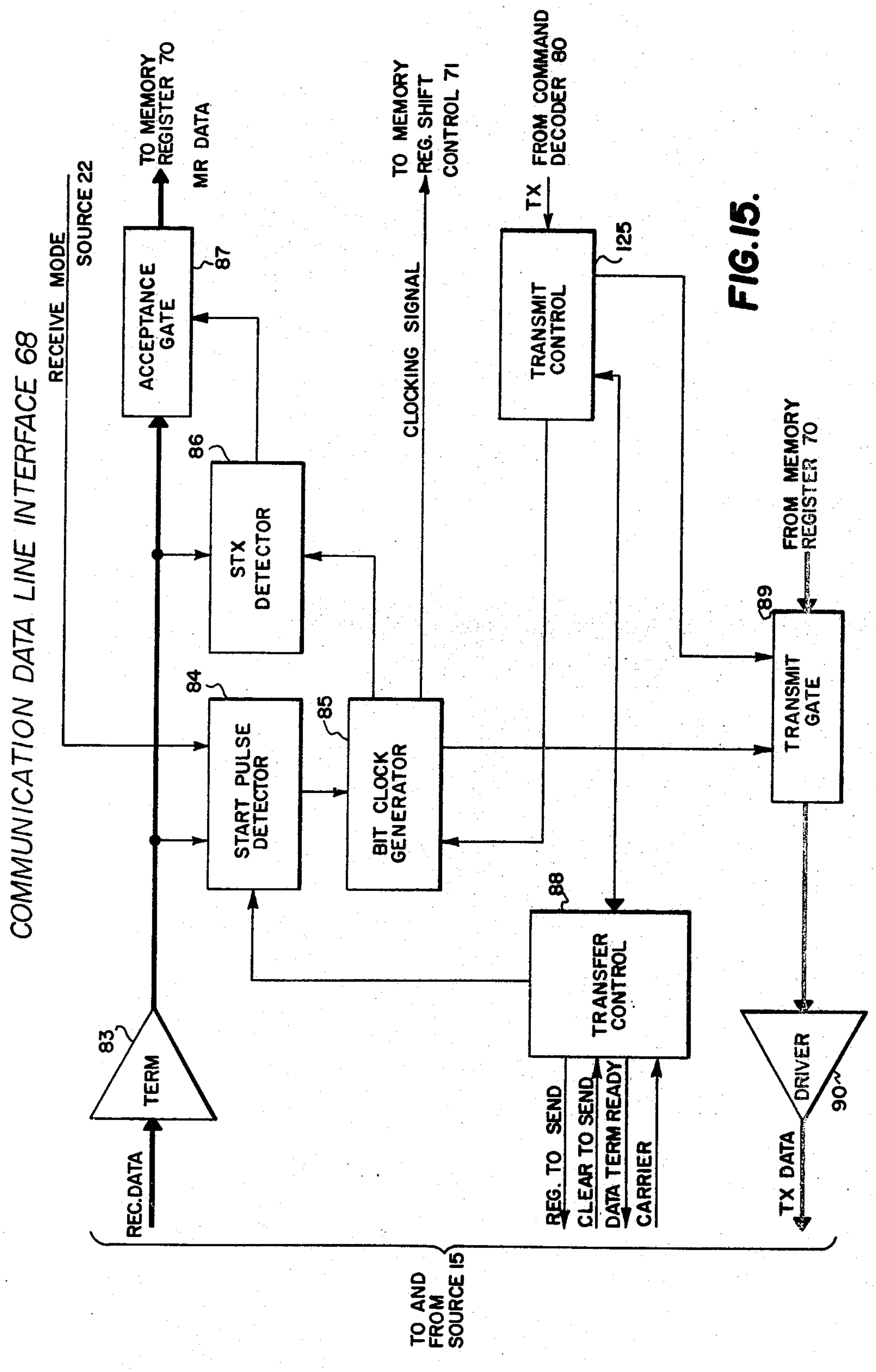
FIG. 15 illustrates in block diagram form details of the communication data line interface shown in FIG. 14.

FIGURE 15 shows in more detail the communication data line interface 68. Data from the communication line 16 is transmitted to a line terminator 83. The start pulse detector 84 determines when data is present and starts the bit clock generator 85. The bit clock generator 85 generates a series of pulses corresponding in time with each information bit of the received data and transmits a clocking signal to memory register shift control 71 which causes the memory register 70 to shift at the same bit rate as the received data.

The STX (Start of Text) detector 86 continuously monitors the output signals of terminator 83 for the particular signals representing the STX character. The STX detector 86 is a serial comparator which compares each bit of the received data with corresponding bit signals from the bit clock generator 85. When a bit by bit comparison is made indicating that the STX character has been received, the STX detector 86 transmits a signal to the acceptance gate 87 which allows the next character and any succeeding characters to pass to the memory register 70. All new character data from the communication line will be accepted until an ETX (End of Text) signal or code is received and detected by the command decoder 80. After the ETX code is detected, acceptance gate 87 is inhibited and will not accept any new data until another STX character is received from the communication line. This data acceptance criteria is used as a means of preventing noise signals on the communication line from activating the logic of main memory 61 when the communication line is idle and the communication data line interface 68 is in the receive data mode.

Transmission of data to communication line

Transmission of data to the data communication line may be accomplished by either of two means: (1) direct from the keyboard (Keyboard Transmit) associated with source 22, or (2) from main memory 61 (Memory Transmit).

Keyboard Transmit

To initiate the Keyboard Transmit state, the operator presses the STX key on the keyboard. This action enters the STX character through the keyboard input gates 69 into memory register 70. This character is recognized by command decoder 80 and a signal representing the STX character is transmitted to the communication data line interface 68. Transmit controller 88 of the communication data line interface 68 recognizes this character and establishes the Keyboard Transmit contdition. A signal is generated by the transmit controller 88 which starts the bit clock generator 85 which times the transmission of the STX character onto the communication line 16 through transmit gate 89 and driver 90. The parity bit of the outgoing character is generated by the transmit controller 88 and inserted into the data stream at its proper time. Subsequent characters and/or commands are entered into the data editing and display system by pressing the appropriate keys on the keyboard of source 22 and are timed onto the data communication line by the bit clock generator 85 with parity bits being generated and inserted into each character. The Keyboard Transmit state is terminated by the operator by pressing the ETX key on the keyboard or by other keyboard action.

Memory Transmit

To initiate the Memory Transmit state, the operator presses the TX key on the keyboard. This causes the TX character to be transmitted to the memory register 70 as heretofore explained. This character is recognized by the command decoder 80 and a signal is transmitted to the transmit controller 88 which recognizes this character and establishes a Memory Transmit condition. The transmit controller starts the bit clock generator 85 and data is transmitted to the data communication line in a manner similar to the Keyboard Transmit state with the exception that data is entered into the memory register 70 from the delay line memory of the data editing and display system. The Memory Transmit condition is terminated in a similar manner as the Keyboard Transmit condition except by different command signals.

Keyboard input gates

FIGURE 16 shows the details of the keyboard input gates 69. As shown in the figure, seven bits of data are entered in the data editing and display system by the keyboard. When the operator presses the STX key (or any other key on the keyboard), Mark and Space signals corresponding to the character represented by the key pressed are transmitted through lines 1 through 7 (called bits 1 through 7) to AND-gates 95*a* through 95*g* shown in FIG. 16. The AND-gates disclosed provide the logical operation of conjunction of binary 1 signals applied thereto. In the system disclosed, since the binary 1 is represented by a low level signal, the AND-gate provides a low level output signal representing a binary 1 when, and only when, all of the input signals applied thereto are low level signals and represent binary 1's.

At the same time that the Mark and Space signals corresponding to each character generated are being transmitted to AND-gates 95*a* through 95*g*, a timing pulse or signal is generated by the keyboard and transmitted to a monostable multivibrator 97.

Monostable multivibrator 97 is a circuit similar to the flip-flop circuit described differing only in that it operates in one stable state rather than two stable states. It transfers from its reset state in which it is normally operating to its set state upon the application of a trigger signal thereto. In its set state, the monostable multivibrator represents the binary 1 (1-state) and in the reset state, the binary 0 (0-state). The lead entering the left-hand side of the monostable multivibrator symbol shown in FIG. 16 provides the set input signal. When the set input signal goes to its low level or True condition, the monostable multivibrator is transferred to its 1-state. It will stay in this set state for a predetermined period of time depending on the time delay rating of the multivibrator and will then automatically return to its stable state (i.e., its reset state). Because the monostable multivibrator returns by itself to its reset state, no reset input is required. The period of time the multivibrator remains in its set state can be controlled by the selection of electronic components used to build the monostable multivibrator circuit. The multivibrator 97 delays the keyboard timing signal ten milliseconds. This delayed timing signal is then transmitted to a plurality of serially connected flip-flops 98, 99 and 100 which generate a signal which enables AND-gates 95*a* through 95*g* shown in FIG. 16. The ten millisecond delay is provided to allow time for the keyboard contacts to stop bouncing before the AND-gates are enabled for transferring the bits of the character to memory register 70.

More particularly, multivibrator 97 generates an output signal ten milliseconds after it is energized which signal is applied to the triggering terminal of flip-flop 98. Since the set (S) input terminal of flip-flop 98 is held at a relatively high potential while the clear input terminal (C) is grounded, flip-flop 98 will clear when an output signal is generated by multivibrator 97. The output signal from the 0-output terminal of flip-flop 98 is then transmitted to the clear (C) input terminal of flip-flop 99. Flip-flop 99 will be cleared following the falling edge of the following 1MC pulse of the clock generator 30, which in turn will clear flip-flop 100 when the falling edge of the next 1MC clock pulse occurs. The clearing of flip-flop 100 will cause the presetting of flip-flop 98 as can be seen from FIG. 16. A high level signal on the preset input terminal P of flip-flop 98 causes it to transfer to its 1-state. When the third falling edge of the 1MC clock pulse occurs after the multivibrator output signal has been generated, flip-flops 99 and 100 will have been cleared and flip-flop 98 will have been set. Therefore, with the falling edge of the third 1MC clock pulse signal, flip-flops 99 and 100 will set since the set input terminals S of both of these flip-flops are connected to the 0-output terminal of flip-flops 99 and 100. The relatively high output signal of the 1-output terminal of flip-flop 100 will be inverted by inverter 101 and the resulting relatively low potential signal will be applied to AND-gates 95*a*–95*g* causing conduction therein resulting in the transferring of the data character to memory register 70.

The character stored in the memory register is then decoded by the command decoder 80 exactly as it does during the data receive condition heretofore explained. Immediately after this decoding process, the contents of the memory register 70 are transferred through the memory input gates 73 into the delay lines 72 if a data character is present or executed if a command is present.

Memory register

Memory register 70 is shown in more detail in FIG. 17. This figure illustrates how the seven bits of a data character are transferred from the keyboard input AND-gates 95*a*–95*g*, shown in FIG. 16, to the preset input terminals (P) of each of the flip-flops 105–111 of memory register 70. Flip-flop 105 is also arranged to receive information signals REC. DATA and $\overline{\text{REC.}}$ $\overline{\text{DATA}}$ from the communication data line interface 68. When data is received from the communication data line interface 68, signals SFT7 are generated by the memory register shift control 71 which shifts the data bits received from the communication data line interface 68 into flip-flop 105 and causes the data to flow bit serially through flip-flop 105 to flip-flop 106 via AND-gate 112 and OR-gate 113 to the set input terminal of flip-flop 106, or through AND-gate 114 and OR-gate 115 to the clear input terminal of flip-flop 106.

The OR-gates disclosed in FIG. 17 provide the logical operation of inclusive-OR for binary 1 input signals applied thereto. In the system, since the binary 1 is represented by a low level voltage signal, the OR-gate provides a low level output signal representing a binary 1 when any one or more of the input signals applied thereto is low level and represents binary 1's.

Each stage of the memory register 70 drives the next succeeding stage in a shift register fashion. Data is read in from the communication data line interface 68 at communication data line speed. The shifting of flip-flops 105 through 111 is controlled by memory register shift control 71 during data reception from the communication data line interface 68. While operating in this mode, all other AND-gates 116, 117, 118, and 119 to the memory register 70 are inhibited by the appropriate control signals shown.

When the system is operating in the Memory Transmit mode, it transfers data a character at a time from main memory delay lines 72 through the memory register 70 to the communication data line interface 68. When in this mode of operation, the memory register 70 accepts data transferred from the delay lines 72 in bit serial form through gates 116, 113, 118 and 115 to flip-flop 106. Since only six bit characters are stored in the delay lines, only the six flip-flops 106 through 111 are used to read each character. However, since data transmission to the communication line 16 must contain seven data bits, the seventh data bit must be recovered.

In the system disclosed, the coding was chosen such that bit 7 is always equal to the one's complement of bit 6 for all characters that can be stored. See coding table in FIG. 2. This is possible since only print characters can be stored. This is accomplished by connecting the 0-output terminal of flip-flop 106 through AND-gate 120 and OR-gate 121 to the preset input terminal P of flip-flop 105 to accomplish this transfer. The recovery of bit 7 is accomplished each time a chaarcter has been read from memory during the Memory Transmit mode under control of the AFT. READ signal transmitted to AND-gate 120 by the memory register shift control 71.

Initiation of the Memory Transmit mode is accomplished by depressing a special key on the keyboard. This action activates the transmit control logic 125 of FIG. 15 which starts the previously described action of the memory register 70 and its associated control logic. The first character to be read from the delay lines will be the character stored in the memory location corresponding to the address stored in the entry address register 81. In terms of the display, the first character transmitted will be the one under the entry marker symbol. Each time a character is read from the delay lines of main memory 61 to be transmitted to the display module, the address location stored in the entry address register is incremented by one. In this manner, characters are taken from memory sequentially in accordance with the way they are displayed. Once memory transmission is started, it will continue, until the command decoder 89 detects the presence of an ETX (End of Text) signal passing through memory register 70 from the delay lines 72.

It should be noted that, in the Memory Transmit mode, after each character is read from the delay lines, the memory address stored in the entry address register 81 is incremented by one. Since the entry marker position on the display module CRT screen corresponds to the entry address stored, the entry marker will move across the page of the text displayed on the screen. Further, the entry marker will move to the next character position following the ETX signal. This marker movement provides a feedback to the operator that transmission is really taking place when he depresses the transmit key on the keyboard. However, more important is the fact that this characteristic allows the easy implementation of "tabbing" the entry marker.

"Tabbing" the entry marker allows the operator to move his entry marker to a new, predetermined position rapidly by activating a single key on the keyboard. "Tabbing," as described herein, is very similar to the "tab" feature on an office typewriter. This "tab" capability is implemented using the same Memory Transmit logic described above with two exceptions. When the "tab" signal is received from the keyboard, the logic used for Memory Transmit is activated but the transmit gate 126 shown in FIG. 15 is not enabled and instead of the entry marker stopping upon detection of the ETX signal from main memory 61, it stops when a vertical line signal is reached. Therefore, when the keyboard operator depresses the "tab" key, the entry marker on the display will move from its present position to the character position following the next vertical line symbol displayed. Since the vertical line codes can be stored anywhere in memory from either the keyboard or the communication line, a set of "tab" stops can be arranged in any desired fashion on the display page. As an example, in a display where the data is arranged in columns, the vertical line symbols may be used to separate the columns. In this example, if the operator wished to modify only data appearing in a certain column, he may rapidly position the entry marker to that column using the "tab" capability.

Input AND-gates 117 and 118 of FIG. 17 are used to recirculate data in the memory register 70. Recirculation of data in the memory register is required during the Keyboard Transmit mode. During this mode of operation, a character code received from the keyboard must be stored in the delay lines of the main memory, retained in the memory register after storing in memory, and then transmitted to the communication data line interface 68.

Whenever a non-data character, such as a command, is loaded into memory register 70 to be stored or transmitted, a means must be provided to clear the memory register 70. A clear signal from memory register shift control 71 is transmitted to OR-gate 115. Conjunction occurs in OR-gate 115 and an output signal is then applied to the clear input terminal C of the flip-flop 106 of memory register 70. This signal is circulated through the register causing all zeros to be loaded into the memory register.

Command decoder

Figure 18:
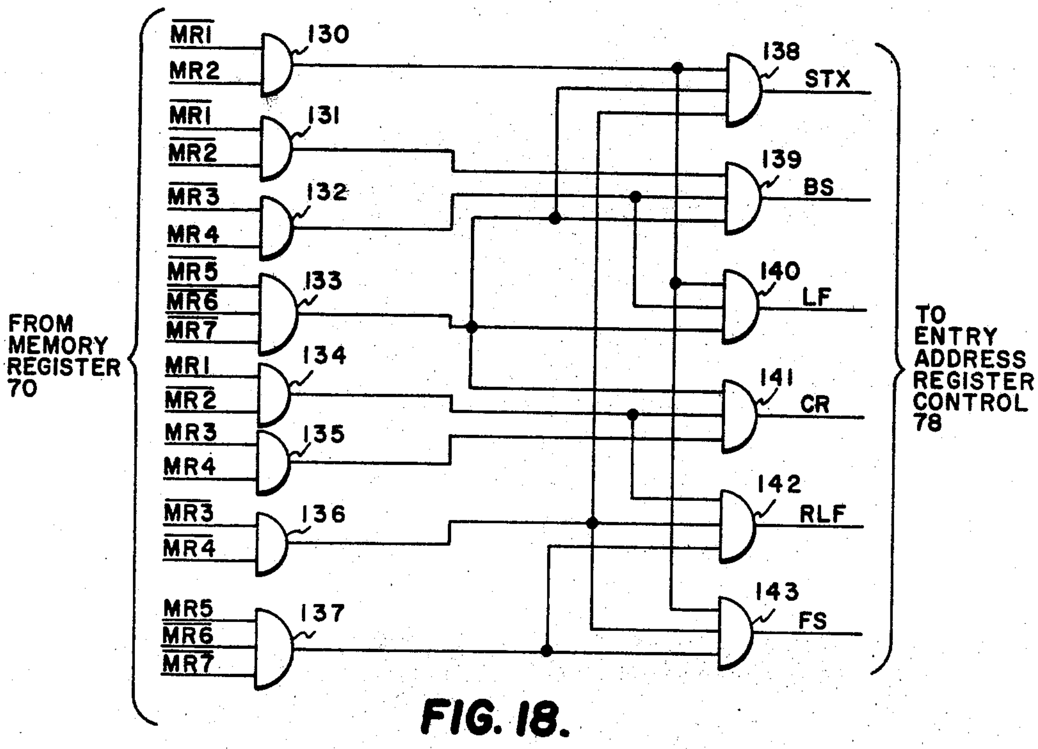
FIG. 18 illustrates in more detail a part of the command decoder shown in FIG. 14.

Memory register 70 is monitored by the command decoder 80. FIGURE 18 illustrates a portion of the logic of this structure which monitors both the 1-output and the 0-output terminals of each stage of the memory register. The command decoder decodes the signals stored in the memory register into a number of command signals. That portion of the command decoder logic which decodes the commands STX (Start of Text), BS (Back Space), LF (Line Feed), CR (Carriage Return), RLF (Reverse Line Feed) and FS (Forward Space) is shown in FIG. 18. The output signals of the command decoder 80 are supplied to the entry address register control 78 shown in detail in FIG. 19.

In FIG. 18, the 1-output terminal signals MR1–MR6 or the inverted images thereof of each of the flip-flops of the memory register are applied to AND-gates 130–137 as shown. Conjunction occurs in these AND-gates when all of the input signals to the respective gates are True or at a low level. The output signals of these various AND-gates are applied to AND-gates 138–143 as shown. Conjunction in these latter gates results in the output signals identified by the code names shown.

Entry address register control

The entry address register control 78 performs the commands which require manipulation of the entry marker and comprises a 4-stage counter 146. The output signals of this counter are decoded by a shift pulse decoder 147 into five different shift pulses SP1, SP3, SP4, SP6 and SP7 and a shift pulse clock signal which enables the entry address register 81. The entry address stored in the entry address register 81 is then shifted through the adder/subtracter 148.

An adder/subtracter control 149 causes the adder/subtracter 148 to add or subtract a binary 1 or a binary 64 to the contents of the entry address register 81 depending on the command received from the command decoder shown in FIG. 18. The addition or subtraction is accomplished while the contents of the entry address register 81 are shifted through the adder/subtracter 148.

Commands such as Carriage Return or Page Return cause control signals to be generated in the adder/subtracter control 149 which are transmitted to a plurality of flip-flops in the entry address register 81 to preset them to their 1-states. If the Carriage Return code is detected by adder/subtracter control 149, only six flip-flops of the entry address register 81 corresponding to the character position of the entry address register 81 are preset to their 1-states.

4 stage counter

Figure 19:
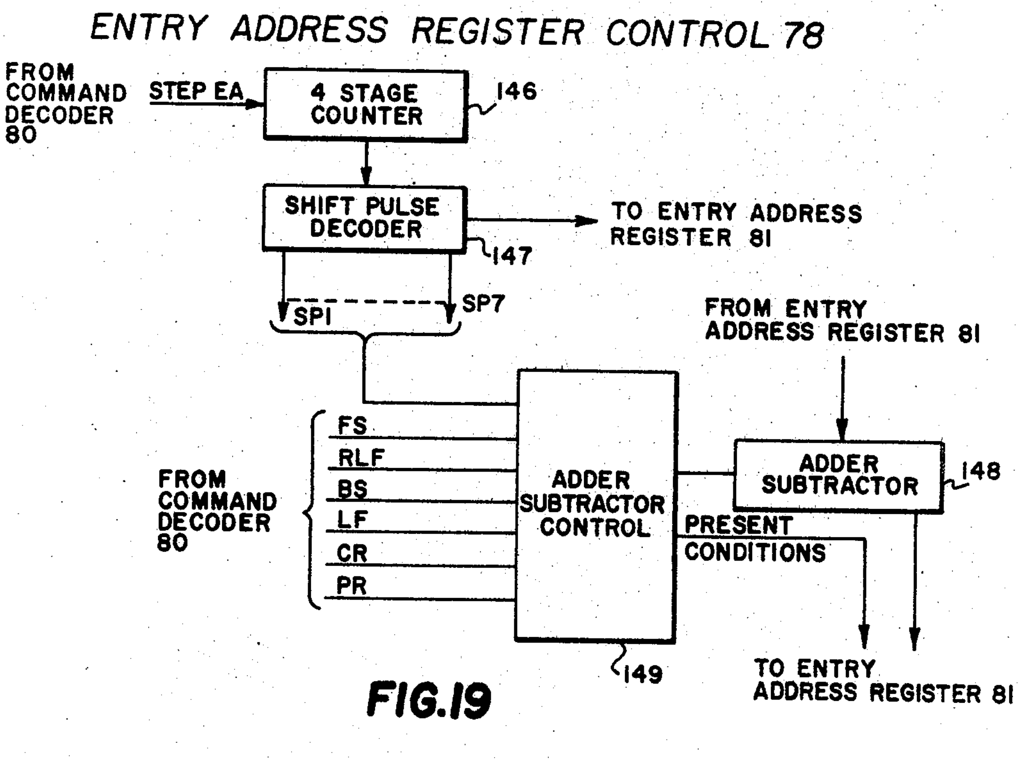
FIG. 19 illustrates in block diagram form the entry address register control shown in FIG. 14.
Figures 20, 21:
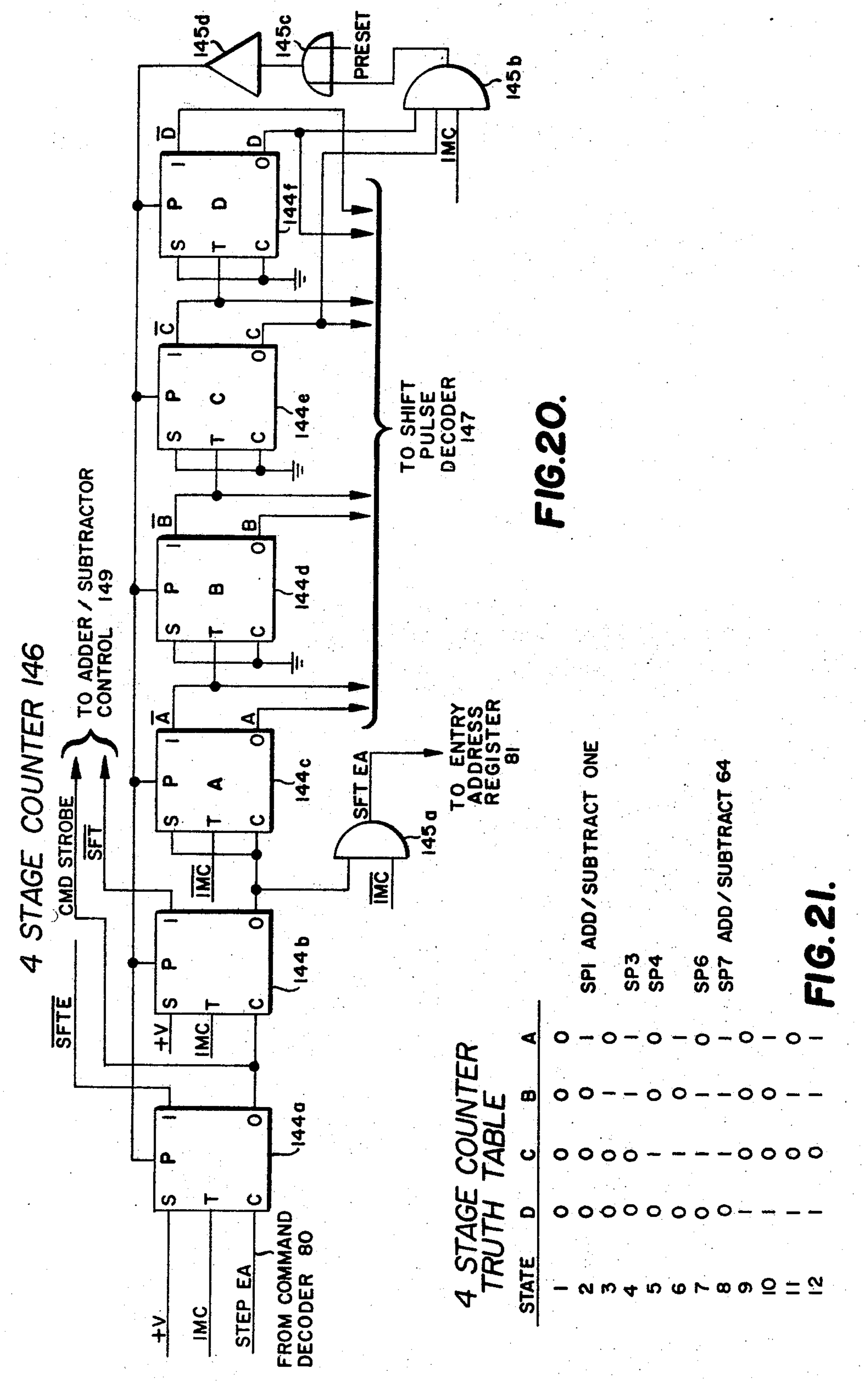
FIG. 20 illustrates in more detail the 4 stage counter shown in FIG. 19.
FIG. 21 is a chart illustrating a truth table for the 4 stage counter shown in FIGS. 19 and 20.

FIGURE 20 is a simplified logic diagram of the 4 stage counter 146 shown in FIG. 19. Counter 146 produces the SFT EA signals which shift the contents of the entry address register 81 shown in FIG. 19 through the adder/subtracter 148. This counter also generates the CMD STROBE and $\overline{\text{SFT}}$ control signals for incrementing or decrementing the values stored in the entry address register 81. The 4 stage counter comprises a plurality of flip-flops **144*a*–144*f* logically interconnected as shown in FIG. 20 with flip-flops 144*c*–144*f* serving as the 4 stage counting elements. Counter 146 counts through the twelve states shown in the truth table illustrated in FIG. 21 each time the 4 stage counter is energized. The counter is energized and the shift sequence initiated when the STEP EA signal goes True. The STEP EA signal is a command generated in the memory register shift control 71** and is generated by the termination of a Read or Write signal but may also be generated by other events. Recognition of a Line Feed (LF) command (either Forward or Reverse) will generate a STEP EA True signal regardless of other events.

Figure 22:
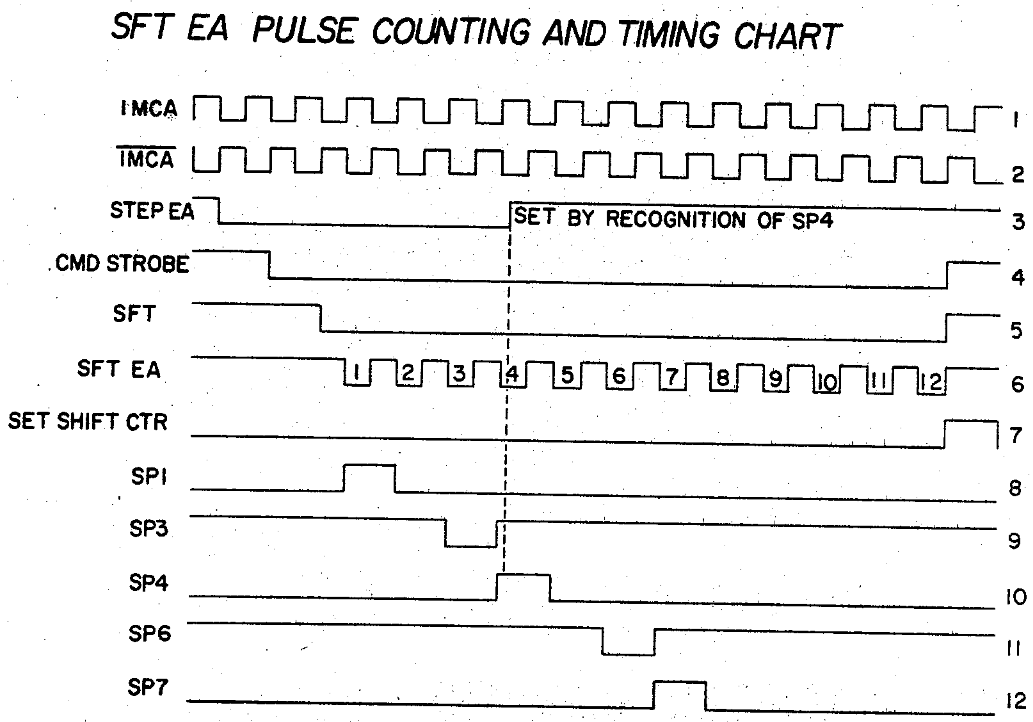
FIG. 22 is a timing diagram illustrating the relationship of the various signals generated by the 4 stage counter shown in FIGS. 19 and 20.

FIGURE 22 illustrates a pulse counting and timing chart for the SFT EA signals. When signal STEP EA goes True, (waveform 3, FIG. 22), it resets flip-flop **114*a* of FIG. 20 at the time of the next 1MC clock pulse. The normal state of flip-flop 144*a* is set, transferred to that state by power turn-on (PRESET) or by the 12th shift pulse of the preceding sequence of the 4 stage counter 146**.

When flip-flop **144*a* is cleared, the CMD STROBE signal is generated when its 0-output terminal is True (see waveform 4 of the timing chart). Since the 0-output terminal of flip-flop 144***a* is connected to the clear input terminal of flip-flop 144*b*, flip-flop 144*b* is reset upon the receipt of the next 1MC clock pulse at its trigger terminal T. When flip-flop 144*b* is reset, the SFT signal is True (waveform 5 of the timing chart) and that portion of the shift counter comprising flip-flops 144*c*, 144*d*, 144*e* and 144*f* is enabled to begin the counting sequence. The $\overline{\text{SFT}}$ signal generated by the 1-output terminal of flip-flop 144*b* is transmitted to other portions of the data editing and display system to indicate the presence or absence of the entry address (EA) shift sequence, thus interlocking this sequence with other circuit functions.

The 0-output terminal signal SFT from flip-flop 144*b* is combined with the $\overline{\text{1MC}}$ clock signal (waveform 2 of the timing chart) in AND-gate 145 resulting in conjunction therein and the generation of the SFT EA pulse (waveform 6 of the timing chart), with each pulse lasting for one-half microsecond. These pulses advance in time sequence the entry address register 81.

Figure 23:
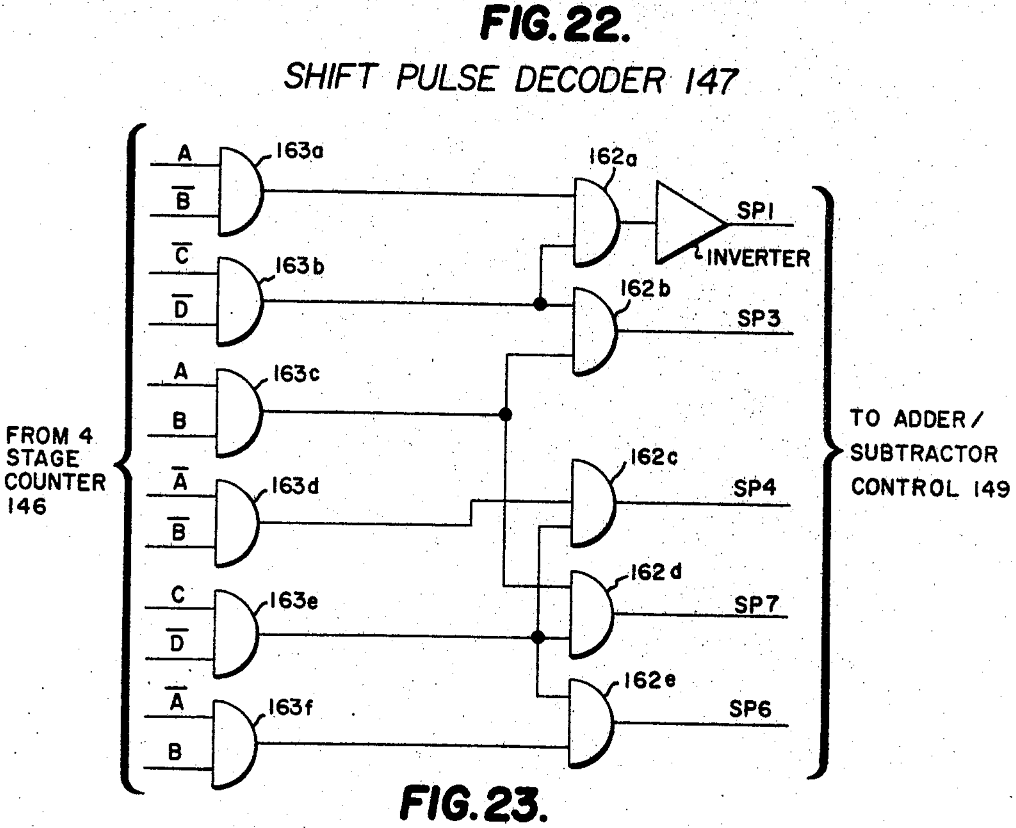
FIG. 23 illustrates in logic diagram form the shift pulse decoder shown in FIG. 19.

The 4 stage counter 146 also counts cycles of the $\overline{\text{1MC}}$ clock pulses and its count is sensed by a plurality of output gates shown in FIG. 23 which provide signals representing counts 1, 3, 4, 6 and 7.

When counter 146 reaches a count of 12, conjunction occurs in AND-gate 145*b* resulting in the generation of an output signal which is applied through OR-gates 145*c* and 145*d* to the preset terminals of flip-flops 144*a*–144*f* causing the counter flip-flops 144*c*–144*f* and flip-flops 144*a* and 144*b* unconditionally to preset to their 1-states.

The waveforms in lines 8 through 12 of FIG. 22 illustrate the timing relationship of signals SP1, SP3, SP4, SP6 and SP7 which are generated by the shift pulse decoder 147 shown in FIG. 23.

Shift pulse decoder

FIGURE 23 illustrates in detail the logic circuitry of shift pulse decoder 147 with the output signals from AND-gates 162*a*–162*e*, namely, signals SP1, SP3, SP4, SP6 and SP7 being used in the generation of ADD/SUBTRACT commands by the adder/subtractor control 149. These signals are the result of conjunction occurring therein of the various output signals from AND-gates 163*a*–163*f*. The inputs signals to AND-gates 163*a*–163*f* are the signals from the 1- and 0-output terminals of flip-flops 144*c*–144*f* shown in FIG. 20 and forming the 4 stage counter 146. As seen in FIG. 23, the shift pulse decoder 147 is simply a four bit decoder which decodes flip-flops 144*c*, 144*d*, 144*e* and 144*f* at appropriate times.

Adder/subtracter control

Adder/subtracter commands are generated by any command code (except CR, PR, or TAB signals) which generate movement of the entry marker on the display, i.e., by FS, BS, LF, or RLF signals. These signals are generated by the entry of any character code into the memory of the data editing and display system unless inhibited by a clear or erase internal command.

The movement commands are detected in the memory register 70 by the command decoder 80 as described hereinbefore, with reference to FIG. 14, and are then applied to various control gates to define the distance of movement (space or line) and the direction to be moved (Forward or Reverse) of the entry marker on the display.

Figure 24:
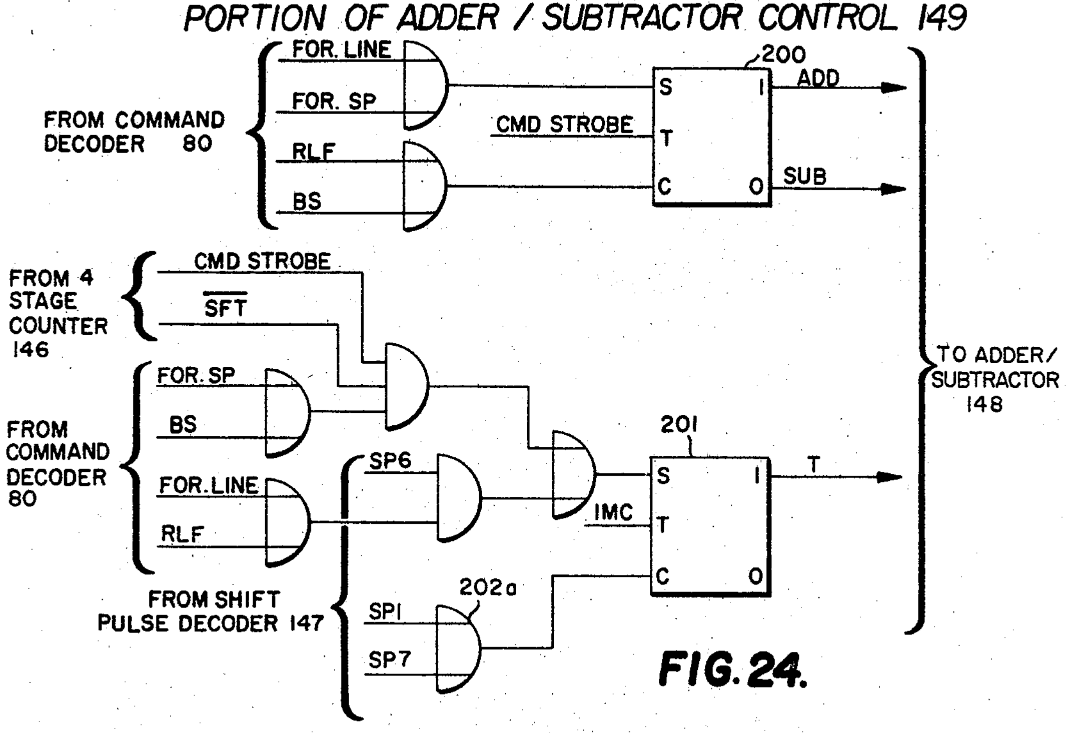
FIG. 24 illustrates in more detail the logic circuitry forming a part of the adder/subtracter control shown in FIG. 19.

Flip-flops 200 and 201 are set or reset as indicated by the logic circuitry shown in FIG. 24. The CMD STROBE signal transmitted to the trigger terminal of flip-flop 200 performs the set or reset action of this flip-flop, according to the input terminal enabled. Flip-flop 201 is triggered by a 1MC clock pulse. If flip-flop 201 is set at the time a CMD STROBE signal is applied to flip-flop 200, it is reset at the time the SP1 signal is transmitted through OR-gate 202*a* to the C terminal of the flip-flop 201 to reset it. If flip-flop 201 is set at the time of the generation of the SP6 signal, it is reset by the SP7 signal through OR-gate 202*a*. Thus, flip-flop 201 is normally in its reset state. When it is in its set condition, a digit is to be added into the entry address register 81.

Figure 25:
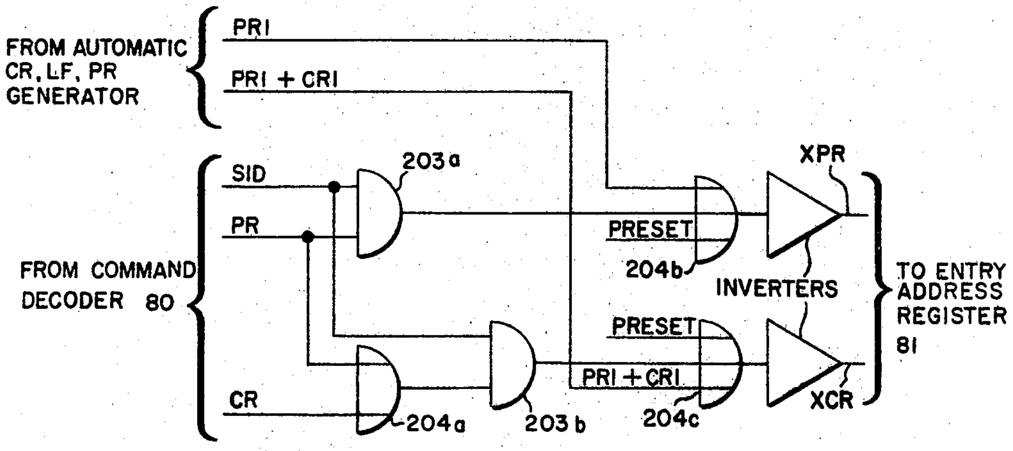
FIG. 25 illustrates the preset logic for the entry address register shown in FIG. 19.
Figure 30:
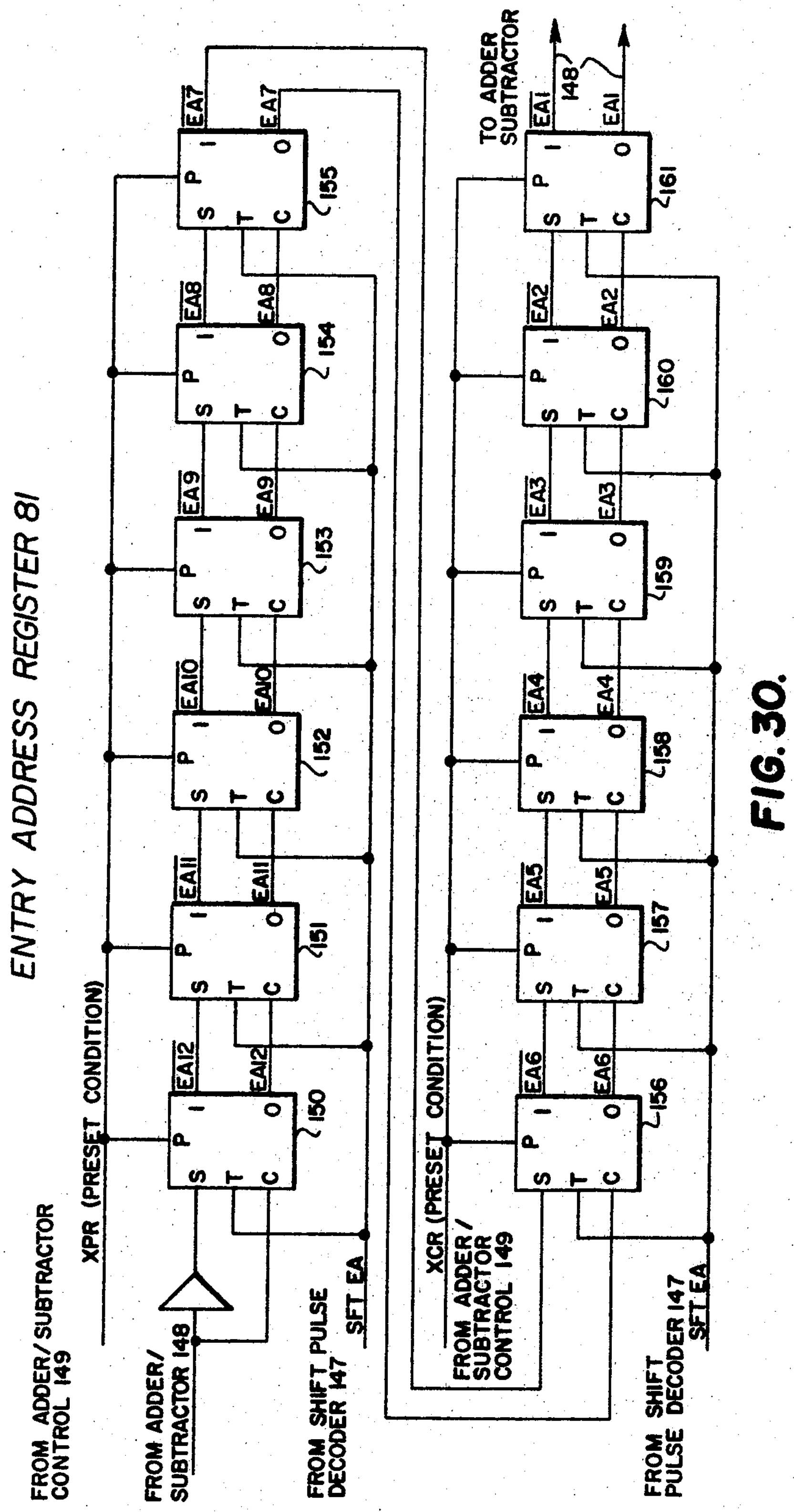
FIG. 30 illustrates in detail the logic circuitry of the entry address register shown in FIG. 21.

FIGURE 25 is a detailed diagram of the entry address register preset logic which is a part of the adder/subtracter control 149. Movement command signals CR (Carriage Return) and PR (Page Return) do not affect conditions in the adder/subtracter flip-flops 200 and 201. Instead, these commands are applied to AND-gates 203*a* and 203*b* and OR-gates 204*a*, 204*b* and 204*c* of FIG. 25. This logic develops XPR and XCR signals used in the entry address logic shown in FIG. 30. When the XPR signal is True, flip-flops 150–161 of FIG. 30 are unconditionally set to their 1-states and when signal XCR is True, the entire entry address register is set to its "0" state. This is the arbitrary starting point to which all display and memory positions are referenced. In addition to being detected as command codes, the CR, PR, and LF signals will be generated automatically at the end of each display line or page (as applicable). While this action is not, strictly speaking, a function of the entry address register control 78, it is so closely allied that it is discussed at this point.

Figure 26:
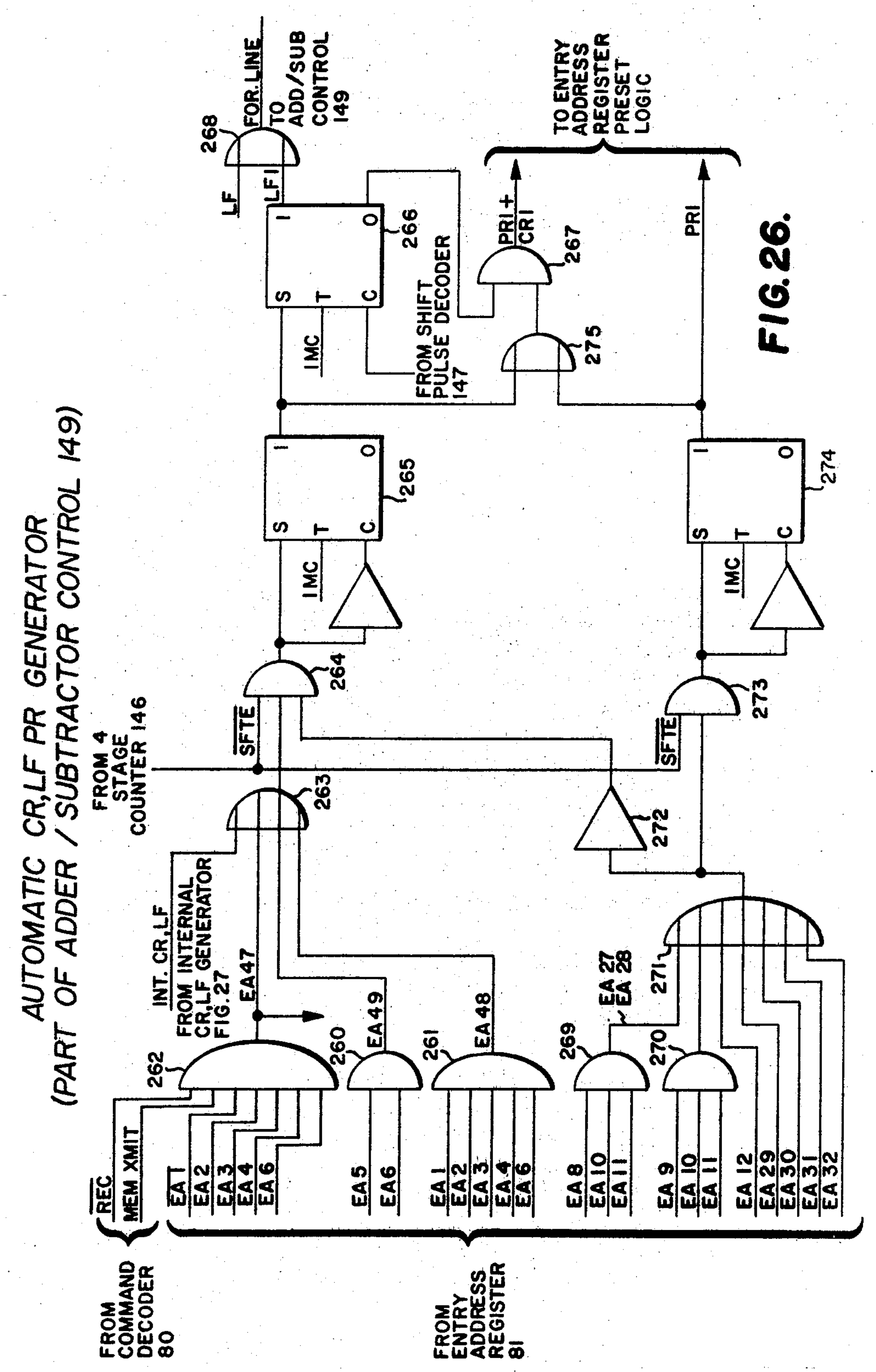
FIG. 26 illustrates in detail the logic circuitry of the automatic CR, LF and PR signal generator.

With reference to FIG. 26, it is noted that when the system is operating in any mode other than the Receive or Memory Transmit mode, slot counts of a data memory row equal to or greater than 47 generate an automatic CR, LF sequence of signals; similarly, row counts equal to or greater than 27 generate a CR, PR sequence of signals. The term slot as used herein is defined as a memory location capable of storing six bits of information. When in the Receive mode, a different CR, LF sequence of signals is generated which first senses whether the signal for slot 47 is representative of a print character or a command and, if a command, executes the command. Similarly, in Memory Transmit mode, the signal for slot 47 is first examined to determine whether it is an ETX signal or a space signal, and the CR, LF sequence of signals is then generated during slot count 48.

Generally, CR, LF sequence of signals, when not in the Receive or Transmit modes of operation, begins with the sensing of a set or True condition in flip-flops 157 and 156 of the entry address register shown in FIG. 30. Signals EA5 and EA6 from flip-flops 157 and 156 are applied as input signals to AND-gate 260 causing conjunction therein and producing an output signal indicating an entry address equal to or greater than 49. As shown in FIG. 26, conjunction occurs in AND-gate 261, upon a True signal being generated by the set conditions of flip-flops 161, 160, 159, 158 and 156. The resulting output signal indicates an entry address slot count of 48. When the input signals to AND-gate 262 are all True indicating a set condition in flip-flops 160, 159, 158, 156 and a False condition in flip-flop 161, an entry address slot count of 47 is indicated.

The output signals of AND-gates 260, 261 and 262 are applied to the input terminals of OR-gate 263. If the row count is less than 26, and no shift of the entry address register is in progress, the output signal of this composite gating arrangement passes through AND-gate 264 to enable setting of flip-flop 265. Flip-flop 266 is reset as a result of an SP6 signal (an earlier condition), and with flip-flop 265 set and flip-flop 266 reset, AND-gate 267 is enabled to generate, upon conjunction therein, a True PR1+CR1 signal. This signal, when transmitted through OR-gate 204*c* of the entry address register preset logic shown in FIG. 25 causing the XCR signal to go True, thereby executes the Carriage Return function by setting the low-order six flip-flops of the entry address register, shown in FIG. 30, to zero. This action enables AND-gate 264 and then flip-flop 265. Flip-flop 265 is then reset on the next 1MC clock signal. On this same 1MC clock signal, flip-flop 266 is toggled from its previous reset condition, to its set condition, thereby causing its 1-output signal LF1 to go True. The LF1 signal is then applied as an input signal to OR-gate 268 and upon conjunction occurring therein causes its output signal FOR. LINE to go True.

If the row count is equal to or greater than 27, this condition is sensed by AND-gate 269, which produces a True output signal if its input signals from flip-flops 154, 152 and 151 of the entry address register are True (rows 27, 28). If the input signals from flip-flops 153, 152 and 151 are True (rows 29–32), conjunction will occur in AND-gate 270. These output signals, together with a True output signal EA12 from the 0-output terminal of flip-flop 161 of the entry address register shown in FIG. 30, are applied to the input terminals of OR-gate 271.

A True output signal from OR-gate 271, resulting from the application of the output signals of AND-gates 269 or 270 or the EA12 signal from flip-flop 150 of FIG. 30, is inverted in inverter 272 and the resulting signal is transmitted to AND-gate 264 to inhibit it and prevent the CR, LF sequence of signals from occurring. The output signal from OR-gate 271 is also transmitted to one of the input terminals of AND-gate 273 which has been enabled by the $\overline{\text{SFTE}}$ signal causing conjunction therein and the setting of flip-flop 274 by the following 1MC clock pulse. When flip-flop 274 is set, its 1-output terminal signal PR1 goes True. The PR1 signal is applied to the input terminal of OR-gate **204*b*, in FIG. 24, causing its output signal to go to its True state, thereby setting the high order six bits of the entry address register to an all zero count. The PR1 signal and the 1-output terminal signal of flip-flop 265, in FIG. 26, are transmitted through OR-gate 275 to the input terminal of AND-gate 267. Since flip-flop 266 is in its reset state, AND-gate 267 will be enabled and an output PR1+CR1 signal will be generated. This signal sets the low-order six bits of the entry address register 81 to a zero count, to complete the Page Return action, AND-gate 267 inhibits this function when flip-flop 266** is set, thereby assuring that only one command is in the process of execution at any given instant.

If the data editing and display system is in the Receive mode, operation for entry addresses equal to or greater than 48 is the same as described above. However, for the entry address of slot 47, the action differs; the logic of FIG. 27 assumes control of the entry address marker. While AND-gate 262 is inhibited because the REC signal is True, count 47 is sensed by AND-gate 276 of FIG. 27. Upon conjunction therein, an output signal EA47 is applied to AND-gate 277 and together with signals REC and $\overline{\text{CMD}}$ cause conjunction therein resulting in the transmission of a triggering pulse to flip-flop 278. If information received during slot 47 is a command, the $\overline{\text{CMD}}$ signal will be False and AND-gate 277 will be inhibited. If the information in slot 47 is not a command, but data, then the $\overline{\text{CMD}}$ signal will be True and the output signal of this gate will trigger flip-flop 278. Since flip-flop 278 was set at the close of the previous shift cycle from the output of flip-flop 279, it toggles to its reset condition when triggered, thereby causing the INT, CR, LF signal to go True. This signal passes through OR-gate 263 of FIG. 26 and subsequent actions occur identical to the previous description. If the slot 47 information is a command, this action is therefore inhibited, and the entry address register executes the command.

Figures 27, 28:
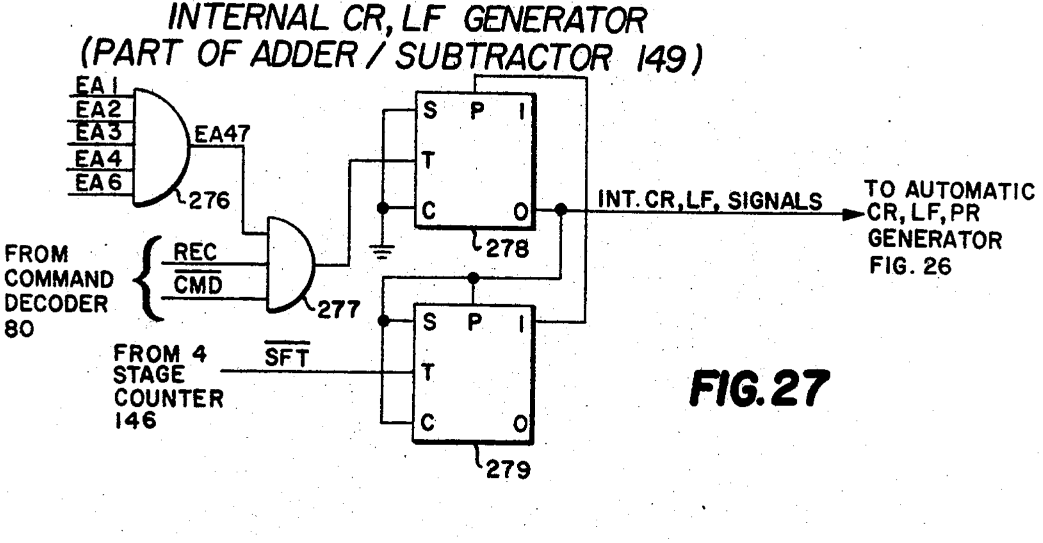
FIG. 27 illustrates in detail the internal CR and LF signal generator.
FIG. 28 is a chart illustrating a truth table for the adder/subtracter structure shown in FIG. 19.

If the data editing and display system is in the Memory Transmit mode, the action described in the preceding paragraph is inhibited because the REC signal into AND-gate 277 of FIG. 27 is False and rendered to that state by the command decoder 80. AND-gate 262 is inhibited during slot 47 because signal MEM.XMIT is True. Consequently no action is taken at slot 47 time, and the contents of slot 47 are read from memory followed by an incrementing of the entry address register to slot 48. The slot 48 condition is sensed by the AND-gate 261 and upon conjunction therein generates a True EA48 signal which is applied to the input terminals of OR-gate 263 and AND-gate 264, thereby initiating the generation of the FOR. LINE and PR1+CR1 signals as described before. Delaying of the automatic Carriage Return and Line Feed actions until slot 48, instead of at slot 47 time, allows the sampling of slot 47 for ETX information. If the ETX code is present in slot 47, a Memory Transmit termination sequence is initiated. If no ETX symbol was present in slot 47, the FOR. LINE and PR1+CR1 signals are generated (causing Carriage Return and Line Feed) and memory transmission continues.

Adder/subtracter

The adder/subtracter 72 performs the function of adding or subtracting one or 64 to the contents of the entry address register 81, when the entry address register contents are shifted through the adder/subtracter.

Figure 29:
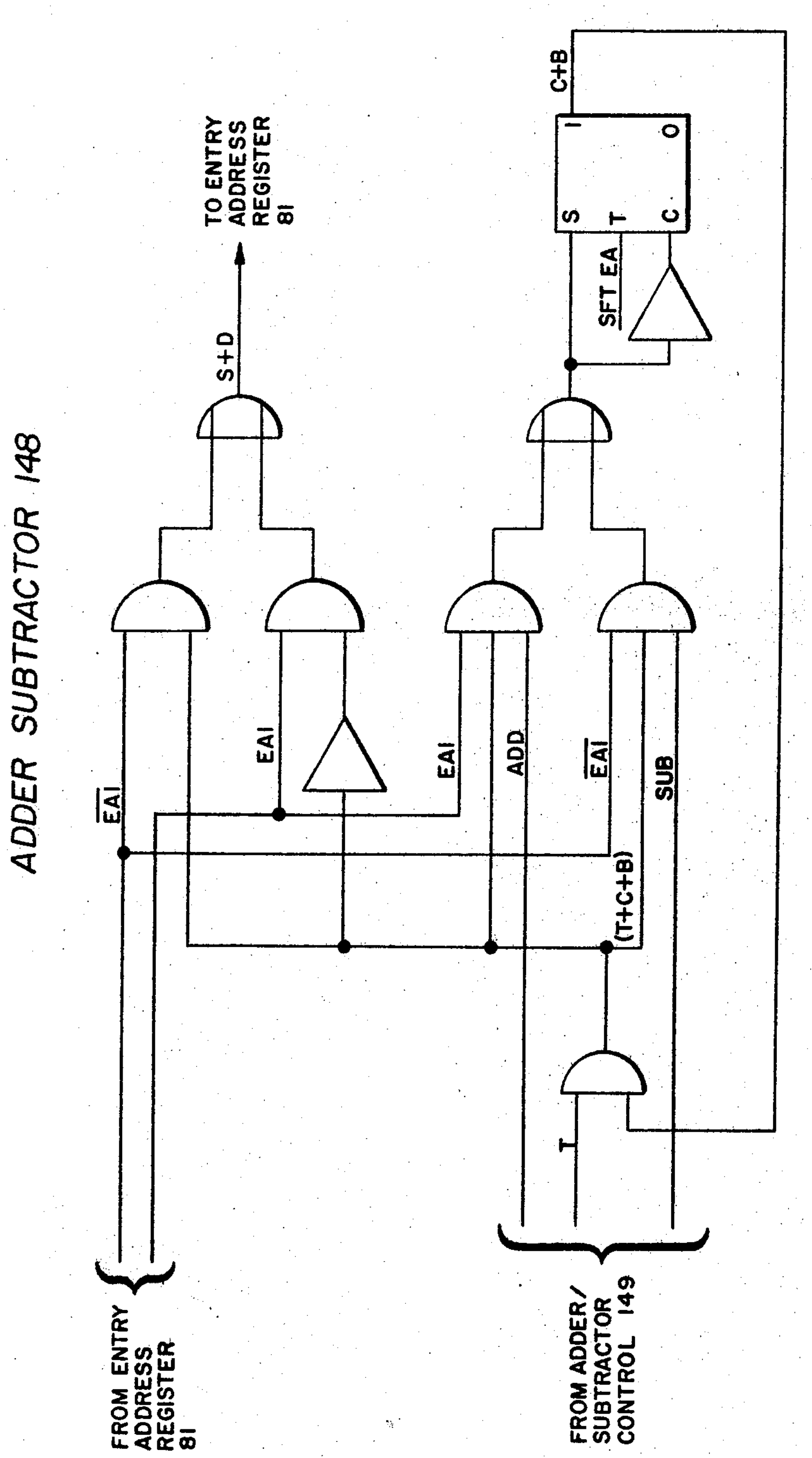
FIG. 29 illustrates in more detail the logic circuitry of the adder/subtracter shown in FIG. 19.

FIGURE 28 is a logic truth table of the adder/subtracter 148 shown in FIGS. 19 and 29. This table defines the S+D and C+B output signals of the adder/subtracter for every possible combination of input signals. That is, given any combination of input signals, as shown in the truth table, the output signals (S+D) and $(C+B)^{n+1}$ must take on the values shown if this circuit is to be a true adder/subtracter function. The X conditions given as output signals in the table indicate output conditions which will never occur by definition. For example, it is not possible to have a carry or borrow condition at the time of the T input signal, since the T input signal initiates the add or subtract process and a carry or borrow output signal cannot occur until after the process is started.

From this table can be derived the sum or difference output equation, $$(S+D)=(EA1)[(C+B)+(T)]+(EA1)(\overline{T})(\overline{C+B})$$

since $\overline{T}(\overline{C+B})=\overline{T+C+B}$ this equation also takes the form $$(S+D)=(\overline{EA1})(T+C+B)+(EA1)(\overline{T+C+B})$$

Similarly, the carry or borrow output equation, $$(C+B)^{n+1}=(ADD)(EA1)(C+B)+(\overline{EA1})(SUB)(C+B)+(T)(ADD)(EA1)+(T)(SUB)(\overline{EA1})$$

reduces to, $$(C+B)^{n+1}=(T+C+B)[(ADD)(EA1)+(SUB)(\overline{EA1})]$$

when implemented by logic, these two equations form the logic circuitry shown in FIG. 29.

Entry address register

FIGURE 30 is a detailed diagram of the entry address register 81. This register is a conventional 12-digit shift register comprising 12 flip-flops, numbered 150 through 161. The register is loaded serially from the adder/subtracter 148. Its output (flip-flop 161) drives one input of the adder/subtracter 148. Shifting of this register is accomplished by a signal from the shift pulse decoder 147 of the entry address register control 78.

The binary address comprising all ones in the six flip-flops 156 through 161 of the entry address register 81 corresponds to an entry marker position on the display module at the first character position of a line. If the Page Return signal is detected by the adder/subtracter control 149, then flip-flops 150 through 161 of the entry address register 81 are preset to their 1-states. The binary address of all ones, in the entry address register 81, corresponds to an entry marker position on the display at the first character position of the first line of text. Thus, it can be seen that the Carriage Return command causes the entry marker to return to the first character position of a line, while the Page Return command causes the entry marker to return to the first character position of the display page.

Comparator

Figure 31:
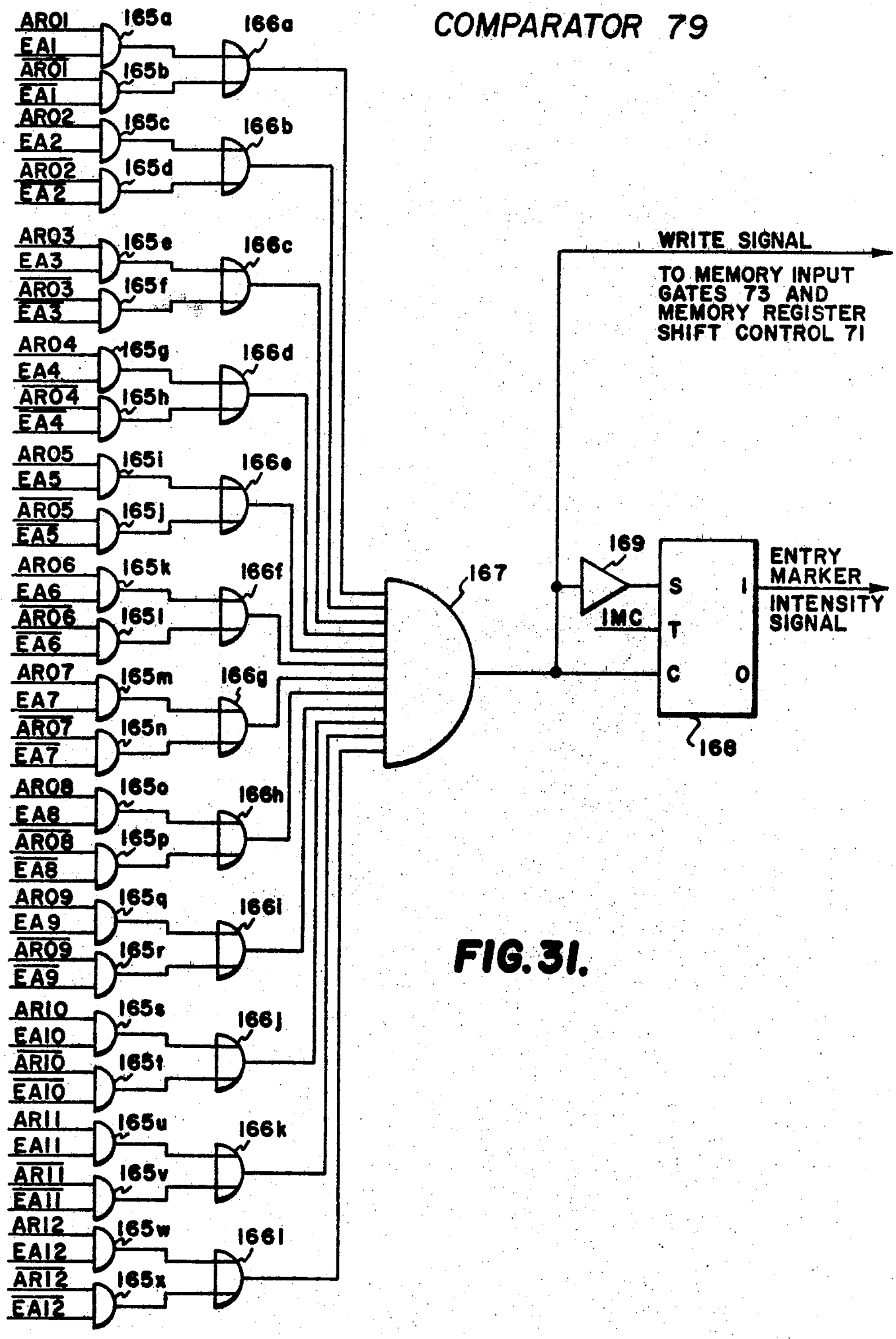
FIG. 31 illustrates in detail the logic circuitry of the comparator shown in FIG. 14.

All output signals of the entry address register 81 are monitored in parallel by comparator 79 and are compared bit by bit with the output signals of the memory address generated by the display timing logic 29. FIGURE 31 illustrates the logic of this comparator. All numeral signals with the EA preface transferred to the input terminals of AND-gates 165*a*–165*x* are from the entry address register 81 shown in FIG. 30 and all numeral signals with the AR preface are from the display timing logic 29. Output signals from these AND-gates, upon conjunction occurring therein, are applied through OR-gates 166*a*–166*l*, as shown, to input terminals of AND-gate 167. Note that the output signal of gate 167 is the Write signal used for writing to memory and the input signal to the clear terminal C of flip-flop 168. The output signal of flip-flop 168 is a control signal which causes the entry marker to be intensified on the television monitor via the video register 64 as shown in FIG. 10. The entry marker intensity signal is generated by the Write signal which is inverted by inverter 169 and applied to the set terminal S of flip-flop 168. At the next 1MC clock signal, delayed one microsecond after the Write signal occurs, flip-flop 168 is set and the output signal from its 1-output terminal is the entry marker intensity signal.

Memory input gates

Figure 32:
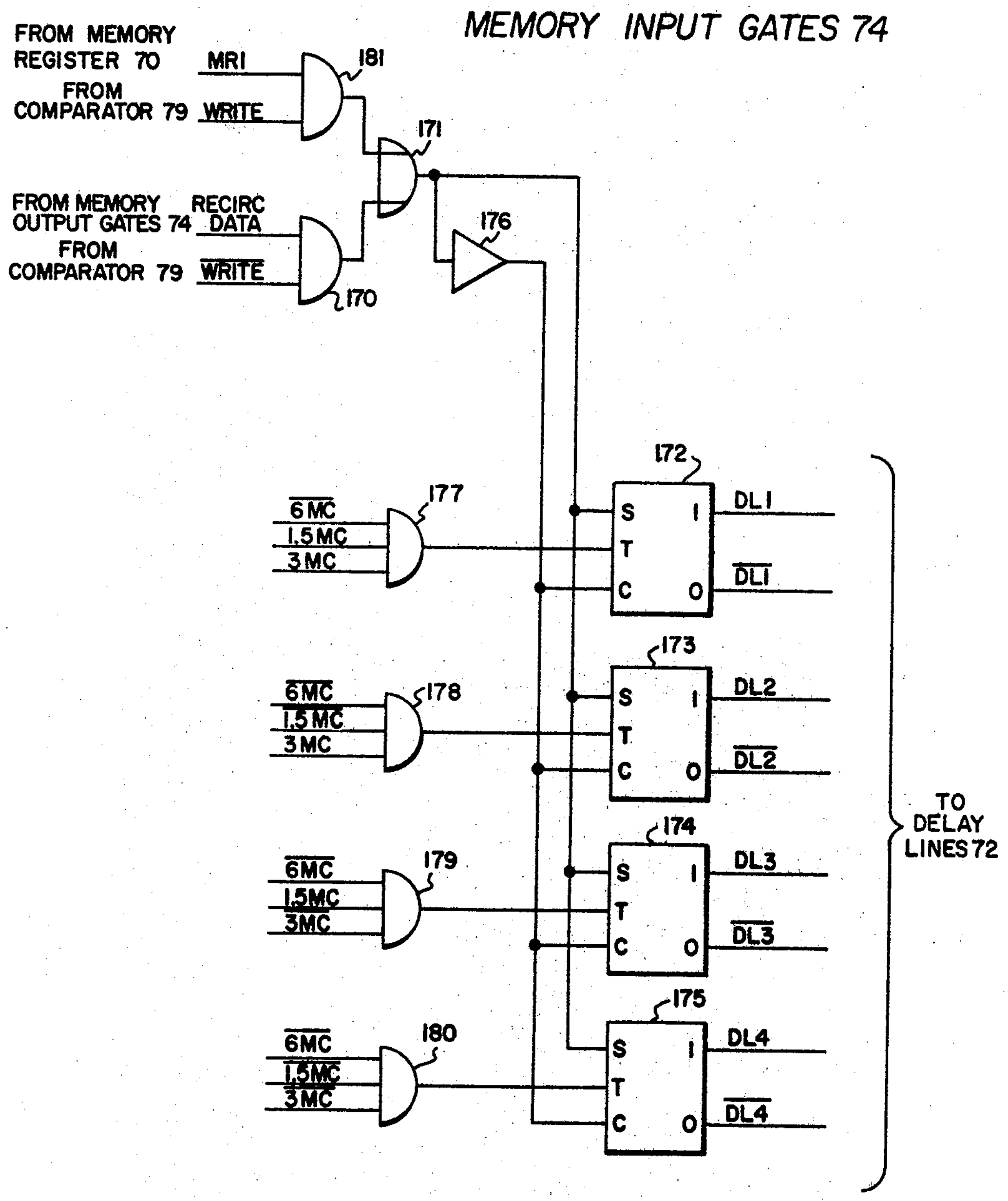
FIG. 32 illustrates in more detail the memory input gates shown in FIG. 14.

The memory input gates 74 are illustrated in detail in FIG. 32. These gates allow data to be written from the memory register 70 to the delay line memory 72 when the Write signal is present, shown in FIG. 14. When the Write signal is not present, the data in the delay lines is recirculated.

As stated before, the delay line memory 72 comprises two pairs of identical delay lines (four lines in all) with normal delay times of 2.0833 milliseconds. The use of four lines allows a four-to-one expansion of bit time before storage, thereby improving memory reliability. In this time expansion, one pair of delay lines circulates the even-numbered bits ($B_2$, $B_4$ and $B_6$) while the other pair circulates the odd-numbered bits of each code or character. Within each pair of delay lines the bits are alternately staggered through the delay lines on a 1, 2, 1, 2, 1, 2, etc., basis as shown in FIG. 33 which also shows timing of the various events associated with the main delay lines.

Figure 34:
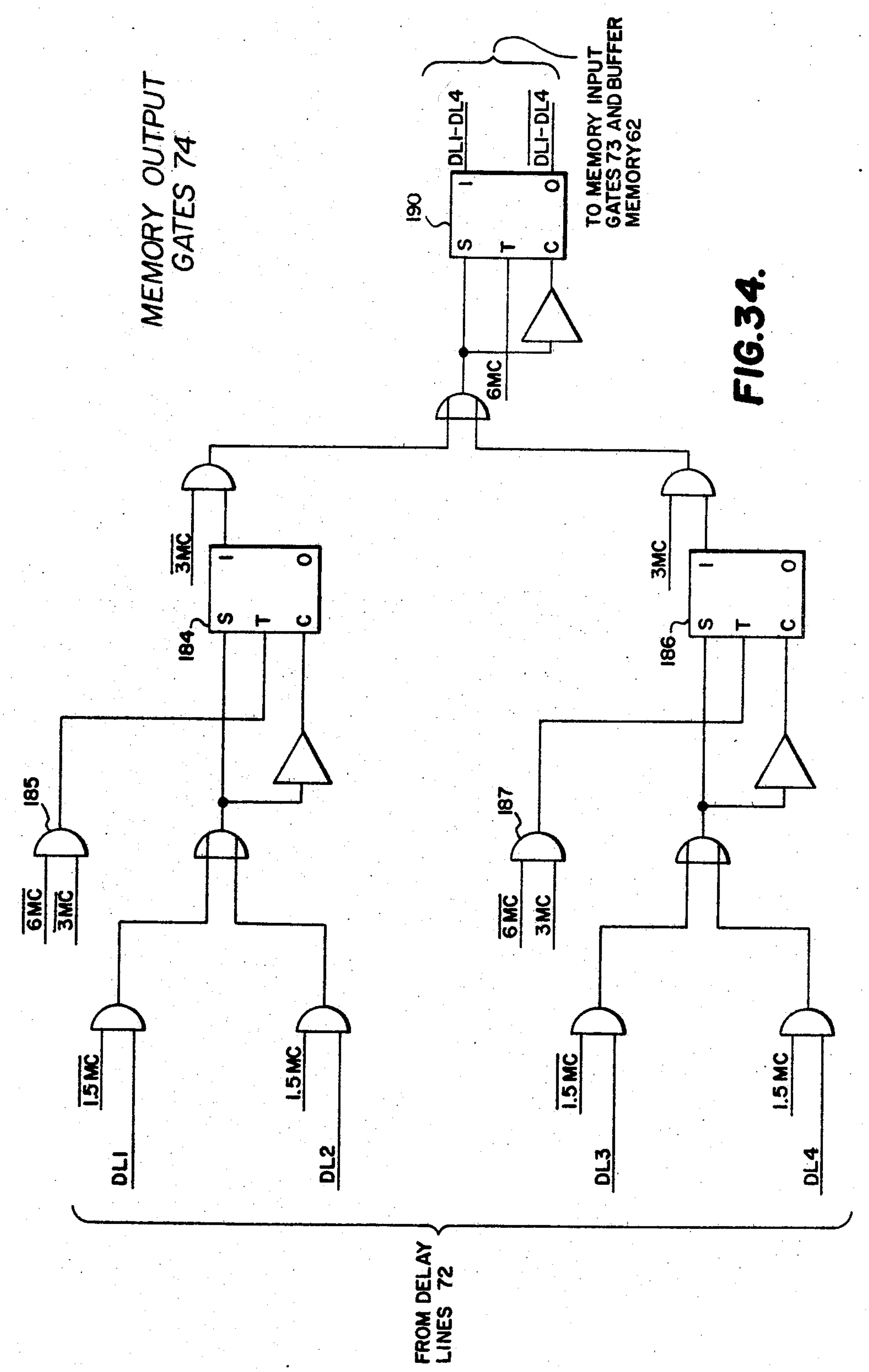
FIG. 34 illustrates in more detail the memory output gates shown in FIG. 14.

Output signls from the four delay lines are combined after time selection which merge the bits back into a single code or character and are returned to the memory input for recirculation. Reference is made to FIGS. 32 and 34 for the logic circuits showing the input and output bit expansion and compression, respectively.

Figure 33:
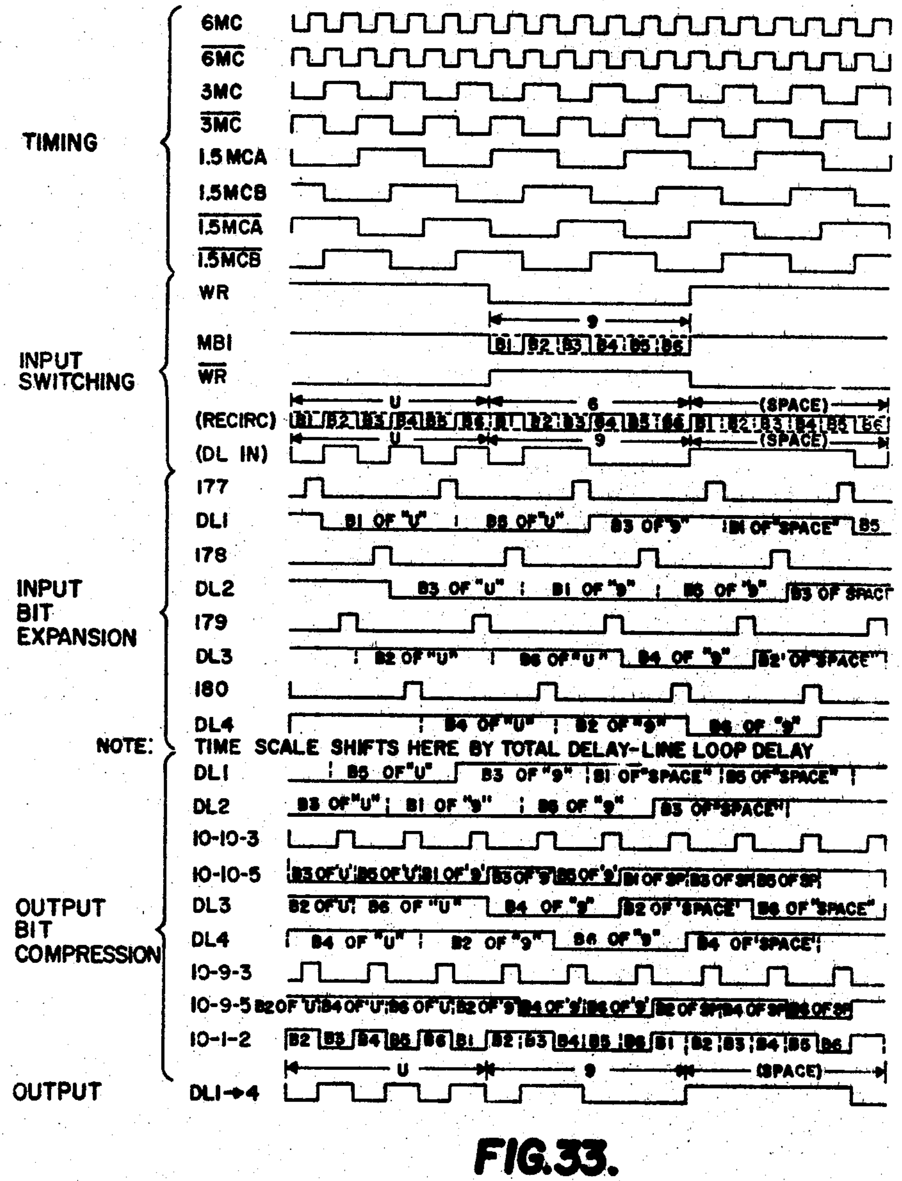
FIG. 33 is a timing chart illustrating the relationship of the various timing signals used in the main delay lines.

With reference to FIGS. 32 and 33, when the Write ($\overline{WR}$) signal is True (which is the case at all times except when writing new data into the delay lines), AND-gate 170 is enabled, thus closing the recirculation path around the loop. If the data from the delay lines being recirculated is applied to the input terminal RECIRC DATA of AND-gate 170, conjunction occurs in AND-gate 170 and an output signal is generated and applied to OR-gate 171. This output signal causes conjunction in OR-gate 171 resulting in the sequential setting of flip-flops 172, 173, 174 and 175. If the data from delay lines DL1–DL4 is False, OR-gate 171 produces a high output signal which is inverted by inverter 176 and applied to the clear C terminals of the same four flip-flops 172–175 to reset them. Thus, when the four flip-flops 172–175 are pulsed or triggered by the clocking pulses applied to them through AND-gates 177–180, they will assume a state depending upon the state of the delay line information at that instant if the $\overline{WR}$ signal is True.

When the Write (WR) signal is True during the writing of new data into the delay lines, AND-gate 181 is enabled. Data input to the MR1 data input terminal of AND-gate 181 then may occur. This causes conjunction to occur in AND-gate 181 if the bit input signal is True. The output signal of AND-gate 181 is applied to OR-gate 171 wherein conjunction occurs resulting the enabling of the set input terminals of flip-flops 172–175. If the data input to the MR1 terminal of AND-gate 181 is False, the reset terminals of flip-flops 172–175 are enabled. Thus, the recirculation path is blocked and new data is entered into these flip-flops upon conjunction occurring in AND-gates of 177–180 and upon the occurrence of the signals indicated at the input terminals of these gates. This is illustrated in FIG. 33 by the blocking of the character 6 and the entry instead of the character 9 as the second code or character group.

The resulting strobing or triggering signals are shown in the "input bit expansion" portion of FIG. 33. Input signals are applied to all four flip-flops in parallel, but only that flip-flop which is clocked by a particular strobing or triggering signal is affected by the conditions at its input terminals at clocking time. Thus, the bits are expanded in time by a factor of four, as shown by lines DL1, DL2, DL3 and DL4 in FIG. 33 which represent input signals to the delay lines themselves.

Memory output gates

At the output terminals of the four delay lines, the bits are recombined in proper order, as shown in FIG. 34, by commutating the signals of delay lines DL1 and DL2 across the input terminals of flip-flop 184 at 1.5MC rate (phase A) while triggering this flip-flop with a signal shown in FIG. 33 as 10–10–3. This trigger signal is the result of the conjunction of $\overline{6MC}$ and $\overline{3MC}$ signals in AND-gate 185. Simultaneously with the above action, commutation of the bits from delay lines DL3 and DL4 occurs across the input terminals of flip-flop 186 in a similar manner but using phase B of the 1.5MC signals while triggering the flip-flop with a signal shown in FIG. 33 as 10–9–3. This triggering signal is the result of the conjunction of signals $\overline{6MC}$ and 3MC in AND-gate 187. This action combines the output of each pair of delay lines, as shown by the signals 10–10–5 and 10–9–5 and these two signals are then commutated across the input terminals of flip-flop 190 at a 3MC rate in a similar manner to that above explained to produce the DL1–4 and $\overline{DL1-4}$ output signals of which only DL1–4 signal is shown in FIG. 33.

When the $\overline{WR}$ signal is True, allowing recirculation of the delay line loop, the signals at DL1–4 and $\overline{DL1-4}$ pass through AND-gate 170 and OR-gate 171, as shown in FIG. 32, thus maintaining the data in memory. Output signals DL1–4 and $\overline{DL1-4}$ are also applied to the 6MC delay lines for processing by the character generator of the video display.

Data organization

Figure 35:
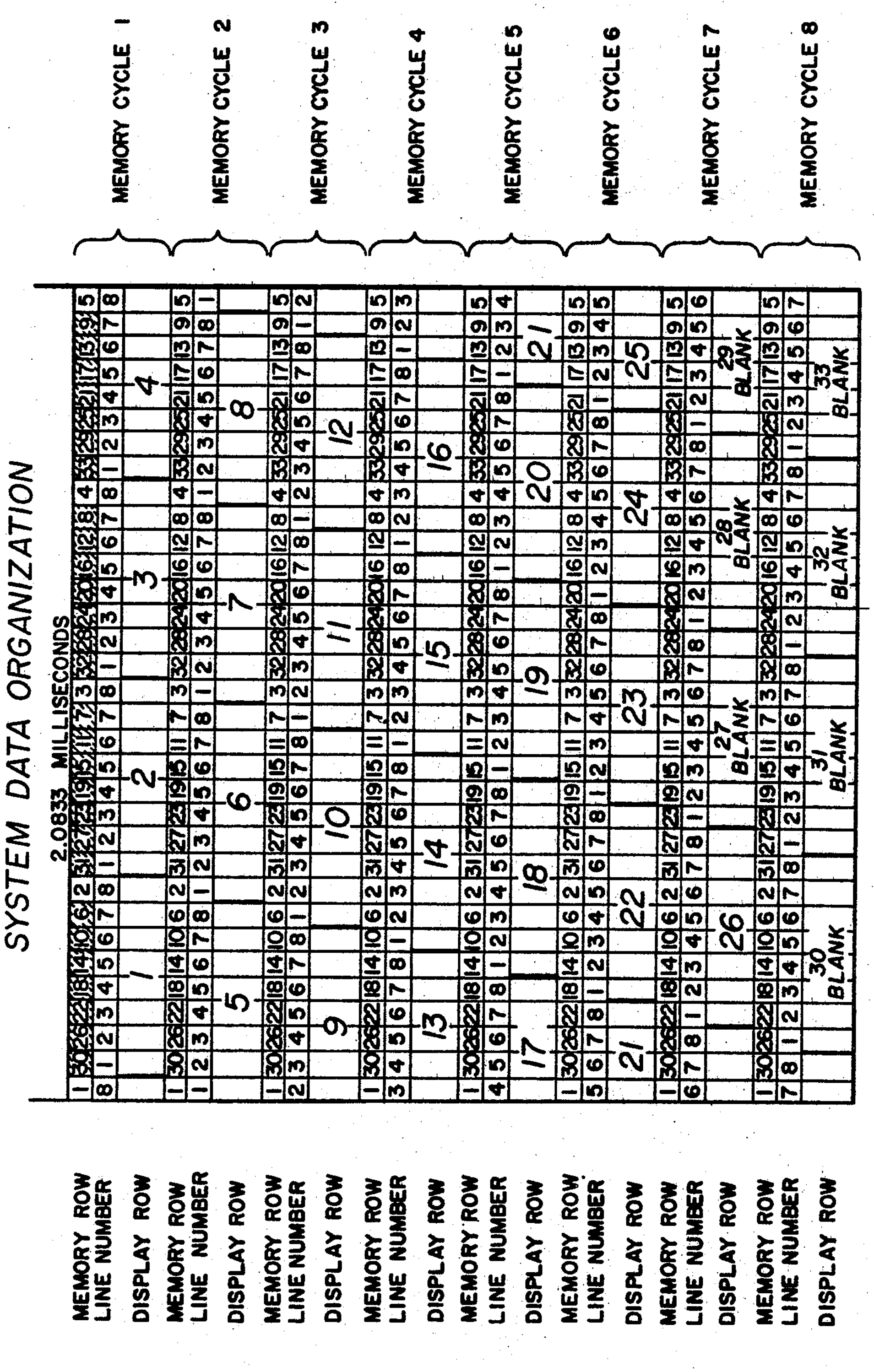
FIG. 35 is a chart illustrating the timing relationship and the organization of the data flowing through the system illustrated in FIG. 1.

FIGURE 35 illustrates the time relationship of data flow within the system of the present invention. The memory, for reference purposes, may be considered to be divided into 33 segments or rows each in the time relationship shown lasting for 64 microseconds. Each such row is further divided into 64 "slots" of 1 microsecond duration each. The slots are numbered from 1 through 64 in each row. Rows are numbered from 1 through 33. Each row in FIG. 35 relates to an interval of time in main memory 61, containing one row of stored character data. Each row of character data stored in memory represents a displayable row of characters for the TV monitor 26. The memory row numbers indicated in FIG. 35 correspond to textual row numbers on the display. That is, the character data stored in memory row one determines what will appear in the first row of text on the display.

It will be observed that there is memory capacity provided for thirty-three rows of data, but only numbers one through twenty-six are used for display purposes.

Data is never written into the seven blank rows twenty-seven through thirty-three. Provision for these blank rows in memory allows exact data synchronization between the main memory and the television raster. Blank rows twenty-seven through thirty-three in memory prevent data from being transmitted to television display monitor 26 during the raster vertical retrace time. The vertical retrace time is the time required by the CRT electron beam to return to the top of the screen after completing the previous raster.

The time each row of data is displayed on television monitor 26 is also indicated in FIG. 35. As can be seen, the illustration in FIG. 35 has been drawn in sections in order to accommodate drawing requirements, each section being one horizontal strip comprising the grouping defined as a memory cycle. Each section is equivalent to one memory cycle time. The display rows are numbered from one through twenty-six with rows twenty-seven through thirty-three blank to provide vertical retrace time. Each display row is equivalent to exactly eight memory rows. It should be noted that when memory row one becomes available, display row one begins; when memory row two becomes available, display row two begins, and so forth. This is emphasized in the first line of FIG. 35 by the cross hatching of the memory storage areas not utilized in the delay line memory but passed over during display row one time. Also note that during display rows twenty-seven through thirty-three, a blank memory row is always available. Thus, if vertical retrace of the electron beam is accomplished during display rows twenty-seven through thirty-three, no loss of display data will be incurred. Since the delay line memory is time synchronous with the television raster and memory, row number one is always available at the beginning of a new TV raster.

In FIG. 35, each complete cycle is equivalent to one display field or one raster cycle. Therefore, two cycles are required to make up one complete frame of TV monitor 26. From the above, it is now apparent that each field of the television monitor is equivalent to exactly eight data cycles of main memory 61, or 16.66 milliseconds. Also, each memory row is available for display once each field time or twice during a given frame. As a result, a 2:1 interlace is obtained. The first field presents the odd numbered raster lines indicated by FIG. 11*b* and the second field presents the even numbered raster lines indicated by FIG. 11*c*.

The line numbers indicated in FIG. 35 coincide with television raster lines where line number one through number eight during field one corresponds to the odd numbered raster lines indicated in FIG. 11*a*, and the same lines during field number two correspond to the even numbered lines of FIG. 11*a*. These line numbers are generated by display timing logic 29 and act as a time reference to character generator 30 to indicate what portion or raster line of a character is to be composed.

Figure 36:
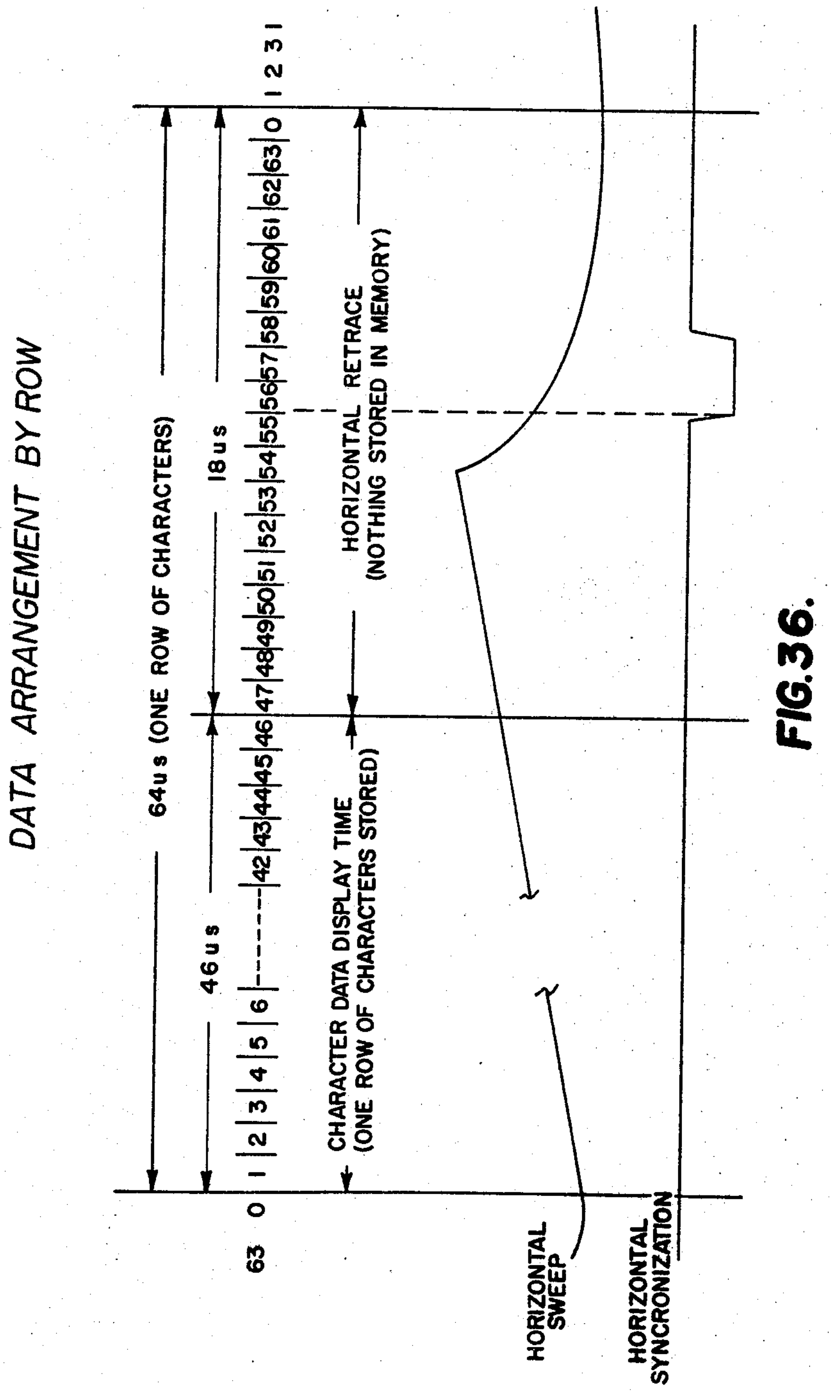
FIG. 36 diagrammatically illustrates the arrangement of data in memory by rows.

A timing chart showing data arrangement by row is illustrated in FIG. 36. Each row stored in memory is time synchronous with each horizontal sweep time of the television raster. Each horizontal sweep time, of course, corresponds to a television raster line referred to hereinbefore. In the same manner in which blank memory rows were provided to allow time for vertical retrace of the CRT beam, blank character times are provided in a memory row to allow horizontal retrace time of the electron beam. This is illustrated in FIG. 36 where character times forty-seven through sixty-four are left blank. FIGURE 36 also shows the timing of the horizontal synchronizing pulse. This horizontal synchronizing pulse is required by television monitor 26 to trigger the horizontal deflection circuits and occurs once for each memory row, thereby forcing the horizontal sweep circuits to be time synchronous with each memory row.

To illustrate data flow from main memory 61 to the display module 26, the following example is given. During a given line number eight of FIG. 35, a particular row of data in main memory 61 is transferred to buffer memory 62. That is, for example, memory row number two is time coincident with the line number eight control signal just prior to the display of display row two. During the presence of the line eight control signal, memory row two is transferred to buffer memory 5 where it is recirculated for eight line number times or until the next time that LINE 8 signal occurs. It is transferred to buffer memory 5 retaining the same data arrangement by character it had in main memory 3. This data arrangement is shown in FIG. 36. During the time that this row of data is retained by buffer memory 62, it is recycled at the same rate and in synchronization with the horizontal sweep of television monitor 26. Therefore, referring back to FIG. 35, memory row two is presented to character generator 30 eight times during display row two. These eight times correspond to the odd numbered raster lines of FIG. 11*a* during field one and to the even numbered raster lines during field two. Thus, character generator 30 has presented to it the same character code of a given memory row eight times during the display of a row of text. In this manner, it is able to determine from the character code presented and the line number count, exactly what video word must be composed and transmitted to TV monitor 26. FIGURES 11*b* and 11*c* illustrate the video words composed and transmitted for the raster lines forming the character A.

DISPLAY TIMING LOGIC

Figure 37:
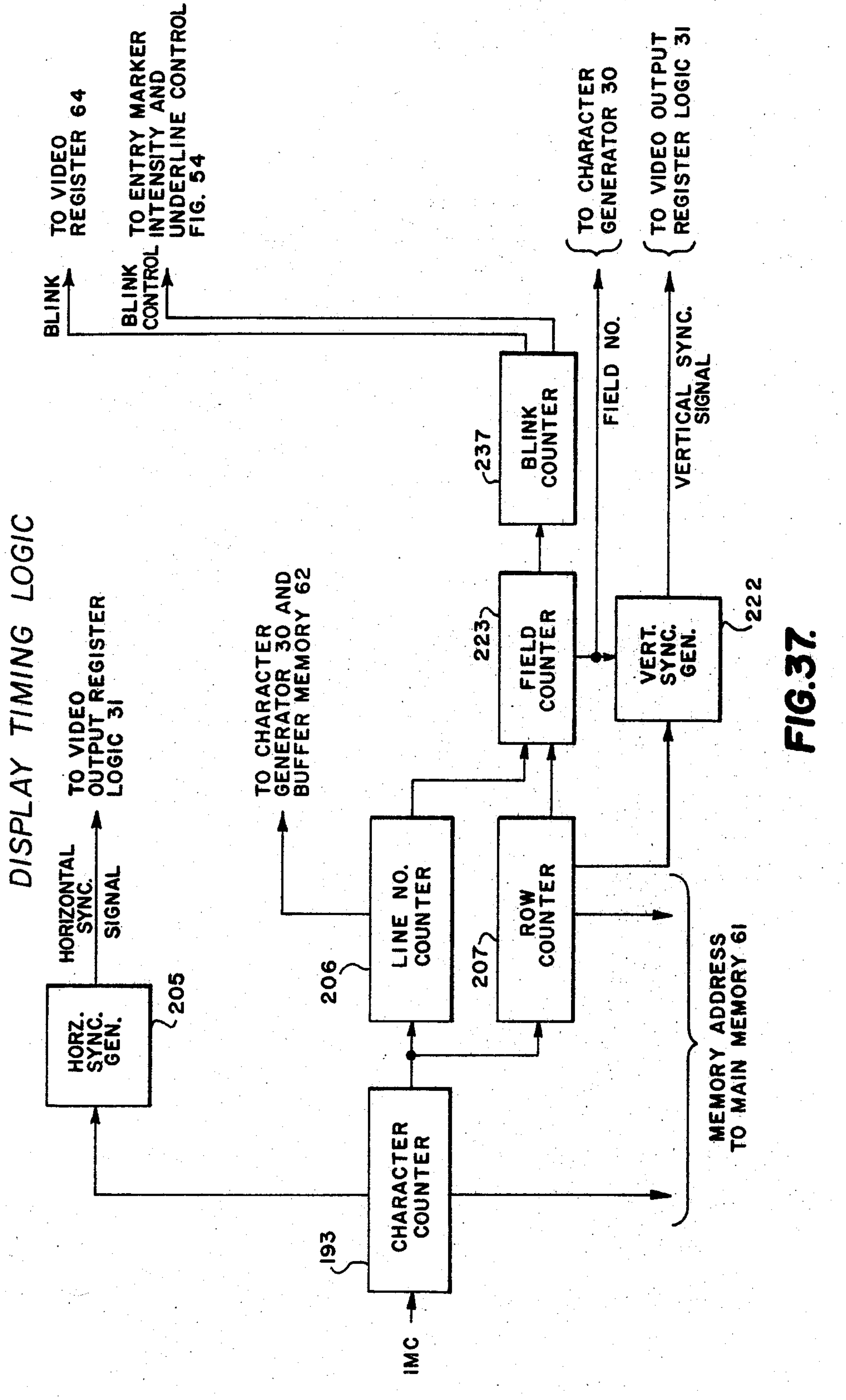
FIG. 37 illustrates in more detail the display timing logic shown in FIG. 1.

FIGURE 37 is a block diagram of the display timing logic shown in FIG. 1. This logic generates all repetitive timing signals for the system. The fact that each functional unit of the system uses the same repetitive timing signals guarantees synchronization between each unit. The display timing logic fixes the time interval in the delay line memory to which a given character will be assigned. When a given row of data is transferred to buffer memory 62, it specifies to character generator 30 what raster line of video information it is to generate, and it generates horizontal and vertical synchronizing signals which synchronize the television raster to the rest of the date editing and display system. Since the storage address in the delay line memory is the position in time in the desired data, the logic must keep accurate count of this position to be able to recover the data upon command. This is done by a character counter 193 which is timed by the 1MC clock pulse of the clock generator shown in FIG. 8.

Character counter 193 is a 6 stage flip-flop counter which steps one count each microsecond. It counts in straight binary form from an initial setting where all of the flip-flops represent a binary 0 to a binary 63 and then recycles. By definition, the contents of this counter always refer to the memory address of a given character within a given memory row of data.

Character counter

Figure 38:
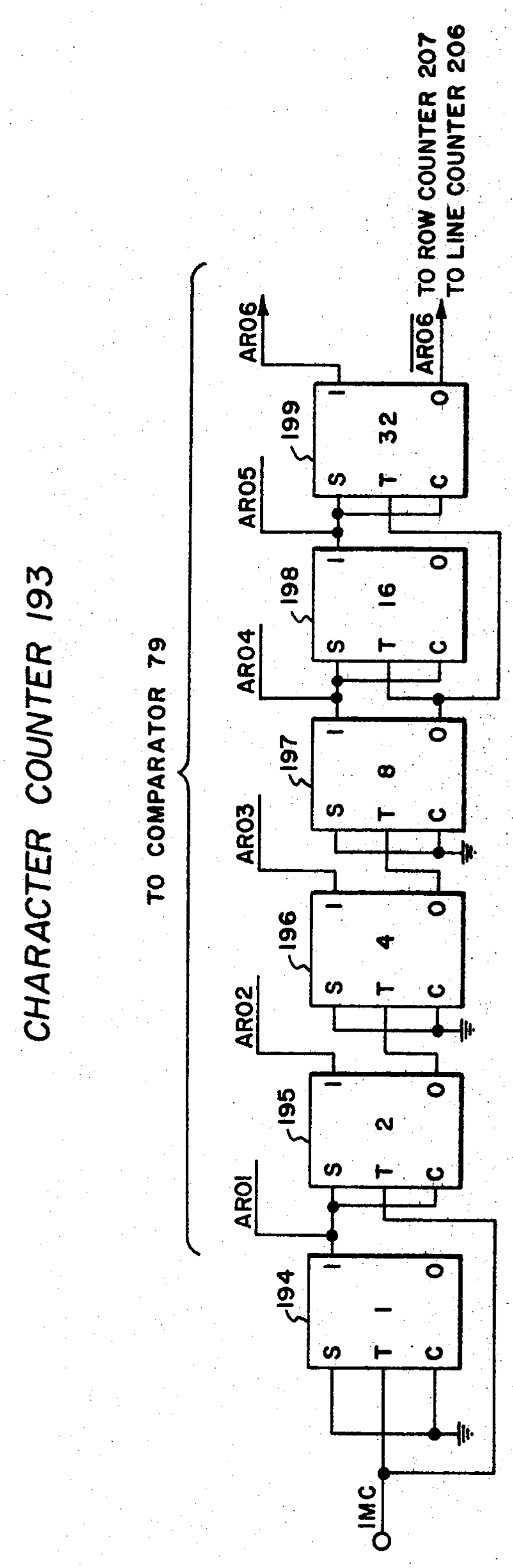
FIG. 38 illustrates in more detail the character counter shown in FIG. 37.

FIGURE 38 is a logic diagram of character counter 193 which is essentially a ripple counter. Flip-flop 194 is toggled on the falling edge of every 1MC clock pulse. Toggling herein is defined as the flip-flop changing into the opposite condition of its present state. Flip-flop 195 toggles on every other falling edge of the 1MC clock pulse. Flip-flop 196 toggles on every fourth edge of the clock pulse. Flip-flop 197 toggles on every eighth edge of the clock pulse. Flip-flop 198 toggles on every sixteenth edge of the clock pulse, and flip-flop 199 toggles on every thirty-second edge of the clock pulse. The numerals in the flip-flop symbols of FIG. 38 indicate the numerical weight represented by the setting of that particular flip-flop of the counter assuming that all other flip-flops in the counter at that time are reset.

Horizontal synchronizing generator

Figure 39:
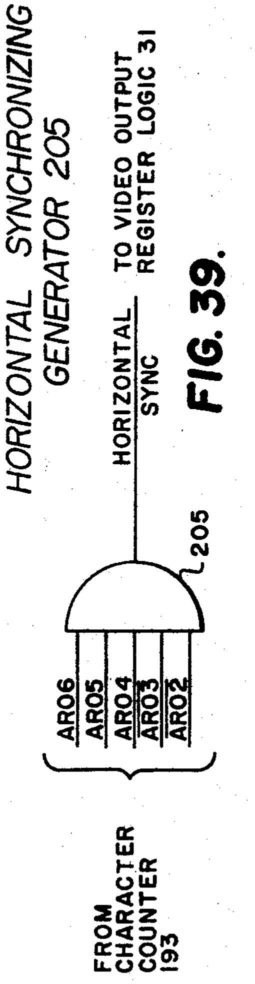
FIG. 39 illustrates in more detail the horizontal synchronizing generator shown in FIG. 37.

The horizontal synchronizing generator 205 monitors character counter 193 for a binary count of fifty-six. When this count is reached, horizontal synchronizing generator 205 generates the horizontal synchronizing pulse illustrated in FIG. 36. FIGURE 39 illustrates a logic diagram of the horizontal synchronizing generator 205 which is simply a five input AND-gate which decodes count fifty-six of the character counter 193.

Line counter

Figure 40:
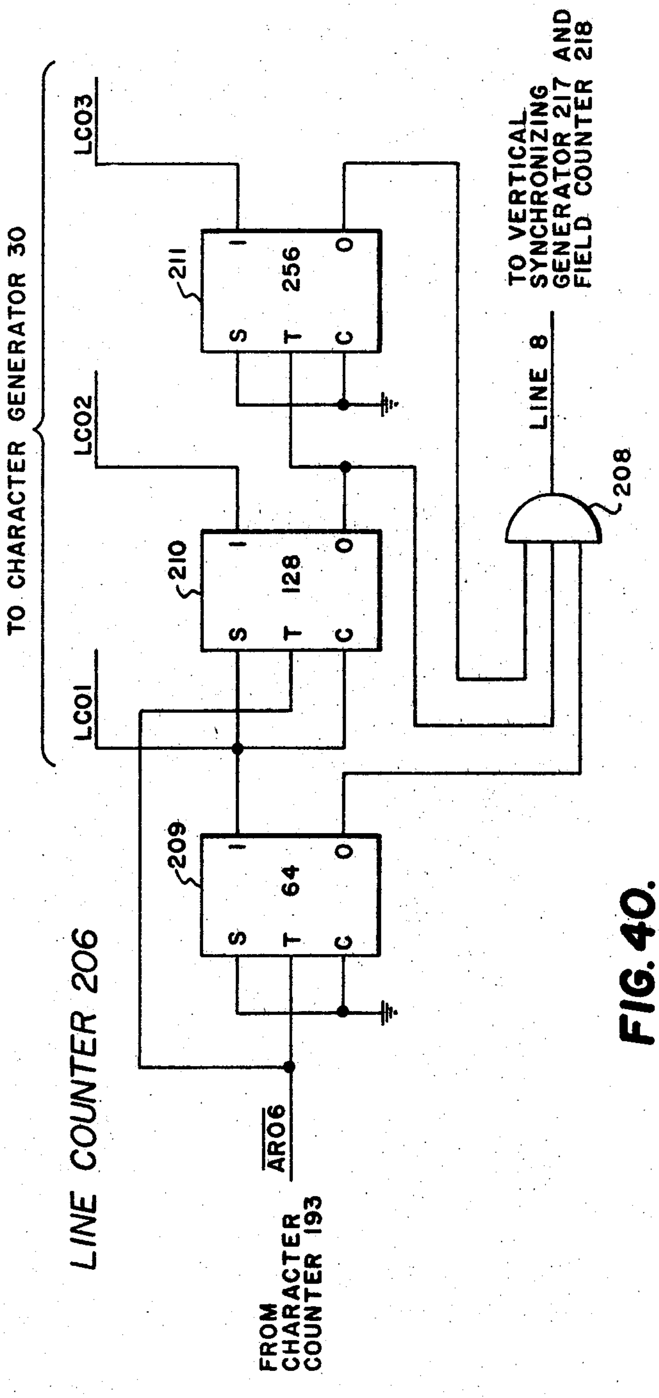
FIG. 40 illustrates in more detail the line counter shown in FIG. 37.

For each cycle of the character counter 193, i.e., a binary count of sixty-three, a signal $\overline{\text{AR06}}$ is transmitted to a line counter 206 and a row counter 207. Line counter 206 is a normal binary counter which counts from a binary 0 through a binary 7, thereby generating eight line signals labeled LINE NUMBER in FIG. 35. FIGURE 40 is a logic diagram of this counter which is similar to character counter 193 shown in FIG. 38. FIGURE 40 illustrates the logic for decoding LINE 8 or the binary 7 signal. This decoding is accomplished by AND-gate 208. The input signals to AND-gate 208 are the output signals from the 0-output terminals of flip-flops 209, 210 and 211. LINE 8 appears as a pulse sixty-four microseconds wide occurring every eight line times or approximately every 512 microseconds.

Row counter

Figure 41:
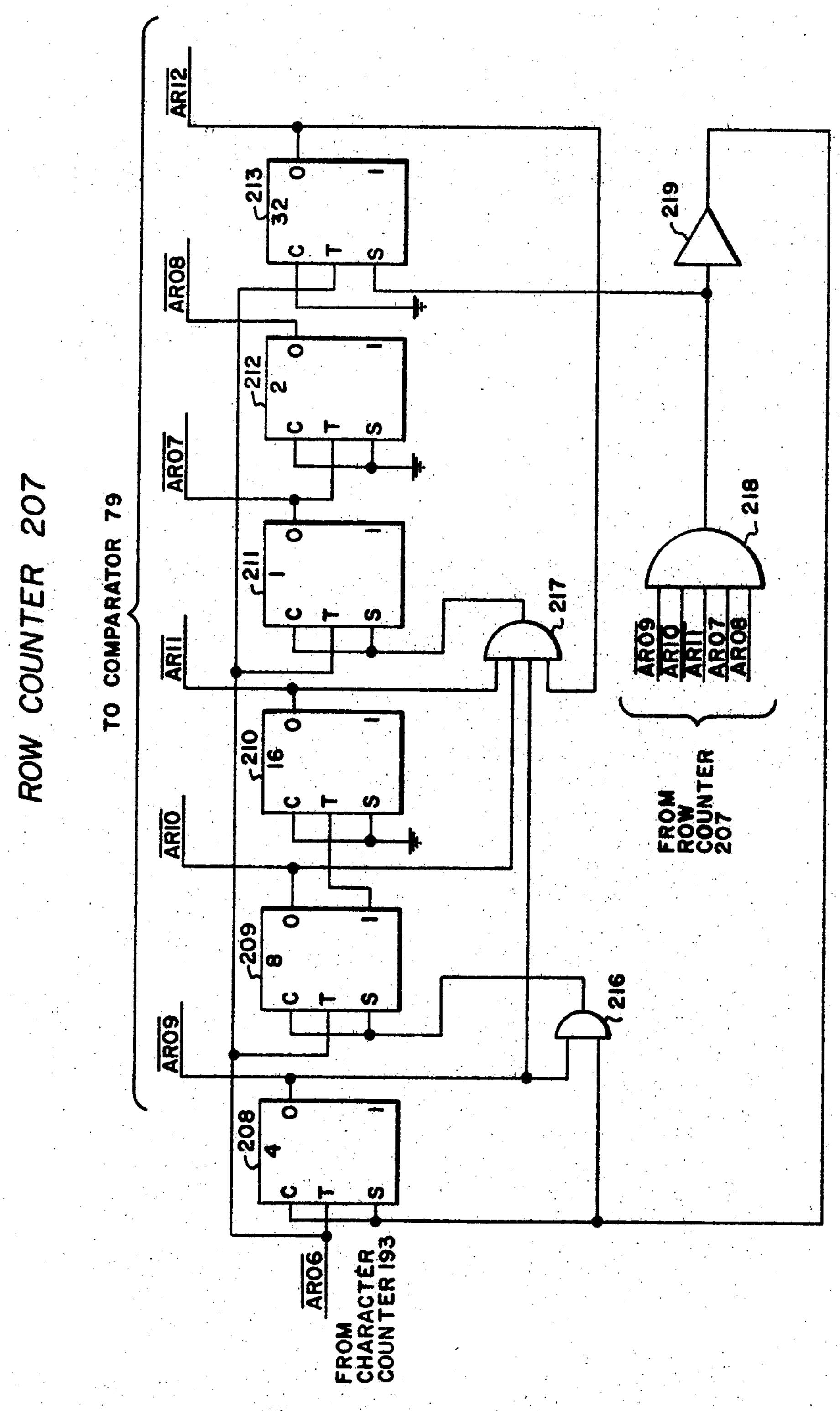
FIG. 41 illustrates in more detail the row counter shown in FIG. 37.

The contents of row counter 207 are, by definition, the memory address row location. Row counter 207 is triggered by the output signal $\overline{\text{AR06}}$ of the 0-output terminal of flip-flop 199 of character counter 193 every sixty-four microseconds, thus forming the memory row arrangement illustrated in FIG. 35. FIGURE 41 is a logic diagram of this counter comprising serially connected flip-flops 208, 209, 210, 211, 212 and 213. AND-gates 216, 217, 218 and inverter 219 cause this counter to count in the manner illustrated in FIG. 42. FIGURE 42 is an output table of row counter 207. The first column labeled STATE in the table is the step number of the counter. The counter steps through 33 different states and then repeats itself.

The next six columns of binary 1's and 0's reading from left to right in the table show the states of each flip-flop in the counter at a particular time. These six columns indicate the 33 different states the counter can assume during operation. Each of these columns is assigned a binary weight wtih the binary weights arranged in an order different from most binary counters. Note that signal AR09 has a binary weight of four, signal AR10 has a binary weight of eight, signal AR11 has a binary weight of sixteen, signal AR07 has a binary weight of one, signal AR08 has a binary weight of two, and signal AR12 has a binary weight of thirty-two. With these binary weights assigned, each state of the counter may be evaluated as shown in the next column, labeled BINARY VALUE. Each of these binary values corresponds to a memory row number as shown in the last column of the table. Note that the sequence in which these row numbers appear corresponds exactly to the sequence of the memory row numbers which are shown in FIG. 35. By implementing row counter 207 to count in the manner illustrated in FIG. 42, and by using row counter 207 in conjunction with comparator 79 to write into memory, memory data by rows is automatically time organized as shown in FIG. 35.

Vertical synchronizing generator

A particular count of row counter 207 is monitored by the vertical synchronizing generator 222 along with a field count of field counter 223 shown in FIG. 37 to obtain the vertical synchronizing signal. The vertical synchronizing signal is a 192 microsecond pulse which occurs at the beginning of each field. When it occurs during field number one, it falls at the beginning of LINE 8 heretofore explained with reference to FIG. 40. When it occurs in conjunction with field number two, it always falls twelve microseconds after the beginning of a LINE 8. This causes a staggering by twelve microseconds of the vertical synchronizing signal every other field time, thereby guaranteeing proper interlace of the two fields of the display. The results of this staggering effect in the vertical synchronizing signal is to cause the television raster during field number two to be slightly displaced from the television raster during field number one. This displacement is just the right amount to cause the raster lines of field two to interleave between the raster lines of field one. In this manner, the 2:1 interlace required by standard television monitors is achieved.

Figure 43:
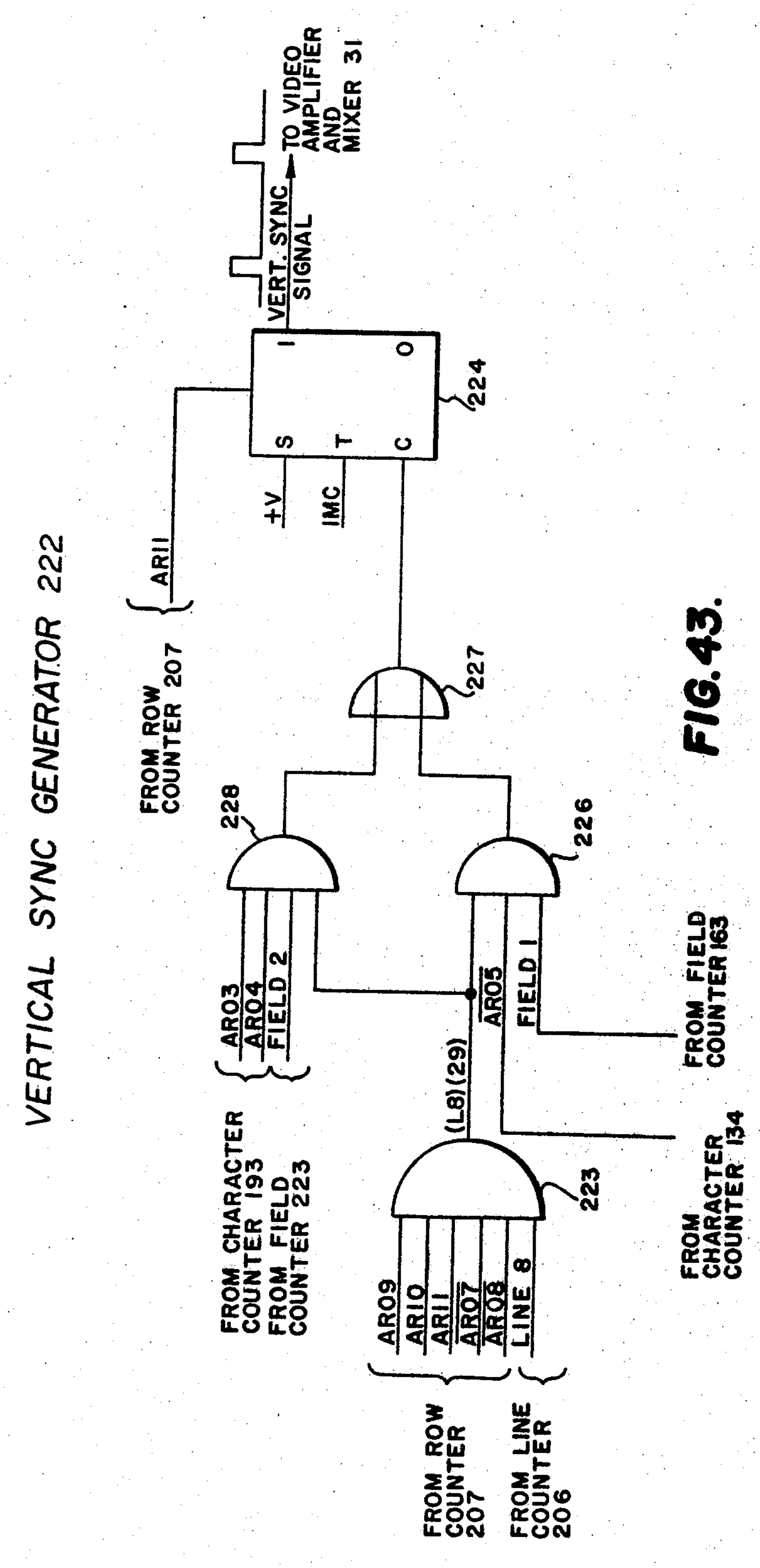
FIG. 43 illustrates in more detail the vertical synchronizing generator shown in FIG. 37.

The logic of the vertical synchronizing generator 222 is illustrated in FIG. 43. The vertical synchronizing signal appears at the 1-output terminal of flip-flop 224. The signal pulse appears when the flip-flop 219 is cleared and disappears when the flip-flop is set. Using the row counter 207 output table of FIG. 42, it can be seen that conjunction occurs and an output signal is generated in AND-gate 225 when row twenty-nine and line number eight have been encountered. Referring to FIG. 35, it is noted that line number eight and row twenty-nine are coincident once every sixteen milliseconds.

With reference to FIG. 43, it is noted that the output signal of AND-gate 225 is transmitted to one of the input terminals of an AND-gate 226. Signals to the two other input terminals of AND-gate 226 are obtained from character counter 193 and field counter 223 of FIG. 37. Since signal $\overline{\text{AR05}}$ is low (True) at the beginning of each character count during field one of a TV raster display operation, AND-gate 226 will be enabled. A low level output signal from AND-gate 225 will cause conjunction in AND-gate 226 which will be transmitted to OR-gate 227 causing conjunction therein and resulting in an output signal being transmitted to the clear terminal of flip-flop 224. Thus, flip-flop 224 will be cleared at the beginning of the character count or when signal $\overline{\text{AR05}}$ is present. If field two of the display operation is occurring, then AND-gate 228 and OR-gate 227 are used to clear flip-flop 224. In this instance, resetting of the flip-flop takes place when signals AR03 and AR04 are present which corresponds to character count twelve. Thus, the rising edge of every other vertical synchronizing signal will be delayed by twelve microseconds. Flip-flop 224 is set when signal AR11 goes False, i.e., to a high level. Signal AR11 goes False 192 microseconds after row count twenty-nine occurs. Referring to FIG. 42, it is noted that signal AR11 goes False at the beginning of memory row number thirteen.

Field counter

Figure 44:
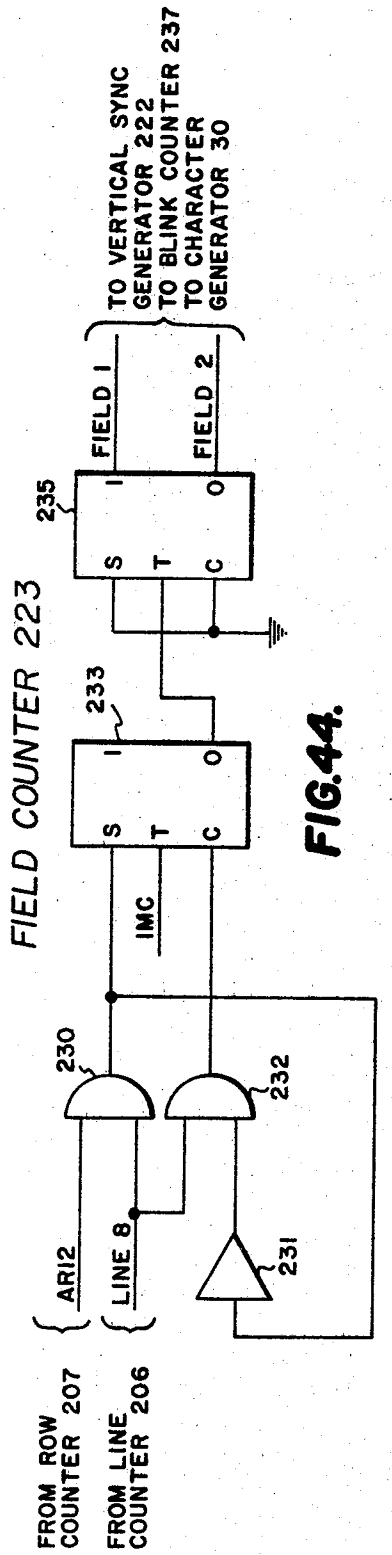
FIG. 44 illustrates in more detail the field counter shown in FIG. 37.

The output signal of the field counter 223 is used by character generator 30 to determine whether it is to generate video signals for an odd raster line or an even raster line of a display frame. The logic of field counter 223 is shown in FIG. 44. The AR12 input signal to AND-gate 230 corresponds to memory row thirty-three. This can be seen by referring to the table shown in FIG. 42. In FIG. 35, it can be seen that line number eight and memory row thirty-three occur together only once every eight memory cycles or once each sixteen milliseconds. Therefore, the output signal from AND-gate 230 will appear once each sixteen milliseconds and last for approximately sixty-four microseconds. The output signal from AND-gate 230 is inverted by inverter 231 and the inverter signal is applied to AND-gate 232. AND-gate 232 is inhibited by the False input signal. The True output signal from AND-gate 230 is also applied to the set terminal of flip-flop 233 for sixty-four microseconds while the input signal to its clear terminal is held at a high potential or False condition. Thus, flip-flop 233 is set to its 1-state. When flip-flop 233 goes from its 0 to its 1-state, the potential at its 0-output terminals rises to a high level.

The next time the LINE 8 signal occurs (the next row 1, see FIG. 35), the AR12 signal( row 33) is False. Therefore, the output signal of AND-gate 230 is False and the output signal of inverter 231 will be True. Thus, with the LINE 8 signal True and the output signal of inverter 231 True, AND-gate 232 will be enabled. AND-gate 232 transmits an output signal to the clear terminal of flip-flop 233 which causes flip-flop 233 to reset with the next falling edge of the 1MC clock pulse. The falling edge of the signal from the 0-output terminal of flip-flop 233 is transmitted to the T terminal of flip-flop 235 and triggers this flip-flop to the opposite state of its present condition. Thus, flip-flop 235 is toggled approximately every sixteen milliseconds creating the field one and field two signals from its 1- and 0-output terminals, as shown in FIG. 44.

Blink counter

Figure 45:
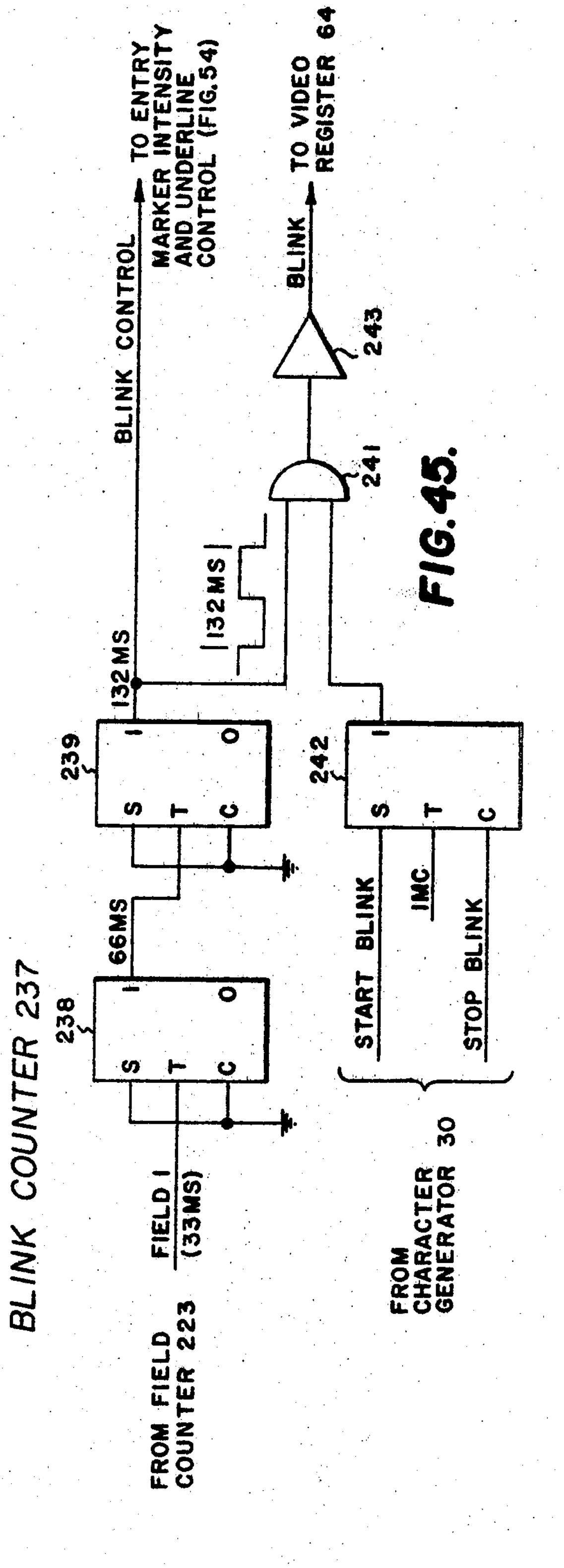
FIG. 45 illustrates in more detail the blink counter shown in FIG. 37.

Field counter 223 is used to drive a blink counter 237, shown in FIGS. 37 and 45, whose output signal transmitted to the video output register logic 31 is a cyclic signal used to blink characters on the screen of display module 26. The logic of blink counter 237 is shown in FIG. 45. Flip-flops 238 and 239 are connected such that the trigger terminal of flip-flop 238 is connected to the 1-output terminal of flip-flop 235 and the 1-output terminal of flip-flop 238 is connected to the trigger terminal of flip-flop 239. The 33 millisecond signal from the 1-output terminal of the field counter 223 is reduced to a frequency of 66 milliseconds by flip-flop 238 and reduced again to 132 milliseconds by flip-flop 239, thereby generating a blink control signal of 132 milliseconds. This 132 millisecond signal is applied to an entry marker and underline control 240. The blink control signal is also applied to one of the input terminals of AND-gate 241.

Flip-flop 242 monitors a pair of output signals of the character generator 30. These output signals are called the "start" blink and the "stop" blink signals and are applied to the set and clear terminals, respectively, of flip-flop 242. When flip-flop 242 is cleared, the 1-output terminal signal is False which causes the output signal of AND-gate 241 to be False and the output signal of inverter 243 to be True. The output signal of inverter 243 is transmitted to all of the input gates of the video register 64 of the video output register logic 31. This output signal of inverter 243 causes all data characters to pass to the video register without blinking.

TIMING AND BUFFERING LOGIC

Buffer memory

Figures 46, 47:
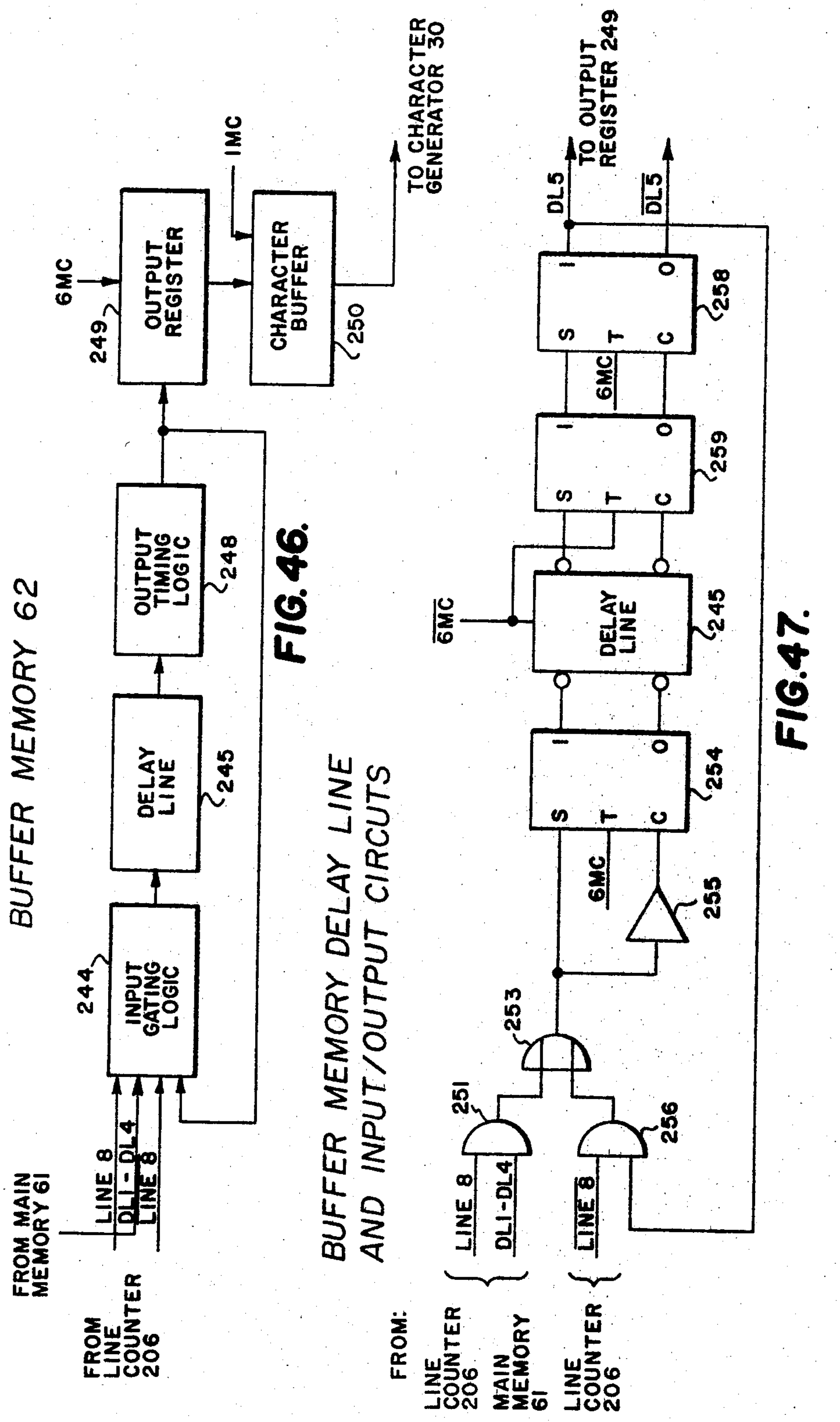
FIG. 46 illustrates in more detail a block diagram of the buffer memory shown in FIG. 10.
FIG. 47 illustrates in detail the buffer memory delay line and input/output circuits shown in FIG. 46.

The buffer memory 62, shown in FIGS. 10 and 46, uses a 6MC glass delay line 245 for storage. This memory is capable of accepting one complete memory row of data from main memory 61 and holding the data by recycling it in the same fashion as the main memory. Buffer memory 62 recycles each memory row of data for one complete display row time or eight cycles of the buffer memory. Data is transmitted to the buffer memory at a 6MC bit rate through input gating logic 244. Delay line 245 receives the data from input gating logic 244 and recycles it through output timing logic 248 back to input gating logic 244 sixty-four microseconds later. Character data is transferred from output timing logic 248 to output register 249 continuously in serial form. Output register 249 is a six bit shift register which shifts at a 6MC rate as it accepts each bit of data from the output timing logic 248. As soon as the output register 249 has accumulated one six bit character, character buffer 250 receives that character in bit parallel form during the time the first bit of the next character is being transmitted into the first flip-flop of output register 249. The character buffer 250 transmits each character it receives to the character generator 30 in bit parallel form.

Buffer memory input/output circuits

FIGURE 47 illustrates the logic of the input gating logic 244, the buffer memory delay line 245, and the output timing logic 248, forming a part of timing and buffering logic 27. Input AND-gate 251 receives data from main memory 61 when LINE 8 is True. LINE 8 is a sixty-four microsecond wire timing signal that occurs once each 512 microseconds, note FIG. 35 for timing detail. The data from main memory 61 is transmitted to AND-gate 251 at a 6MC rate in bit serial form. During the time that the LINE 8 signal is True, data flows through AND-gate 251 and OR-gate 253 to the set terminal of flip-flop 254 and through inverter 255 to the C reset terminal of the flip-flop, thereby setting and resetting flip-flop 254 according to the data received. While data is being accepted from main memory 61 and transmitted to the buffer memory delay line, the $\overline{\text{LINE 8}}$ signal presented to AND-gate 256 inhibits data from being transferred from flip-flop 258 to AND-gate 256 for recirculation through the buffer memory delay line. Thus, as new data is read into the buffer memory 62, all old data stored is erased or lost.

All data flowing through flip-flop 254 is presented to delay line 245 which has a delay time of sixty-four microseconds. The internal circuitry of delay line 245 is driven by the $\overline{\text{6MC}}$ clock signal which transmits the data stored in time sequence to flip-flop 259. This same clocking signal also triggers flip-flop 259, thus re-establishing in flip-flop 259 the data bit by bit in the time sequence of delay line memory 245. Flip-flop 258 is used to retime the data to the 6MC clock timing rate so that it is in time sequence with the clock timing of the main memory data being read into the buffer memory.

Figure 48:
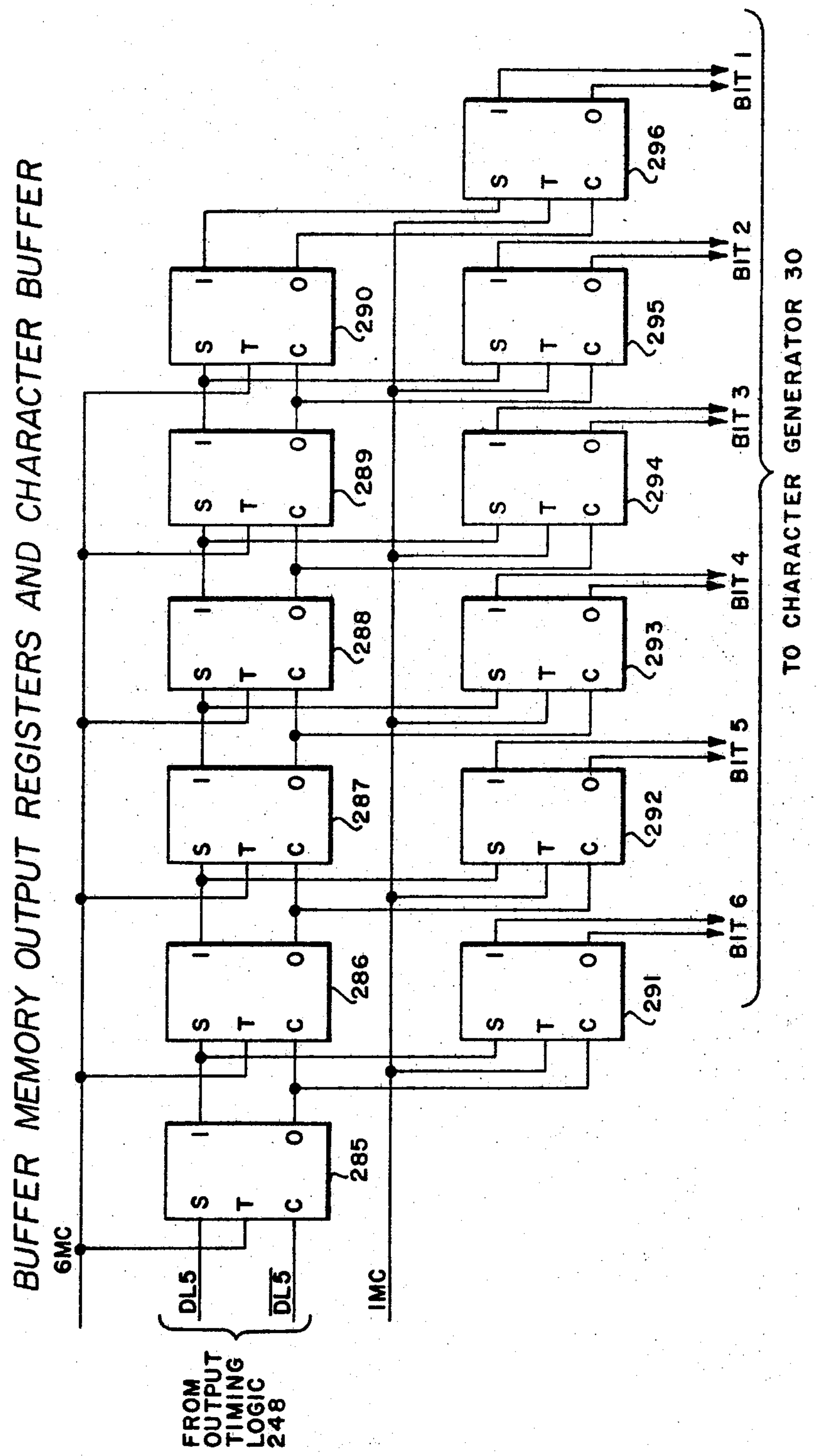
FIG. 48 illustrates in more detail the buffer memory output register and character buffer shown in FIG. 46.

The output signals DL5 and $\overline{\text{DL5}}$ of flip-flop 258 are transmitted to output register 249 shown in FIG. 46. This register along with the character buffer 250 is shown in more detail in FIG. 48. Output register 249 comprises a plurality of flip-flops 285 through 290 serially arranged in shift register form and triggered by the 6MC clock pulse of the clock generator. The data appears at the output timing logic 248 in bit serial form and is shifted through output register 249 at a 6MC pulse rate. As can be seen in the logic diagram of FIG. 48, once each microsecond, all bits stored in output register 249 are shifted in parallel to character buffer 250. The character buffer comprises flip-flops 291 through 296 of FIG. 48. Both the 1 and the 0-output terminal signals of each of the character buffer flip-flops 291–296 are transmitted to the character generator 30. At this point it should be clear that the character generator is receiving data from the character buffer 250 in bit parallel form at a 1MC character rate with no interruption between characters.

CHARACTER GENERATOR

The character generator 30 is, essentially, a code conversion device. Ten bits of information (six bits for character data, three bits for line number data and one bit for field number data) are transmitted to the character generator each microsecond. These ten bits are then converted to a twelve bit word of information which corresponds to twelve picture segments of a character position as described hereinbefore. This twelve bit word is then loaded in parallel form into video register 64 shown in FIG. 10 of the video output register logic 31 which serially shifts it out to form digital television video signals.

At exactly the same time that this twelve bit video word is loaded into the video register 64, a new character is presented at the input of the character generator 30. While the video register 64 is shifting video information to the video amplifier and mixer 65 shown in FIG. 10, the character generator 30 is encoding the new character presented. This shifting process form on the display the twelve picture segments of a given raster line for a particular character position. For example, if the character code is for the letter A and the line code corresponds to raster line four, then the twelve bit word transmitted out to the display module by the video register would appear as illustrated in FIGS. 11*b* and 11*c*, where an uplevel or rise in the waveform signifies intensity on. It will be noted that the waveforms in FIGS. 11*b* and 11*c* are in time relationship with the video picture segments for the raster lines of, for example, character A in FIG. 11*a*.

Figure 49:
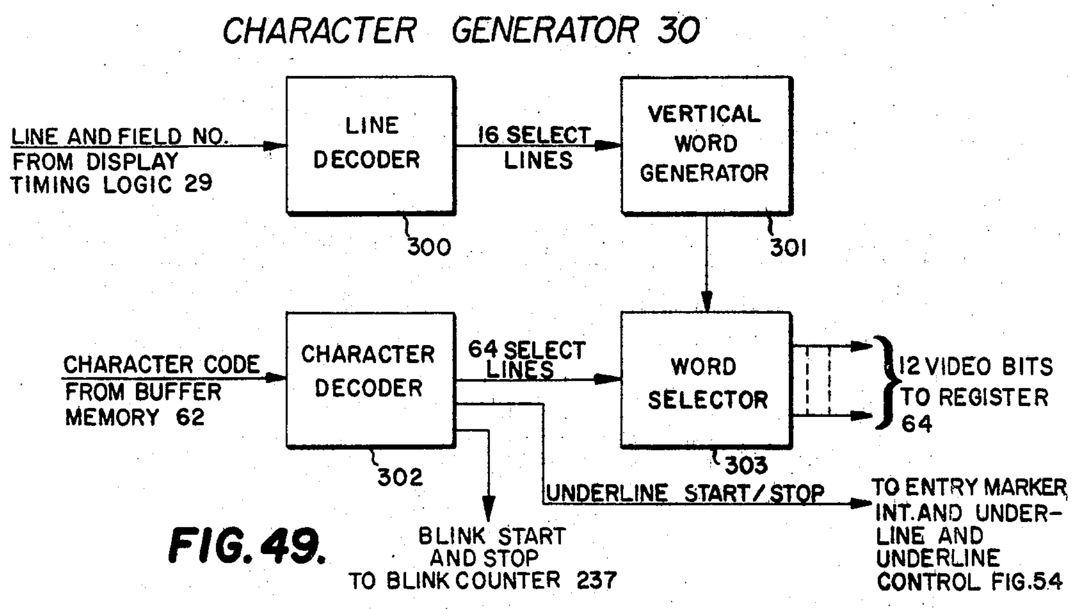
FIG. 49 illustrates in more detail the character generator shown in FIG. 1.

FIGURE 49 is a block diagram of character generator 30. Line decoder logic 300 accepts three bits of data representing a line count and one bit of data representing a field number from the display timing logic 29 shown in FIGS. 1 and 10. It decodes these four bits of data into sixteen different control signals or select lines. These sixteen control or selection signals drive a vertical word generator 301, which composes approximately one hundred combinations of sixteen bit words corresponding to vertical groups of picture segments of the character array used in this data editing and display system (see FIG. 11*a*). The logic of vertical word generator 301 comprises a set of multi-input OR-gates. Each multi-input OR-gate is driven by a set of output signals from the line decoder 300. To determine what logical operations are to be performed, every character to be generated is plotted graphically as illustrated in FIG. 13. From this plot of all the characters, every different combination of vertical picture segments is determined. For example, in the case of the symbol A, there are three different vertical words required. Referring to the character A in FIG. 11*a*, these words are defined as follows:

(1) The vertical word described by picture segment three of all raster lines. This vertical word is identical to the vertical word formed by picture segment nine.

(2) The vertical word described by picture segment four of all raster lines. This vertical word is identical to picture segment eight; and (3) The vertical word described by picture segment five of all raster lines. This vertical word is the same for picture segments six and seven.

In this same manner each character of the character set chosen is plotted and all different vertical word combinations are determined for the set of character symbols implemented. The one hundred different vertical words referred hereinbefore result when the set of character symbols shown in FIG. 13 are plotted and implemented.

Character decoder 302 accepts character data from the buffer member 62. Each character is accepted parallelly by bit and is decoded into sixty-four different control signals by character decoder 302. These sixty-four different control signals are combined in a word selector 303 with the output signals from the vertical word generator 301. Word selector 303 comprises a set of twelve logic trees of AND and OR-gates. Each logic tree output signal corresponds to a bit or picture segment in the video word transmitted to the display. These twelve video bits of information are presented in parallel to the video register 64 at the same time a new character is being presented to the character decoder 302.

In addition to the generation of sixty-four select lines for use by the word selector 303, the character decoder generates two control signals for the blink counter 237 of the display timing logic. This blink counter, as described hereinbefore, is activated by the presence of the "start" blink signal and deactivated by the presence of the "stop" blink signal.

Line decoder

Figure 50:
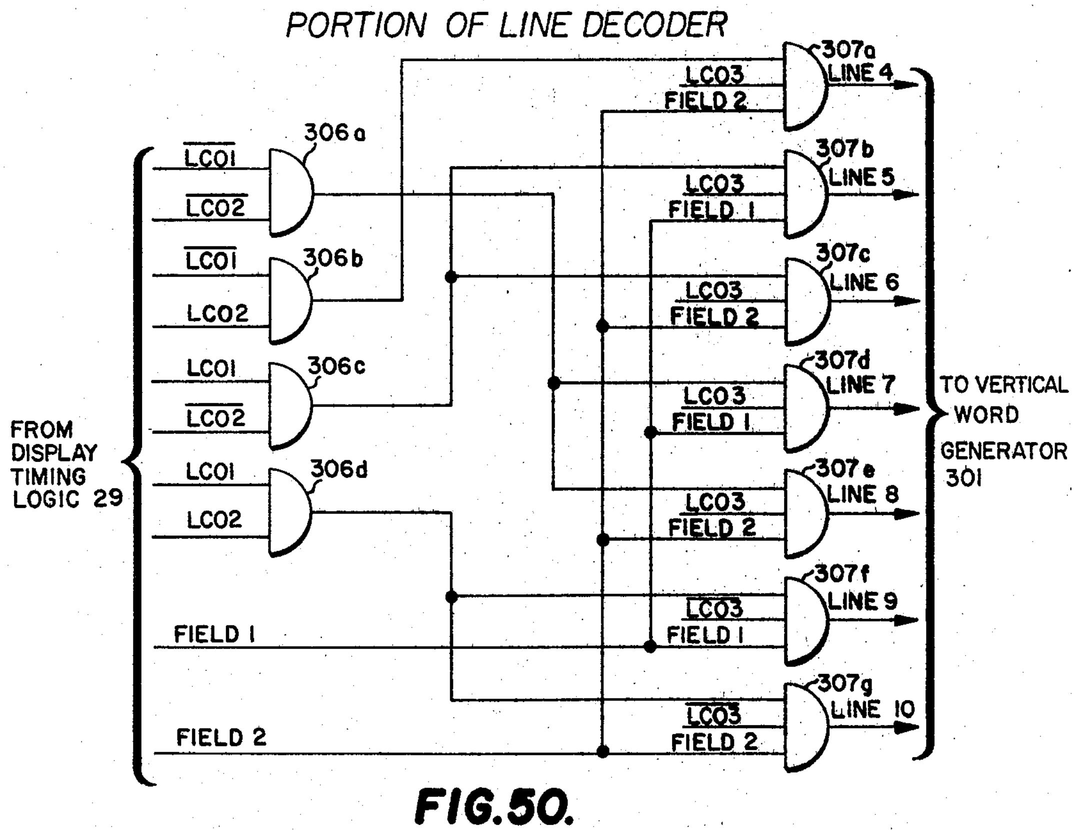
FIG. 50 illustrates in more detail a portion of the line decoder shown in FIG. 39.

FIGURE 50 shows a portion of the logic of the line decoder 300 shown in FIG. 49. The LC01, LC02, LC03, and FIELD 1 and FIELD 2 input signals are from the display timing logic 29 heretofore discussed. AND-gates 306*a* through 306*d* decode the LC01 and LC02 signals into four select signals which are combined in AND-gates 307*a* through 307*g* with the LC03 and FIELD 1 and FIELD 2 signals. The output signals of AND-gates 307*a* through 307*g* represent seven of the sixteen select lines generated by the line decoder 300.

Vertical word generator

Figure 51:
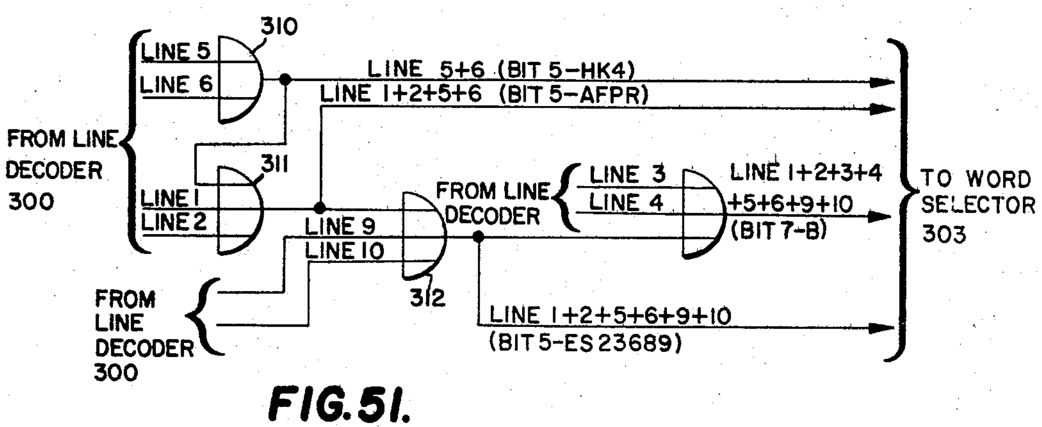
FIG. 51 illustrates in more detail a portion of the vertical word generator shown in FIG. 49.

A portion of the vertical word generator 301 is shown in FIG. 51. This portion generates bit 5 for the symbols A, F, P, R, H, K, 4, E, S, 2, 3, 6, 8, 9 and bit 7 for the symbol B. Line numbers 1, 2, 3, 4, 5, 6, 9 and 10 are accepted from the line decoder 300 and formed into the various output signals shown in FIG. 51. It should be noted from this figure that, once a group of lines have been combined, they are used in as many places as possible. For example, signals representing LINE 5 and LINE 6 are transmitted as input signals to OR-gate 310 and the output signal of this OR-gate is used as bit or picture segment 5 in the symbols H, K and 4. This same signal is used as input signal by OR-gate 311 to generate an output signal representing LINE 1+2+5+6. The output signal of OR-gate 311 is used as an input signal to OR-gate 312 to generate a signal representing signal LINE 1+2+5+6+9+10.

Character decoder

Figure 52:
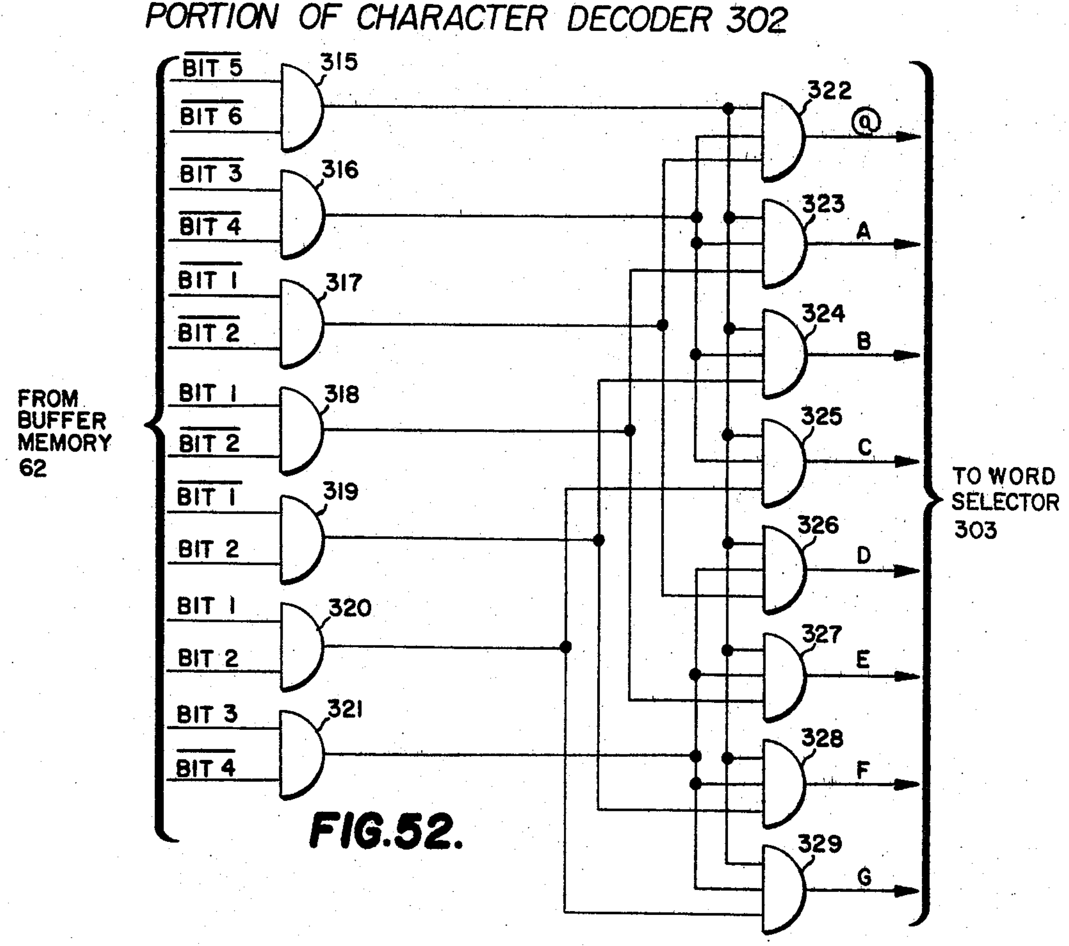
FIG. 52 illustrates in more detail the character decoder shown in FIG. 49.

FIGURE 52 illustrates a portion of the logic of the character decoder 302. The character decoder monitors the bit output signals from the character buffer 250 shown in FIG. 46 of the buffer memory 62. AND-gates 315–321 decode the combinations of their input signals as shown in the figure. The output signals of AND-gates 315–321 are combined in AND-gates 322–329 to form signals which represent select signals for the symbols A through G and the @ sign. The remainder of the character decoder logic 302 is implemented in the same way as is the logic of those symbols illustrated in FIG. 52. The output signals of the character decoder 302 are transmitted to the word selector 303 as the sixty-four select lines discussed above.

Word selector

Figure 53:
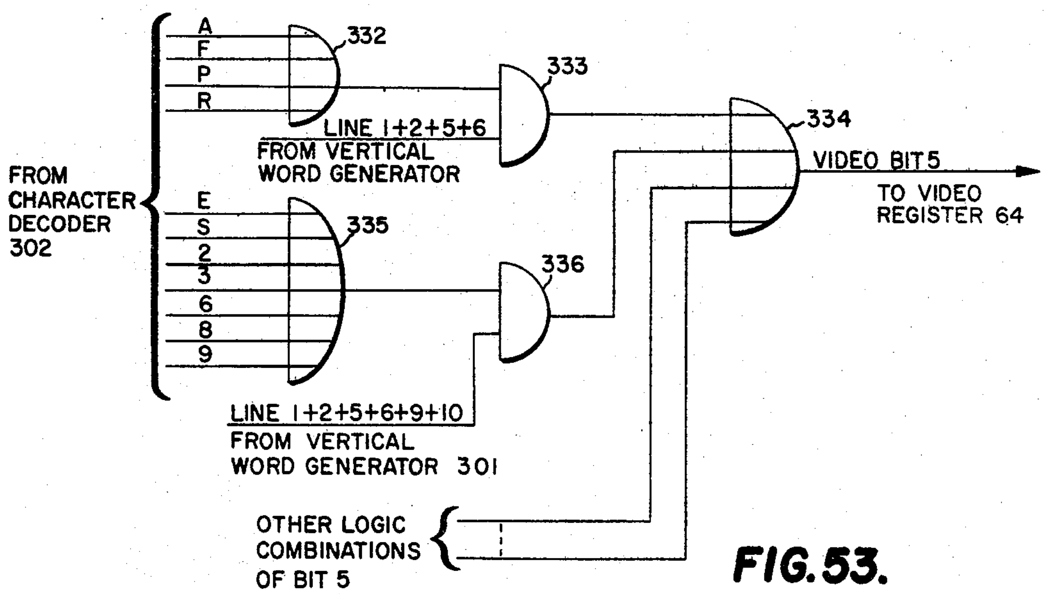
FIG. 53 illustrates in more detail a portion of the word selector shown in FIG. 49.

A portion of the word selector logic 303 is shown in FIG. 53. In this figure, the input signals A, F, P and R to OR-gate 332 all contain a video bit 5 intensified on raster line numbers 1, 2, 5 and 6. As noted, in FIG. 53, the input signal LINE 1+2+5+6 is logically combined in AND-gate 333 with the output signal of AND-gate 332. Each time the output signal of AND-gate 332 goes True, a VIDEO BIT 5 signal is generated by OR-gate 334. In a similar manner, the input signals of OR-gate 335 are logically combined in AND-gate 336 with the signals representative of line numbers shown to produce an output signal which is transmitted to one of the input terminals of OR-gate 334. The resulting output signal of OR-gate 334 is the VIDEO BIT 5 signal generated and illustrated in FIG. 53. A similar set of logic circuitry makes up the remainder of the word selector logic. All of these OR/AND-gate combinations are transmitted through OR-gate 334 as indicated in the figure. Thus far the logic tree corresponding to VIDEO BIT 5 has been described. Each other video bit, one through four and six through twelve, is implemented in a similar manner. For the character set illustrated in FIG. 13, video bit number one is the same as video bit number two in all cases and video bit number eleven is the same as video bit number twelve. Therefore, only ten logic trees are necessary in the word selector 303 to implement the logic for this particular character set.

Underlining

Figure 54:
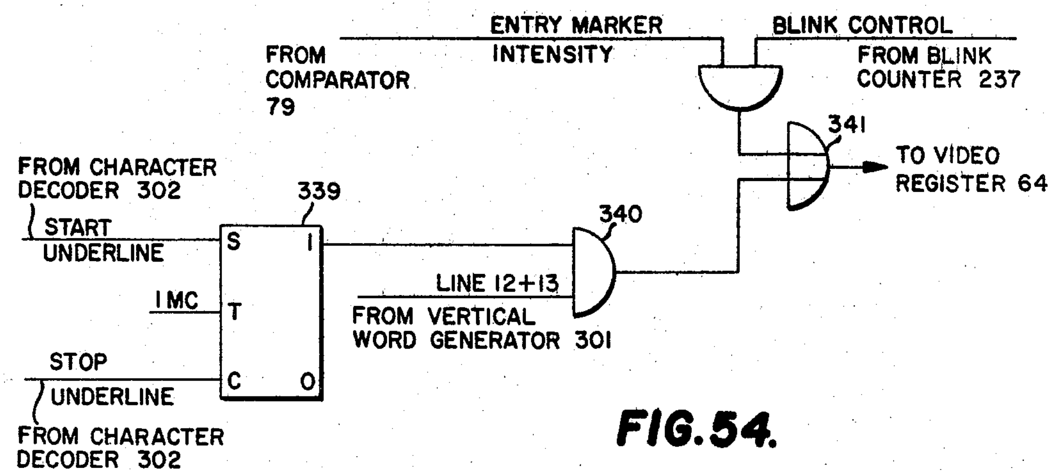
FIG. 54 illustrates in detail the entry marker intensity and underlining control.

Underlining of displayed data is accomplished by the logic shown in FIG. 54. A start underline signal from character decoder 302 sets flip-flop 339 shown in FIG. 54. The 1-output signal of this flip-flop is logically combined in AND-gate 340 with LINE 12+13 signal generated by the vertical word generator 301 of FIG. 53. The output signal of AND-gate 340 is transmitted to OR-gate 341 resulting in an output signal which is transmitted to the input gates of video register 64. Therefore, any time- flip-flop 339 is set during raster line number twelve or thirteen, underlining of data will occur on the display module. When the stop underline signal is detected by the character decoder 302, flip-flop 339 is cleared and underlining stops.

VIDEO REGISTER

The video register 64 is essentially a high speed, parallel to serial converter. It converts a twelve bit parallel word which is changing at a one megacycle bit rate to a serial word at a twelve megacycle bit rate. For this application a straightforward, twelve-megacycle shift register was not used since the flip-flop circuits employed in such a register would not work at this speed under all operating conditions. Means are provided for causing the flip-flops of the register to shift at a six-megacycle rate but obtaining an effective twelve-megacycle shift rate for the register.

Figure 55:
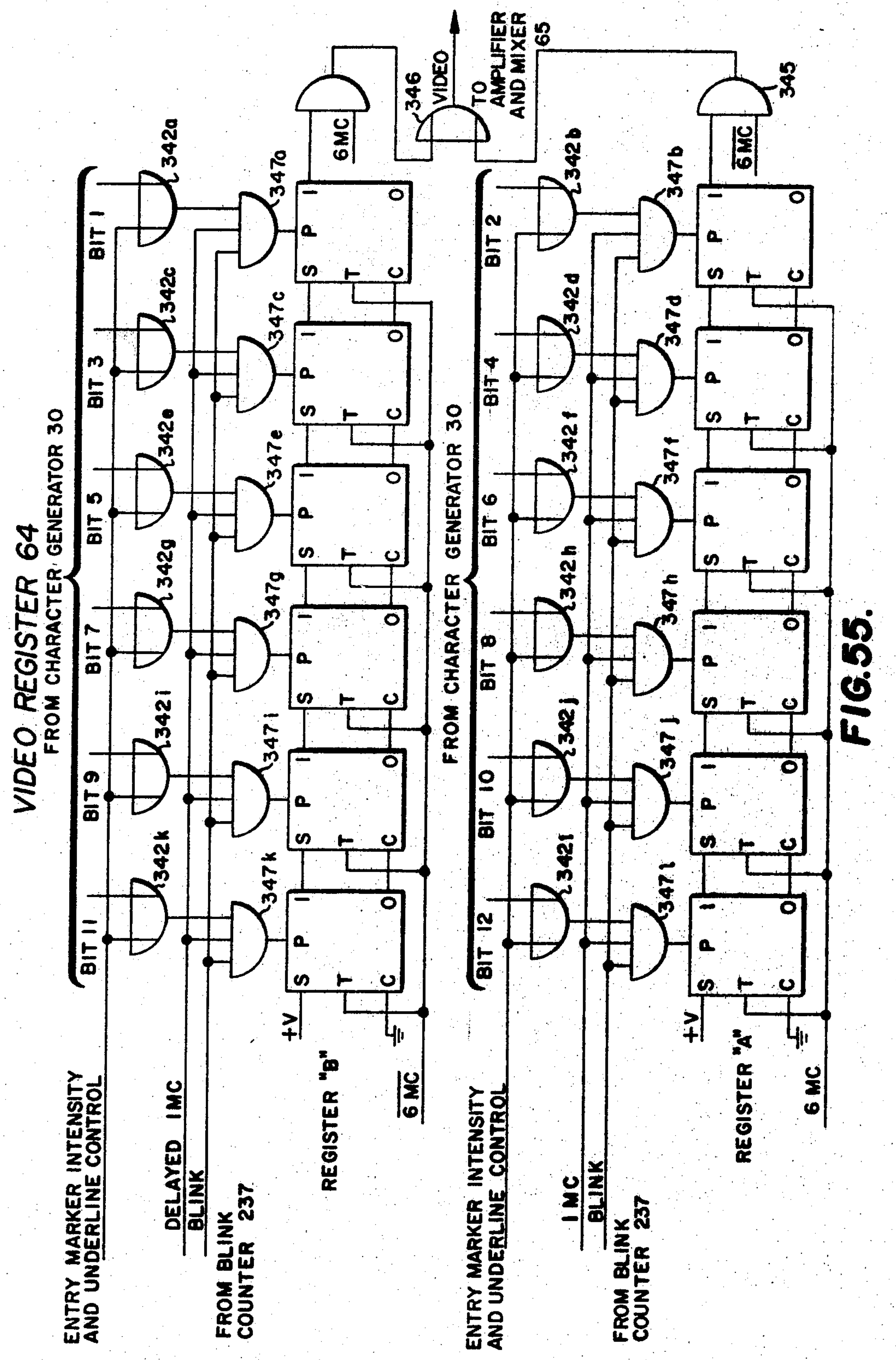
FIG. 55 illustrates in more detail the video register shown in FIG. 10.

FIGURE 55 is a logic diagram of the video register 64. It comprises two six bit shift registers each of which can shift at a six-megacycle rate. Register A uses 6MC clock pulses as shift pulses, and register B uses $\overline{6MC}$ clock pulses as shift pulses. The output signal of register A is logically combined in AND-gate 345 with the $\overline{6MC}$ clock pulse. The resulting output signal upon conjunction occurring therein is transmitted through OR-gate 346 to form a video signal which is transmitted to the video amplifier and mixer 65.

Loading of the video register 64 is accomplished by the input signals transmitted to the preset terminal of each flip-flop of registers A and B. The output signals of AND-gates 347*a*–347*l* are inverted by suitable inverters (not shown) before being transmitted as input signals to the preset terminals of the flip-flops of registers A and B. Each output signal of character generator 30 representing a bit is loaded into a given flip-flop of FIG. 55. Each bit of data is transferred once each microsecond by a one-megacycle clock pulse into register A and by a delayed one-megacycle clock pulse into register B. The loading takes place while the last bit of the previous word is being shifted out of each register. The resulting video output signal is a serial, twelve-megacycle, non-return to zero binary word.

The blinking of characters are described hereinbefore with respect to capabilities of applicant's invention is accomplished by the inhibiting of the loading of all of the bits to the video register at the load AND-gates 347*a* through 347*l* shown in FIG. 55.

The entry marker intensity signal generated by the comparator 79 and combined with the underline signal by the entry marker intensity and underline control (FIG. 54) is introduced into the video register 64 through OR-gates 342*a* through 342*l*. This signal is applied to all the OR-gates simultaneously causing all flip-flops of the video register to be set to their 1-states. All 1's stored in the video register and shifted out to the display module 26 provides a television video signal that appears as a continuous horizontal line throughout the character interval on the display. The entry marker signal is only generated during raster lines 1 and 2 of the character interval at which the entry marker is to appear while the underline signal is only generated during raster lines 12 and 13 of a character to be underlined.

VIDEO AMPLIFIER AND MIXER

Figure 56:
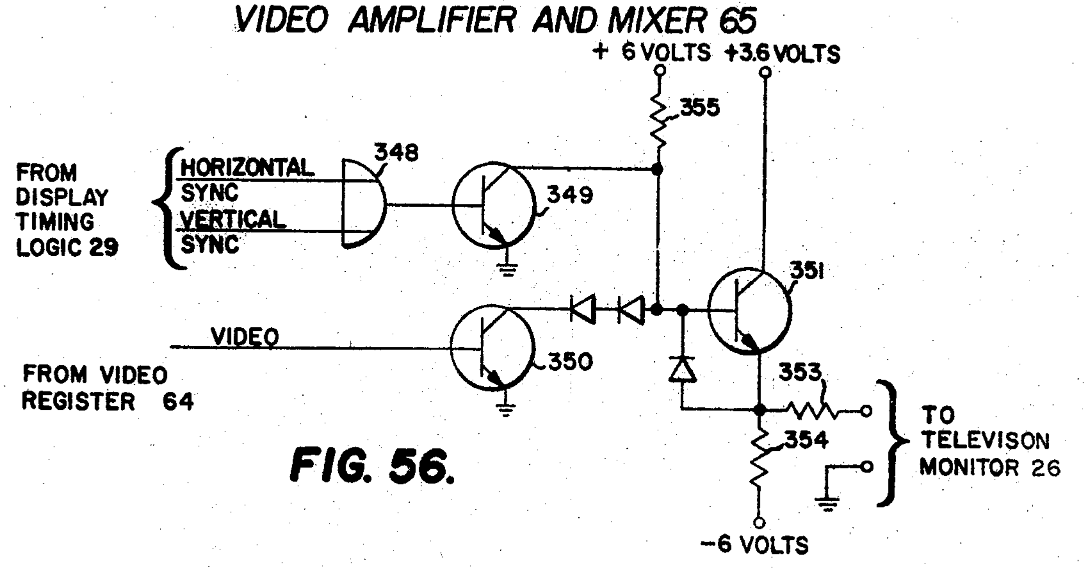
FIG. 56 illustrates in more detail the video amplifier and mixer illustrated in FIG. 10.

The video amplifier and mixer 65 shown in FIG. 56 performs the functions of combining into a composite video signal the vertical and horizontal synchronizing signals from display timing logic 29 and the video output signals from the video register 64. This amplifier also performs the additional function of driving a coaxial line so that the television monitor 26 may be remotely located.

The composite video signal available at this point is such that standard television studio signal distribution techniques can be used to drive more than one monitor placed several thousand feet from the digital to raster scale converter. It will be recognized by those skilled in the art that for television monitors requiring separate synchronizing input signals, the mixing function can be eliminated and the synchronizing and video signals can be fed to the television monitor on separate cables.

OR-gate 348 in FIG. 56 combines the horizontal and the vertical synchronizing signals into one composite signal. The output of OR-gate 348 is applied to the base of transistor 349 which amplifies and combines the composite synchronizing signal with the video signal through transistor 350.

Transistor 351, diode 352 and resistors 353 and 354 make up a video driver which amplifies the combined signal across resistor 355 to a signal suitable for driving the television monitor 26. Resistor 353 establishes a minimum value for external load resistance and protects the circuit against accidental short circuiting of the output line.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A recirculating digital data storage system comprising an input gating means for receiving data in the form of a series of binary bits, a delay line comprising at least a pair of data paths, means for transferring said data in the form of signals from said input gating means to said data paths in a commutating manner, means coupled to said delay line for receiving and decommutating said signals into a form equivalent of the data received by said input gating means, and means for transferring said decommutated signals to said input gating means for recirculation through said delay line.

2. A recirculating digital data storage system comprising an input gating means for receiving data in the form of a series of binary bits one in each of a series of equal time intervals, a delay line for retaining said data for a fixed duration, said delay line comprising at least a pair of data paths, means coupled to said delay line for transferring said data in the form of signals from said input gating means to said data paths in a commutating manner, means coupled to said delay line for receiving and decommutating said signals into a form representative of the data received by said input gating means, and means for transferring said decommutated signals to said input gating means for recirculation through said delay line.

3. The combination as defined in claim 2 wherein said data paths are each formed by a sonic memory element.

4. An apparatus for controlling the flow of data, said data being in the form of binary bits arranged in different combinations to represent different alphanumeric characters, said apparatus comprising a delay line having at least a pair of data paths, a first conversion means coupled to receive said binary bits one in each of a series of equal time intervals and for converting said series of binary bits into at least a pair of substantially concurrent signals. means for coupling said concurrent signals one to each of said data paths for increasing said period of time to a period of time greater than said equal time intervals, a second conversion means coupled to said delay line and responsive to the receipt of said concurrent signals from said data paths for reconverting said concurrent signals into signals representing said series of binary bits, and means for coupling said reconverted signals to said first conversion means to form an information recirculating loop.

5. The combination as defined in claim 4 wherein said data paths are each formed by a different memory element.

6. The combination as defined in claim 4 wherein said data paths are each formed by a sonic memory element.

7. A signal storage system comprising a source of information to be stored, said information being represented by the presence or absence of a pulse in each of a series of equal time intervals, a delay line normally requiring a period of time greater than one of said equal time intervals to maintain said stored information separated, said delay line comprising at least a pair of parallelly arranged data paths, a first conversion means coupled to said source for converting said information into a plurality of substantially simultaneously occurring signals, means for coupling said simultaneously occurring signals one to each of said data paths for increasing said period of time to one greater than said equal time intervals, a second conversion means coupled to said delay line and responsive to the receipt of said simultaneously occurring signals from said data paths for reconverting said latter signals into said information of said source, and means for coupling the reconverted signals of said second conversion means to said first conversion means to form an information recirculating loop.

8. The combination as defined in claim 7 wherein said delay line comprises a plurality of sonic memory elements each forming a data path.

9. The combination as defined in claim 7 wherein said delay line comprises a plurality of wire sonic memory elements each forming a data path.

10. The combination as defined in claim 7 wherein said first and second conversion means each comprises a gating means for receiving signals and a series of clock pulses and upon the coincident receipt of the signals and the clock pulses passing the signals.

References Cited

UNITED STATES PATENTS

| | | |
|---|---|---|
| 2,966,641 | 12/1960 | McCoy. |
| 3,074,048 | 1/1963 | Turner. |
| 3,316,544 | 4/1967 | Anderson. |
| 3,359,368 | 12/1967 | Kleinschmidt. |
| 3,366,935 | 1/1968 | Anderson. |

TERRELL W. FEARS, Primary Examiner

U.S. Cl. X.R.

333—30